US006801407B2

(12) United States Patent
Sasaki et al.

(10) Patent No.: US 6,801,407 B2
(45) Date of Patent: Oct. 5, 2004

(54) THIN FILM MAGNETIC HEAD AND METHOD OF MANUFACTURING THE SAME

(75) Inventors: Yoshitaka Sasaki, Sunnyvale, CA (US); Takehiro Kamigama, Kwai Chung (CN)

(73) Assignees: Headway Technologies, Incorporated, Milpitas, CA (US); SAE Magnetics (H.K.), Limited, Hong Kong (CN)

(*) Notice: Subject to any disclaimer, the term of this patent is extended or adjusted under 35 U.S.C. 154(b) by 0 days.

(21) Appl. No.: 10/067,911

(22) Filed: Feb. 8, 2002

(65) Prior Publication Data

US 2003/0151856 A1 Aug. 14, 2003

(51) Int. Cl.[7] .............................................. G11B 5/31
(52) U.S. Cl. ...................................... 360/317; 360/126
(58) Field of Search ................................ 360/317, 126, 360/124, 123

(56) References Cited

U.S. PATENT DOCUMENTS

| | | | | | |
|---|---|---|---|---|---|
| 5,113,300 | A | * | 5/1992 | Ikeda et al. | 360/126 |
| 5,448,822 | A | * | 9/1995 | Wu et al. | 29/603.24 |
| 6,191,916 | B1 | * | 2/2001 | Sasaki | 360/126 |
| 6,191,918 | B1 | * | 2/2001 | Clarke et al. | 360/126 |
| 6,204,997 | B1 | * | 3/2001 | Sasaki | 360/123 |
| 6,466,401 | B1 | * | 10/2002 | Hong et al. | 360/123 |

FOREIGN PATENT DOCUMENTS

| JP | 62-256209 | * 11/1987 |
|---|---|---|
| JP | 63-239608 | * 10/1988 |
| JP | 11-259813 | * 9/1999 |
| JP | 11-328617 | * 11/1999 |

* cited by examiner

*Primary Examiner*—David Ometz
(74) *Attorney, Agent, or Firm*—Oliff & Berridge, PLC

(57) ABSTRACT

A write gap film and a first magnetic material film are formed on a bottom pole, a first non-magnetic film is formed in a space formed by etching a portion of the first magnetic material film other than a portion extending from an air bearing surface to a throat height zero reference position to constitute a flat coplanar surface with the first magnetic material film, a second magnetic material film is formed on the flat coplanar surface, a two-layer track pole consisting of a top track pole and a bottom track pole is formed in a self-aligned manner by removing by RIE the second magnetic material film, first magnetic material film, write gap film and a part of the bottom pole, a second non-magnetic material film is formed to have a flat coplanar surface with the top track pole, and a thin film coil is formed on the flat coplanar surface. The thin film coil includes first and second thin film coil halves formed in a self-aligned manner, an insulating film interposed between successive coil windings of the first and second thin film coil halves and a jumper wiring electrically connecting an innermost coil winding of the first thin film coil half to an outermost coil winding of the second thin film coil half. Finally a top pole is formed such that one end of the top pole is magnetically coupled with the top track pole and the other end of the top pole is magnetically coupled with the bottom pole at a back gap.

132 Claims, 58 Drawing Sheets

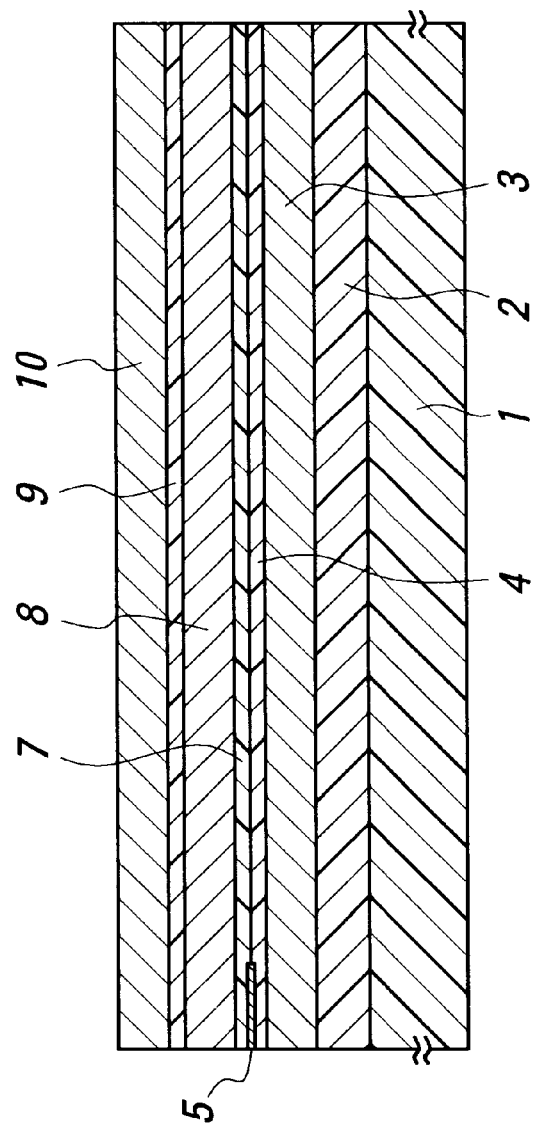
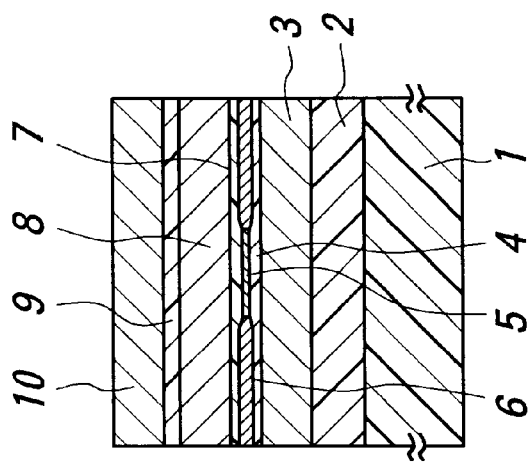
FIG. 1A PRIOR ART
FIG. 1B PRIOR ART

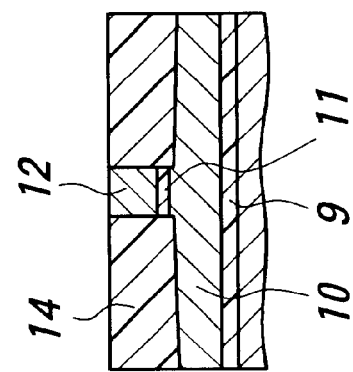
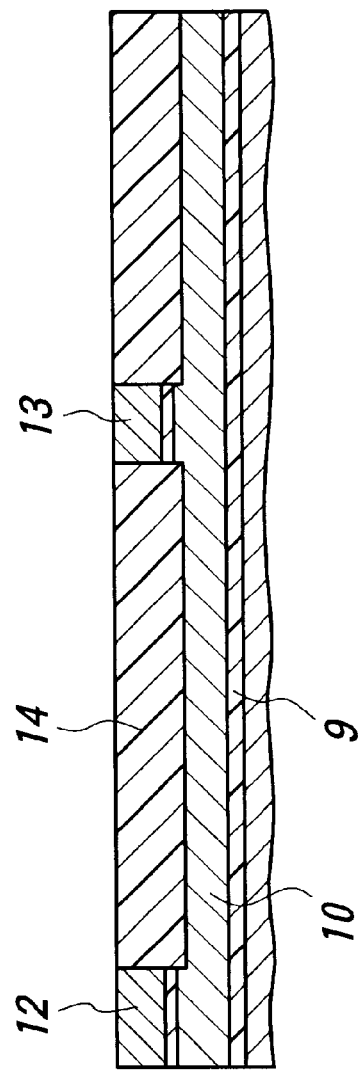
FIG. 3A PRIOR ART
FIG. 3B PRIOR ART

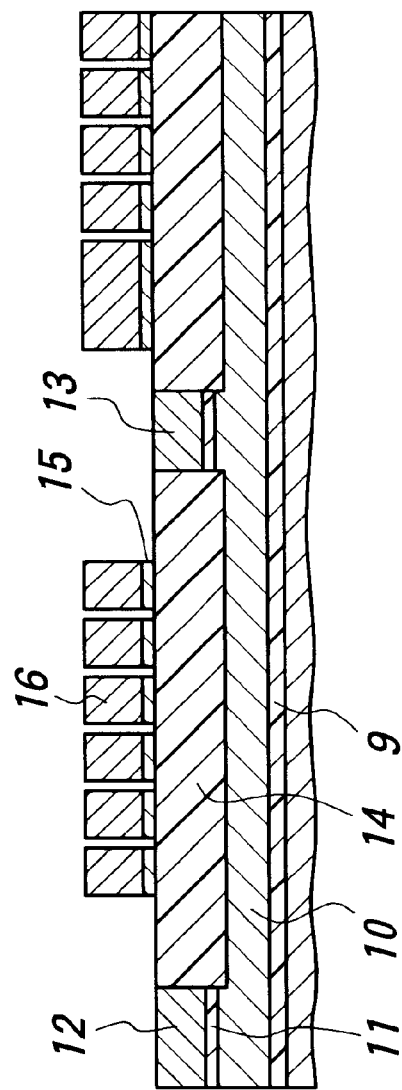

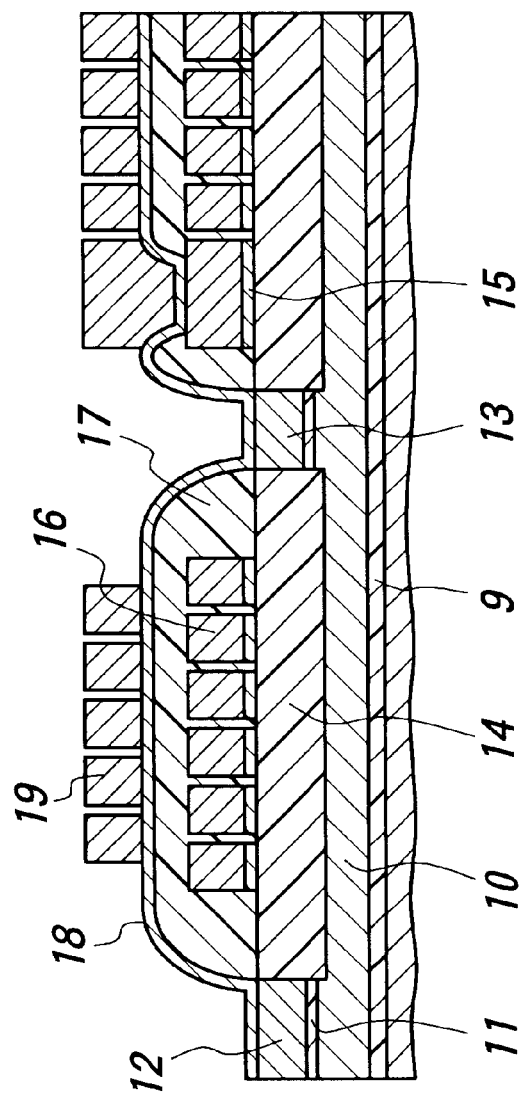
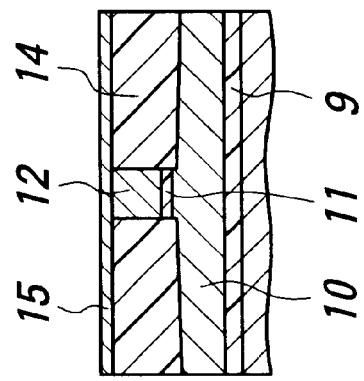
FIG. 7A PRIOR ART
FIG. 7B PRIOR ART

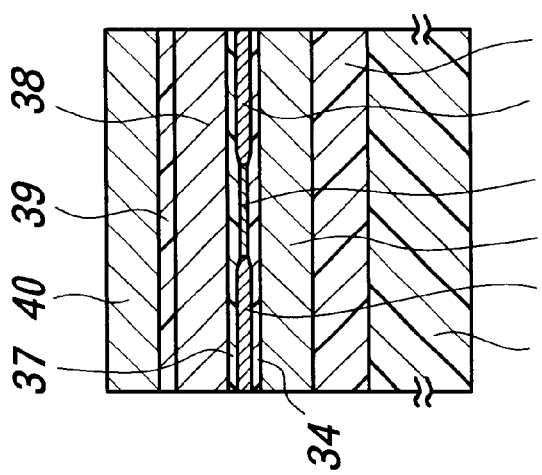
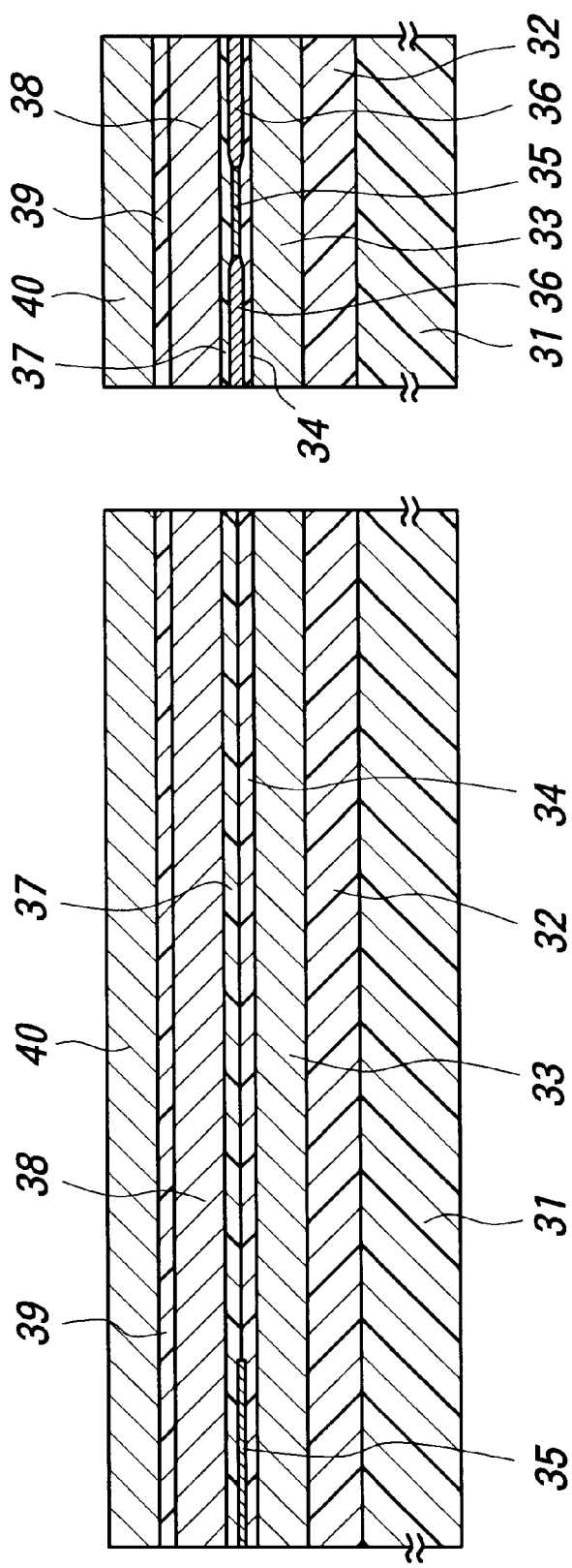

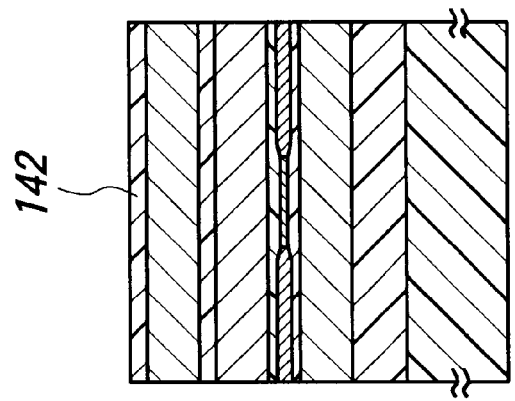
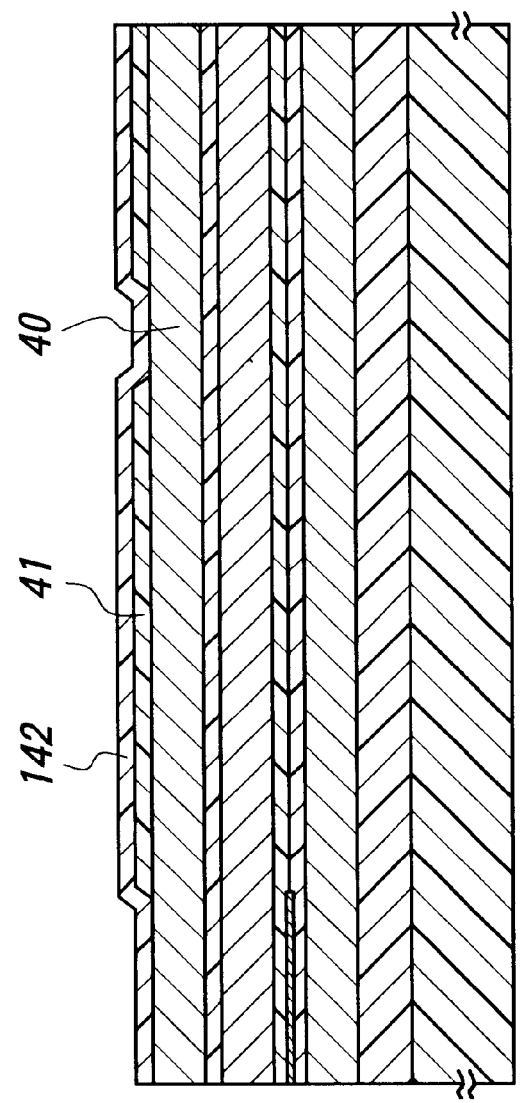

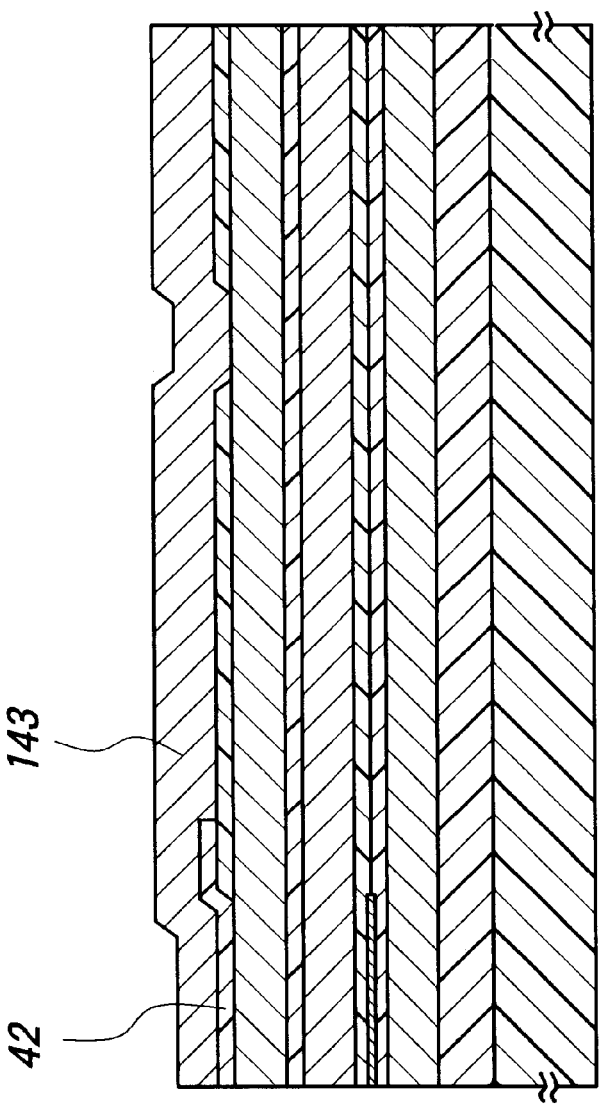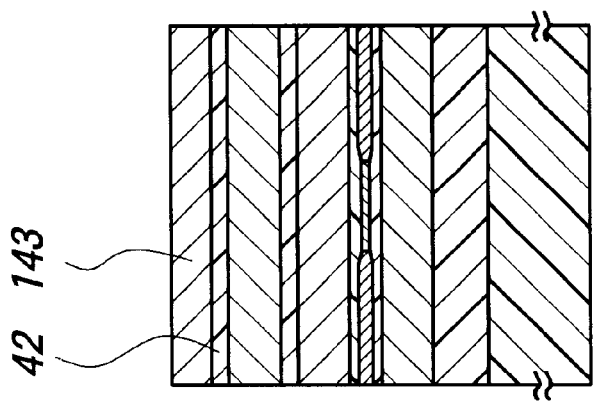

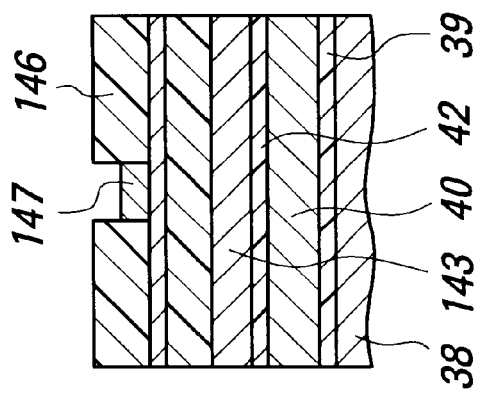
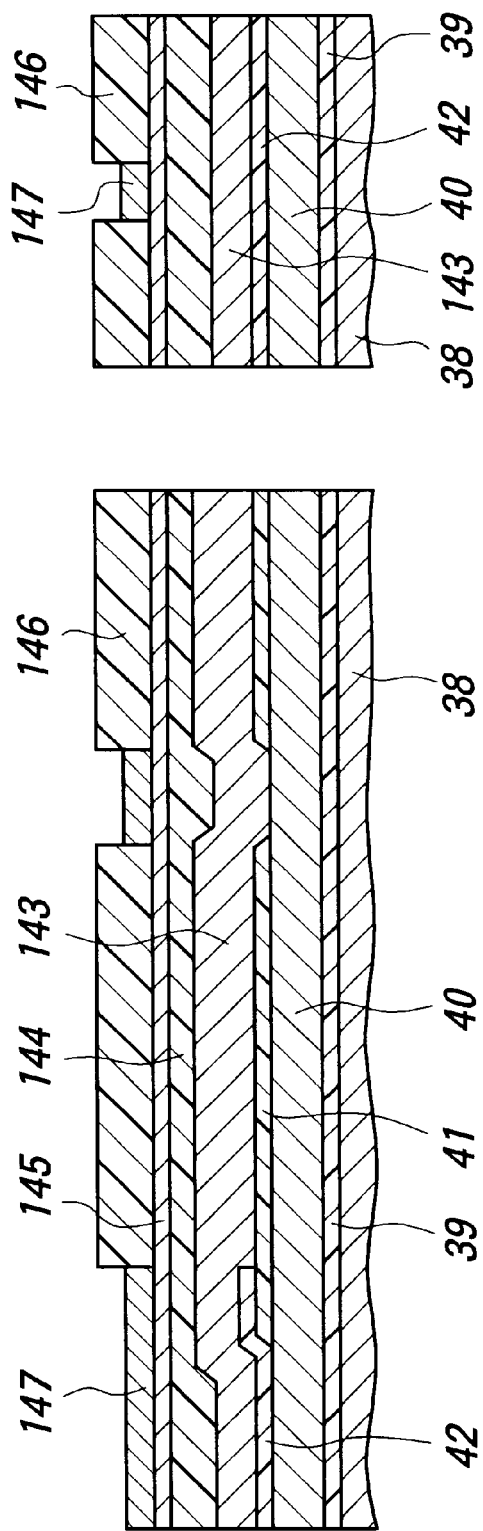

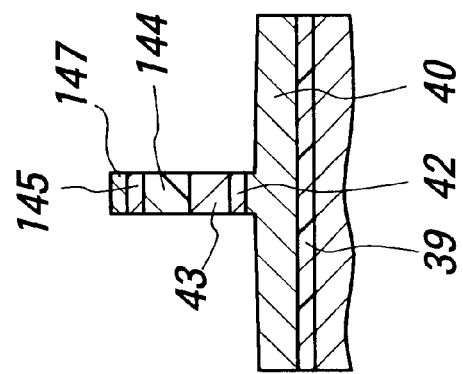
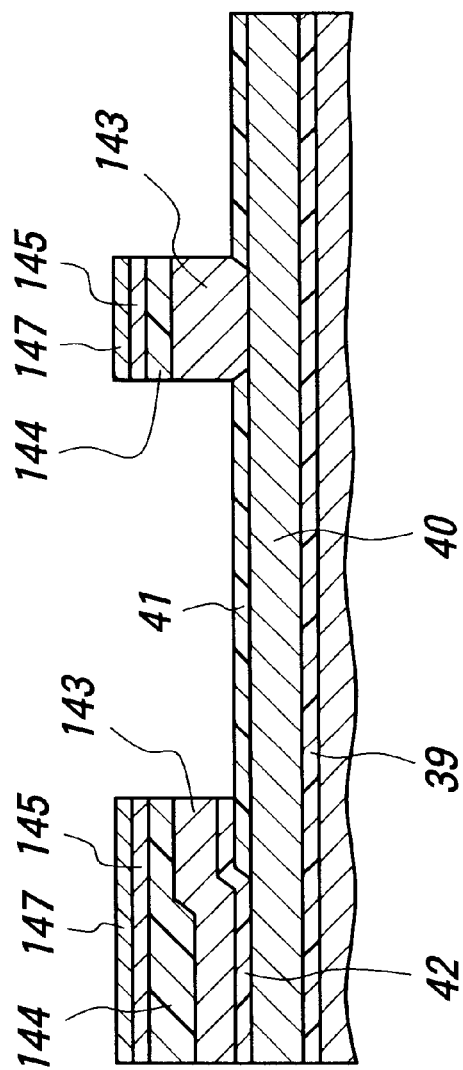

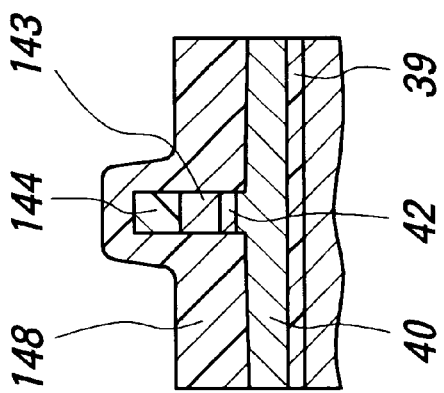
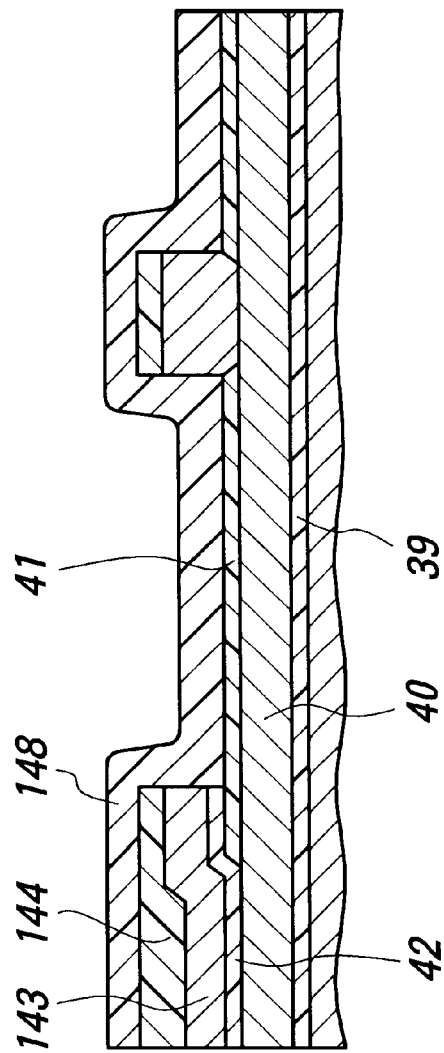

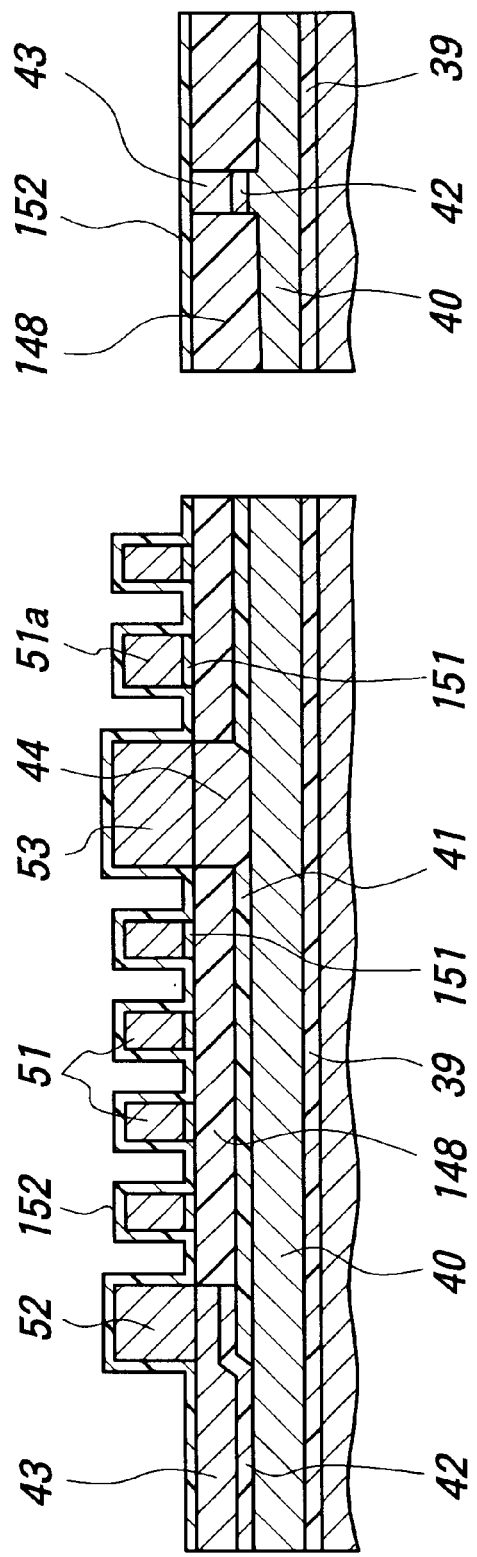

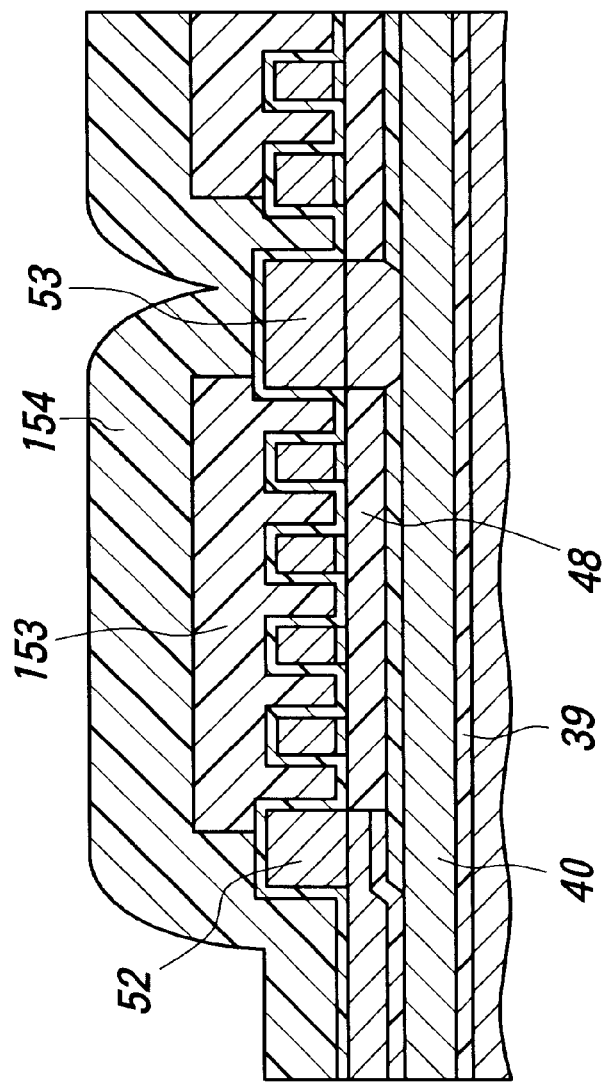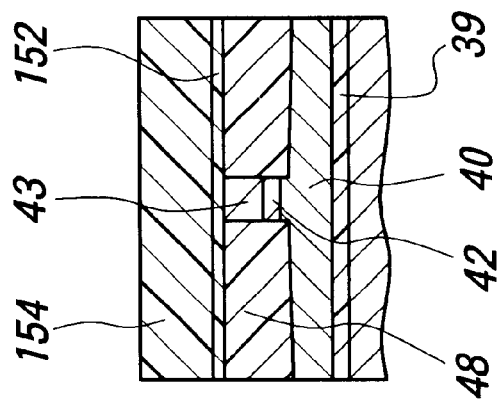

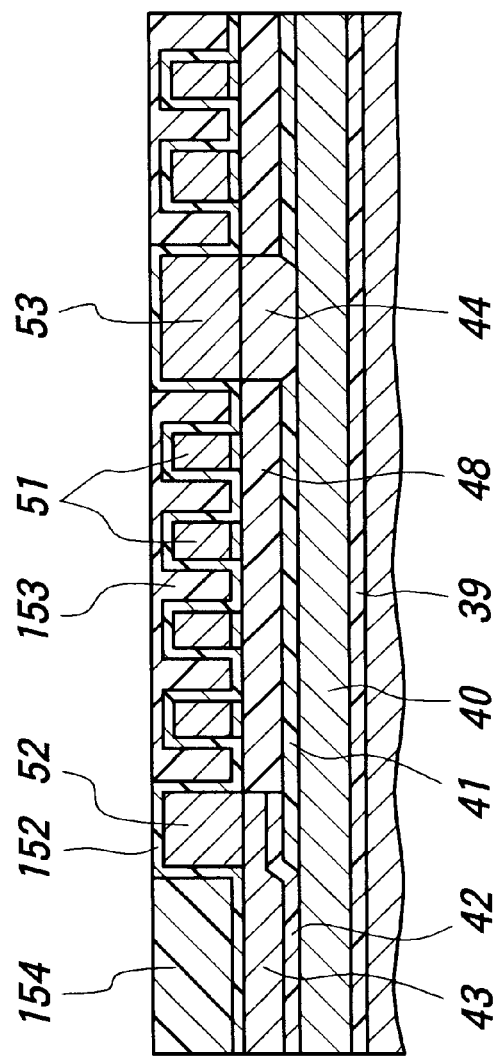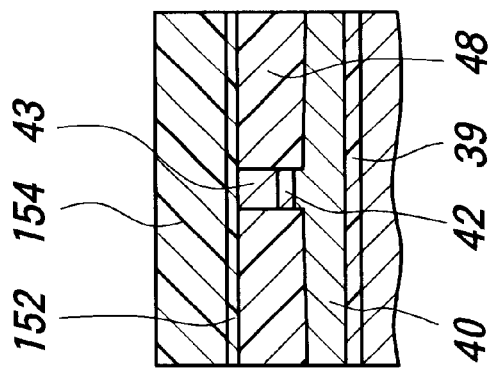

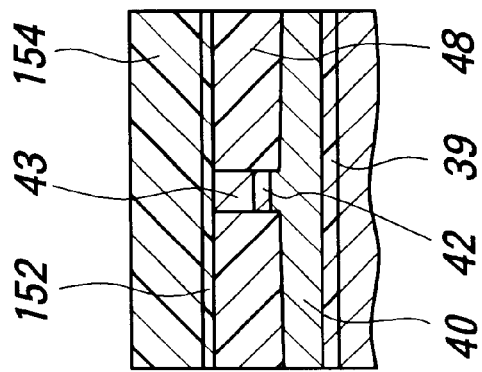
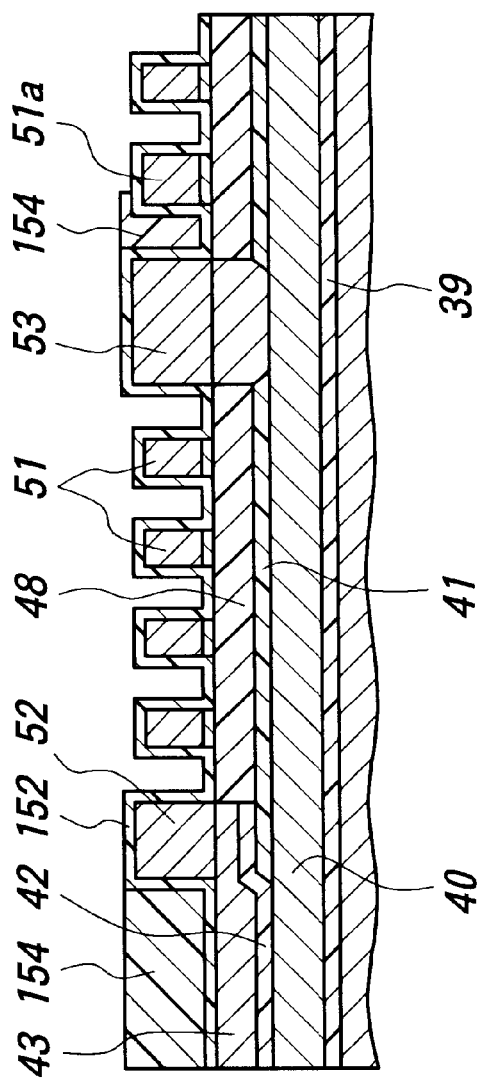
FIG. 20B
FIG. 20A

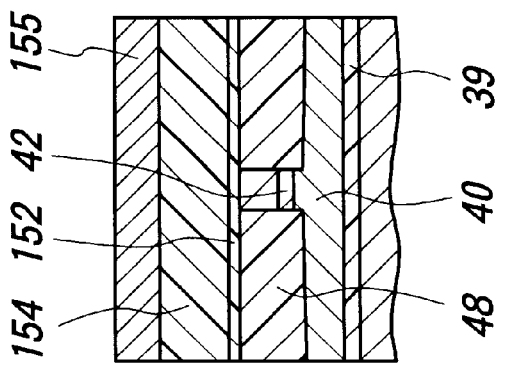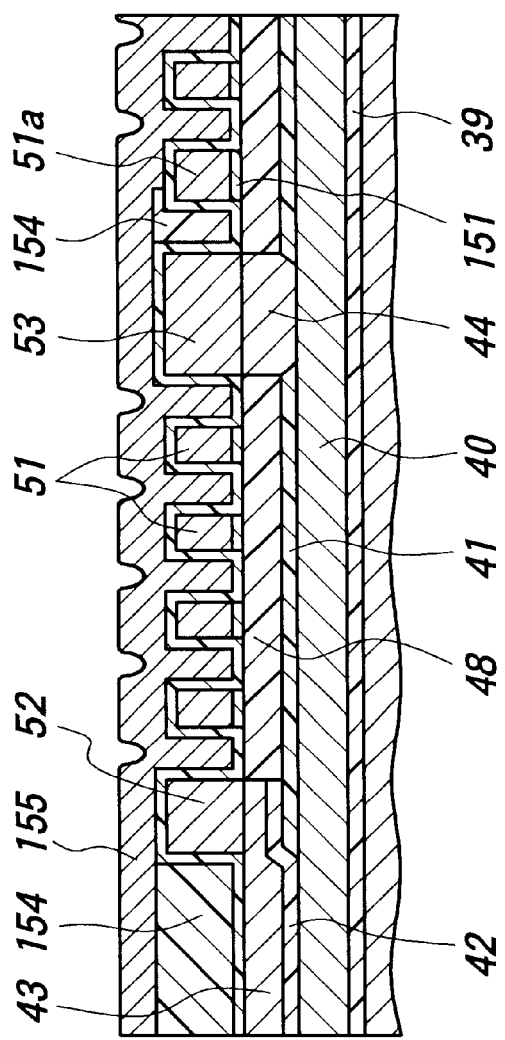

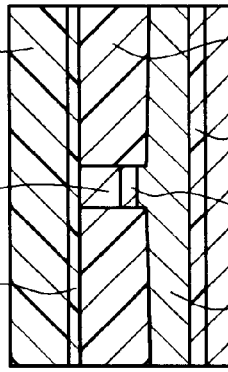
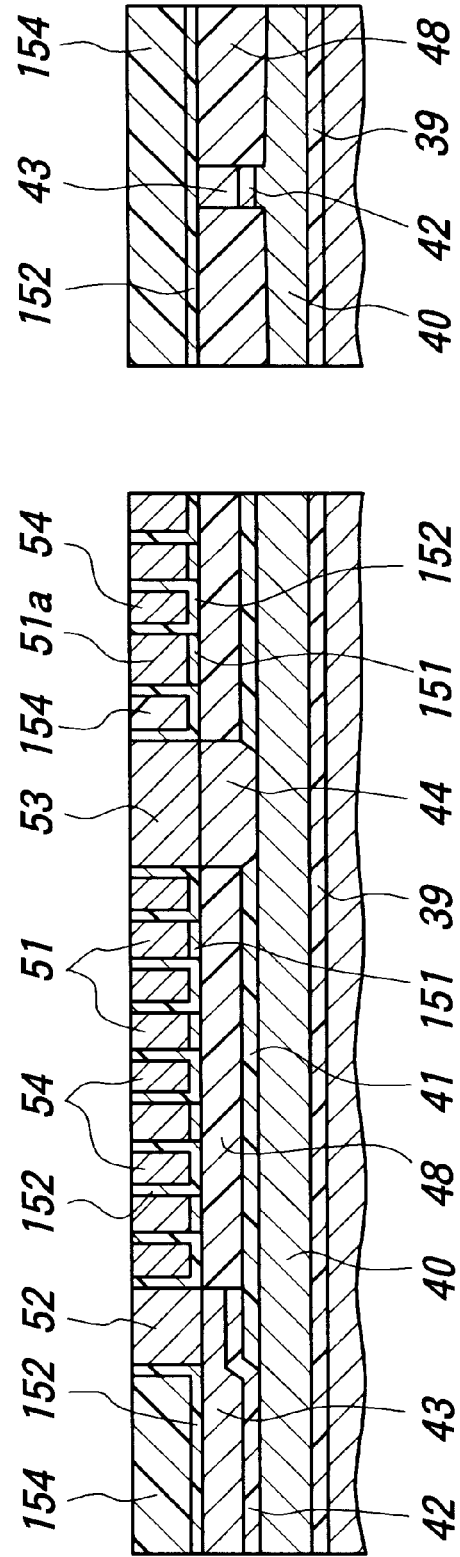

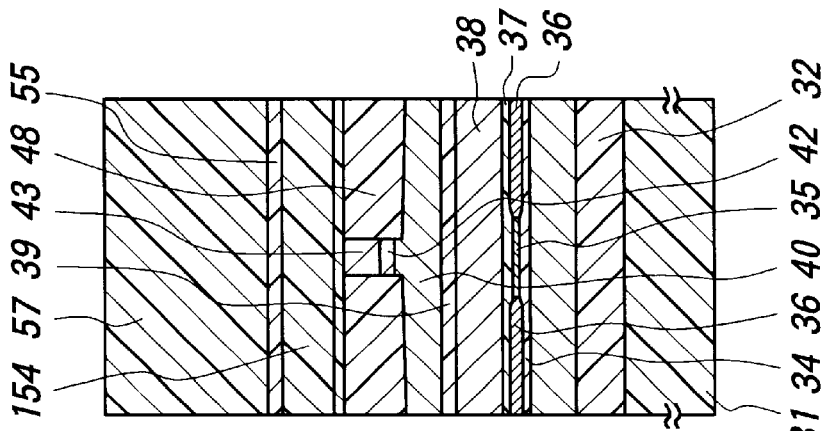
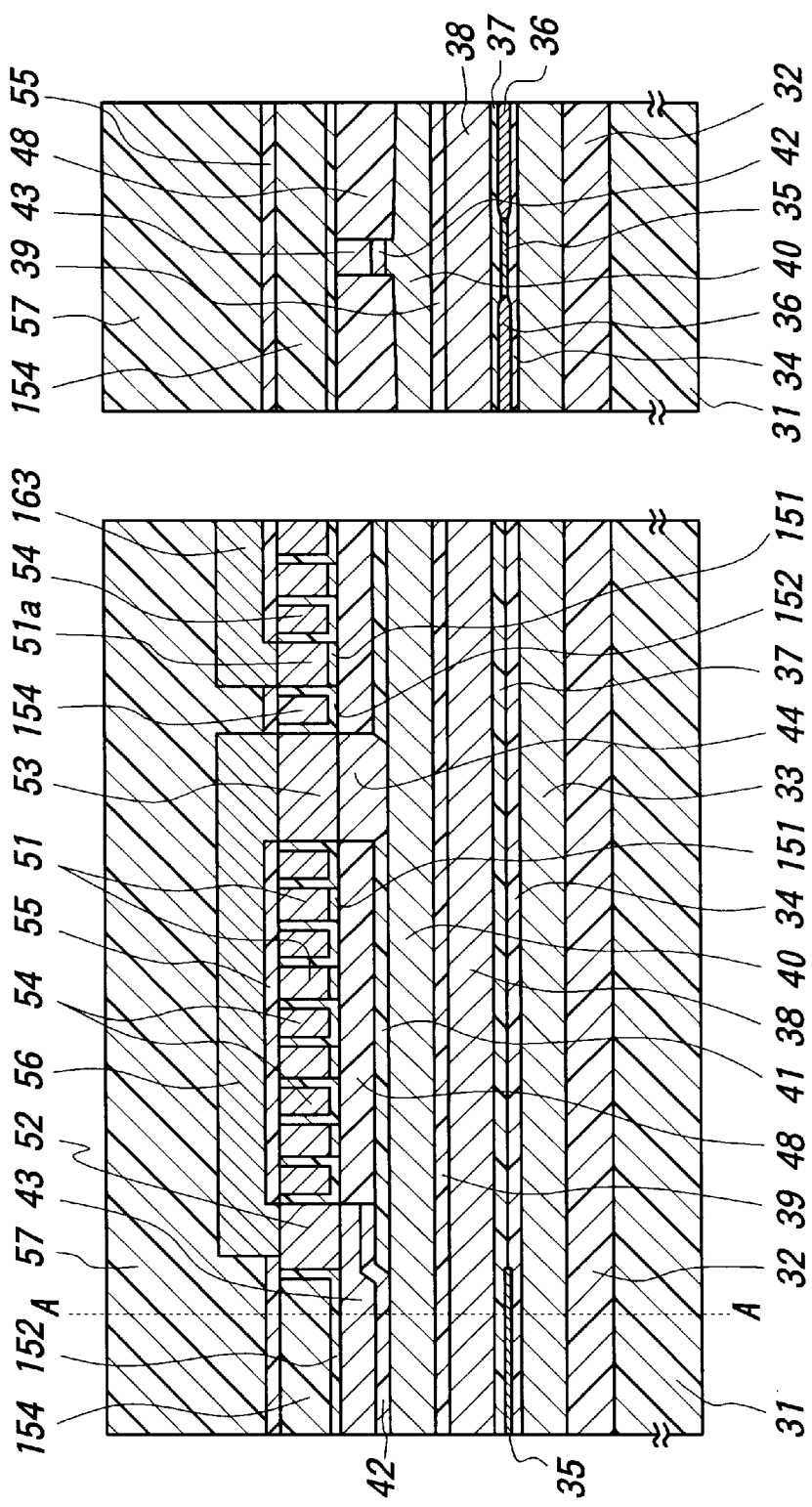

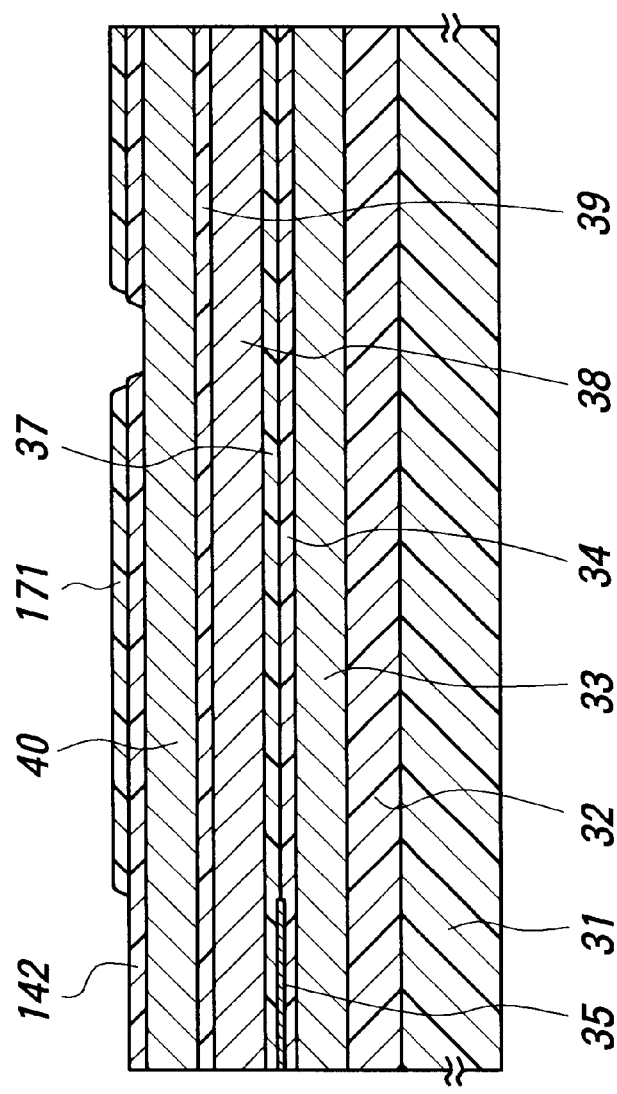
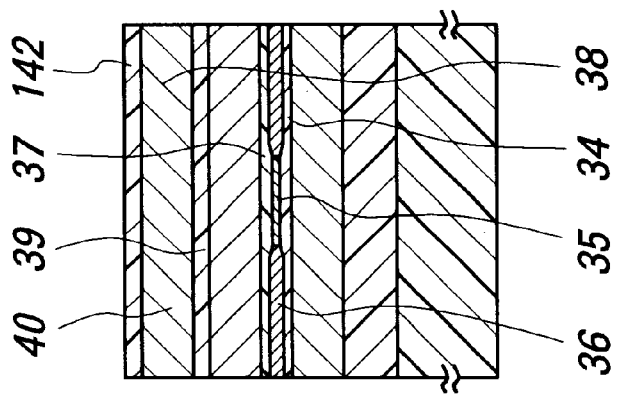

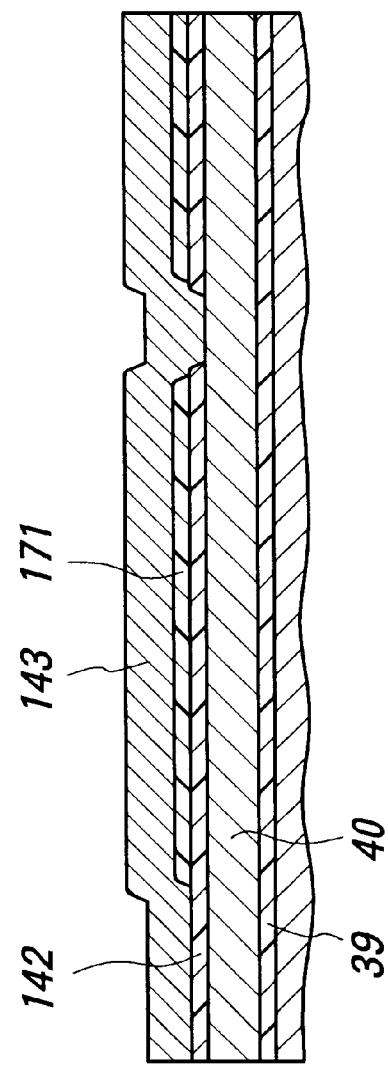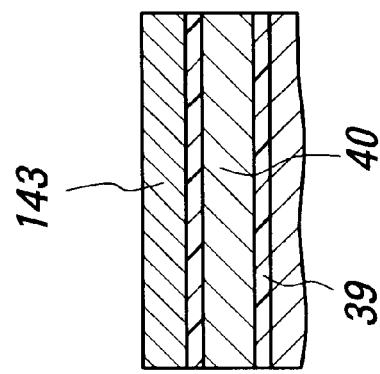

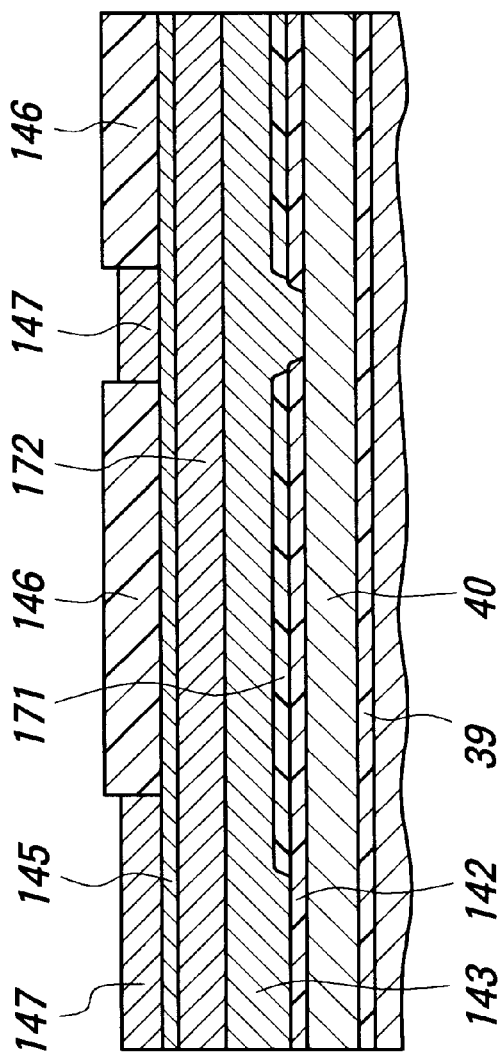
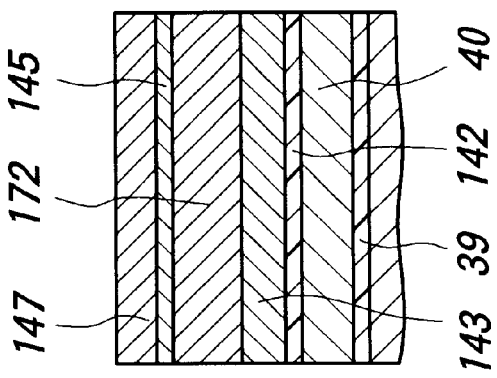
FIG. 28A
FIG. 28B

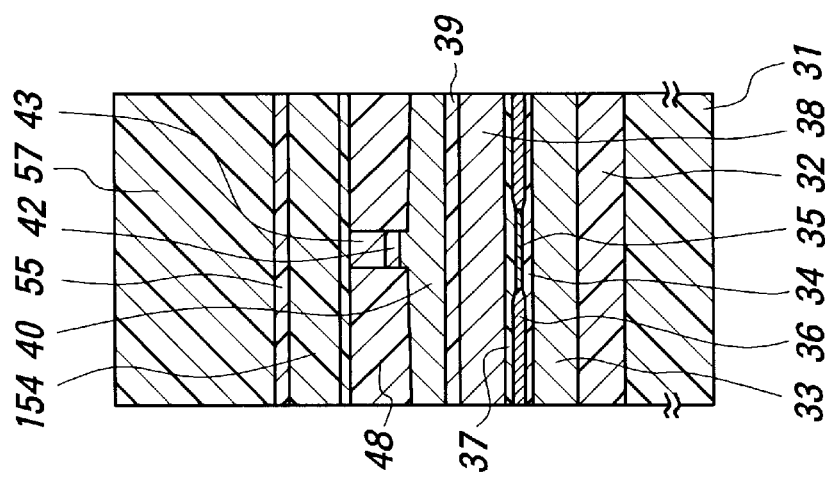
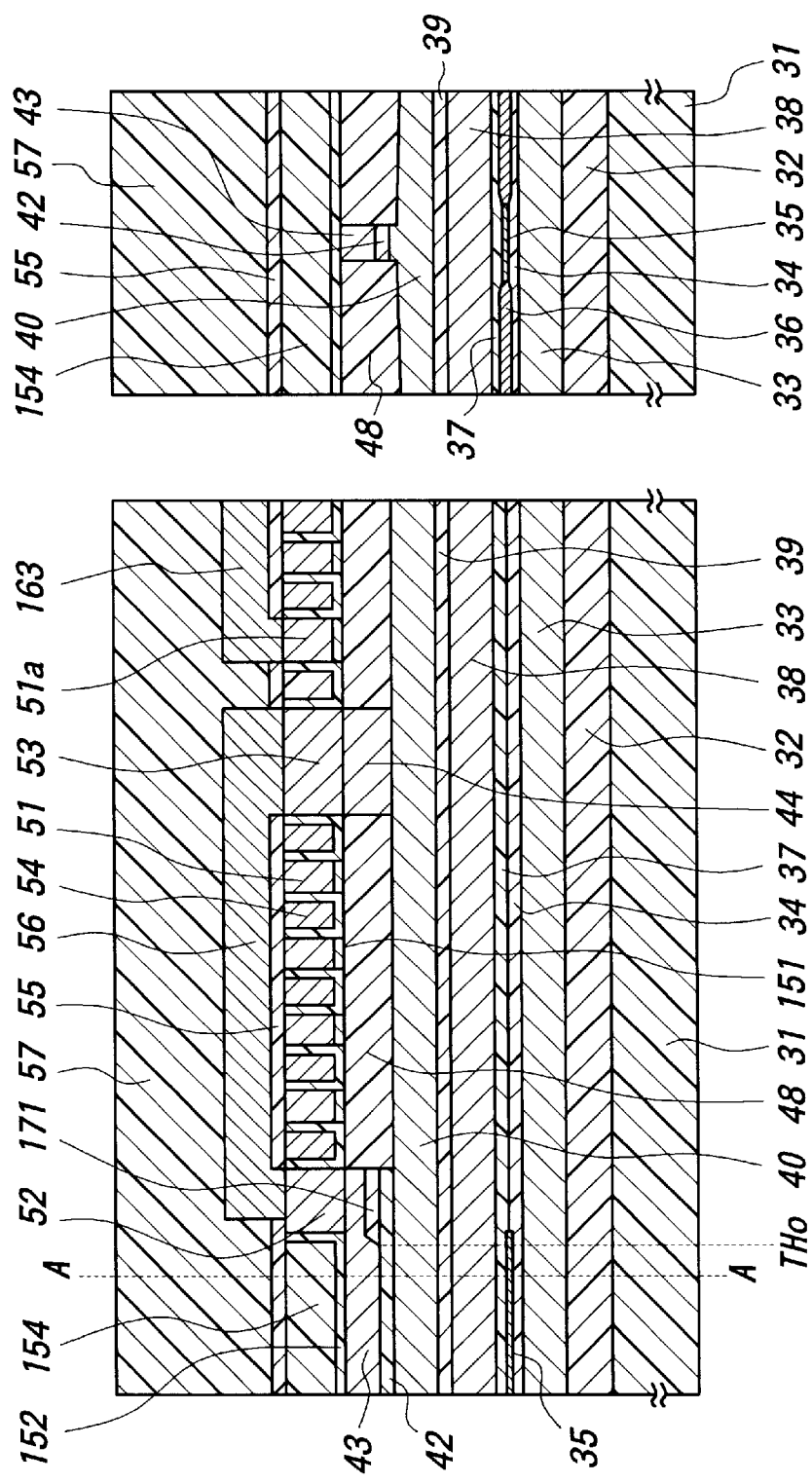

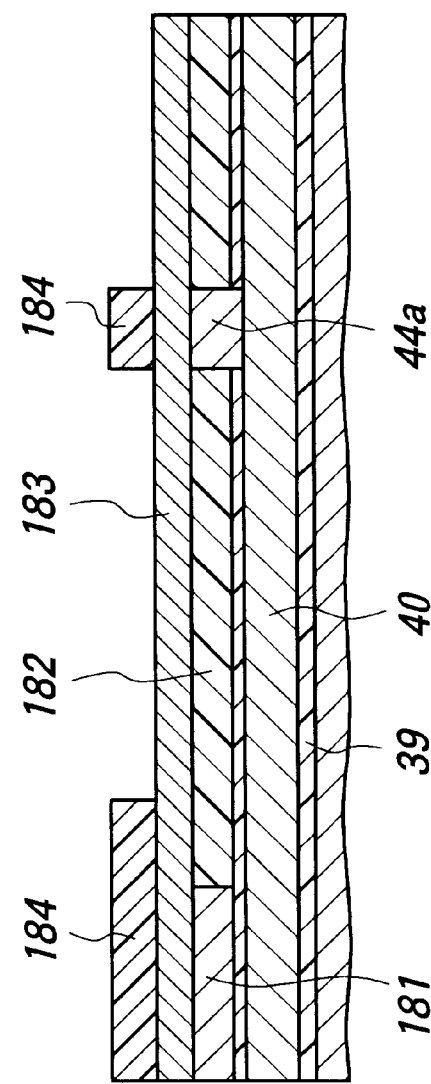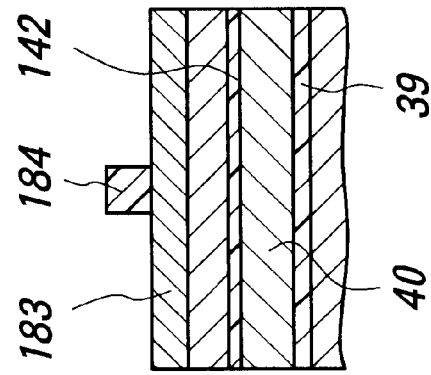

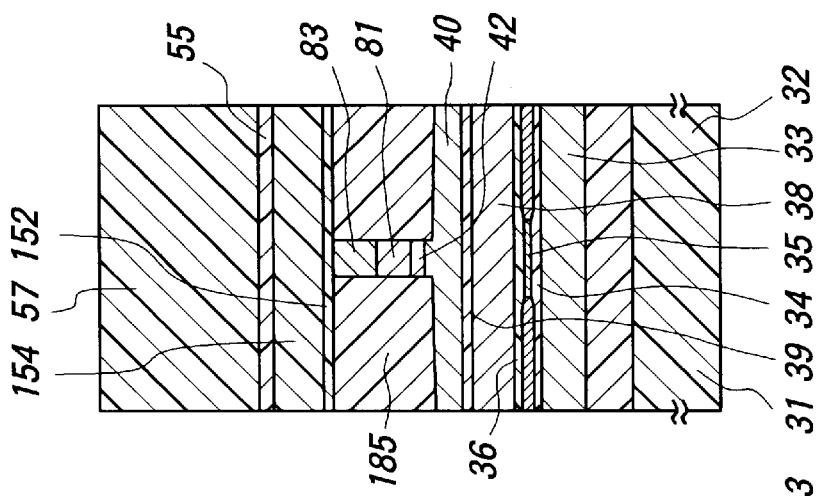
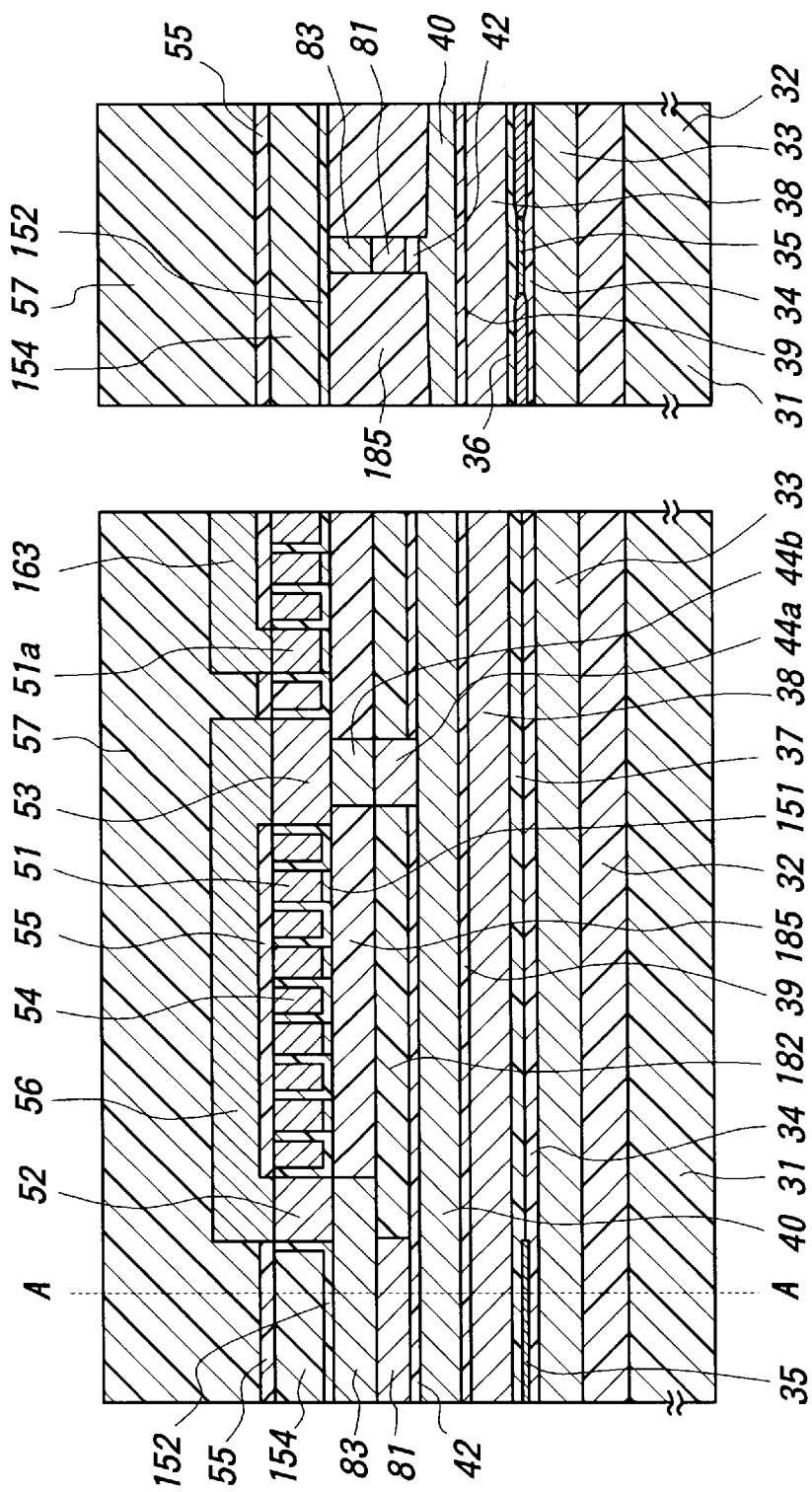

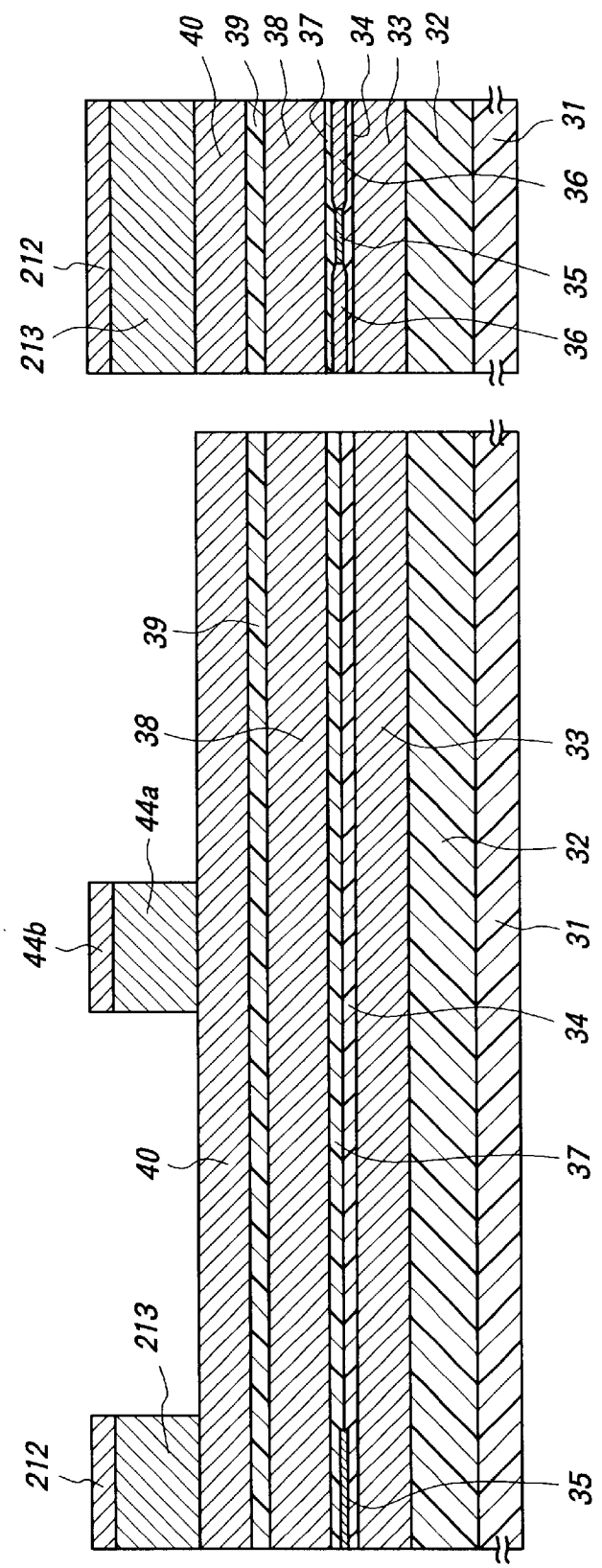

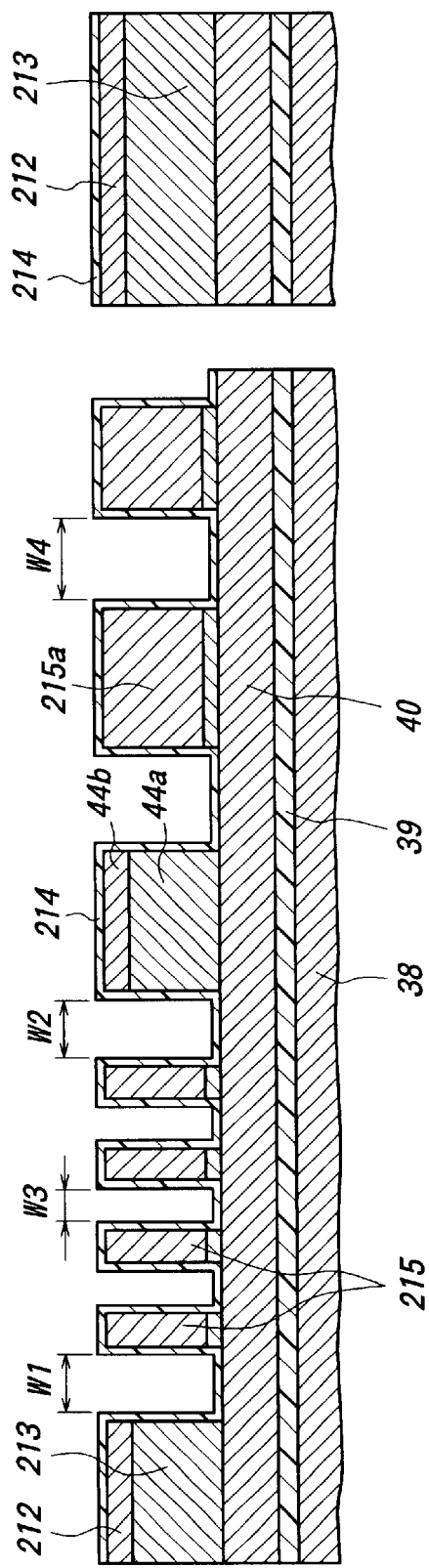
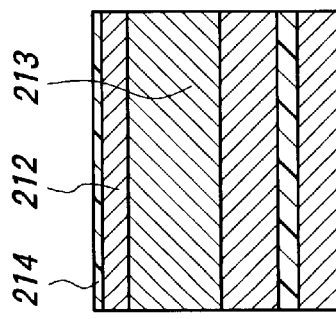

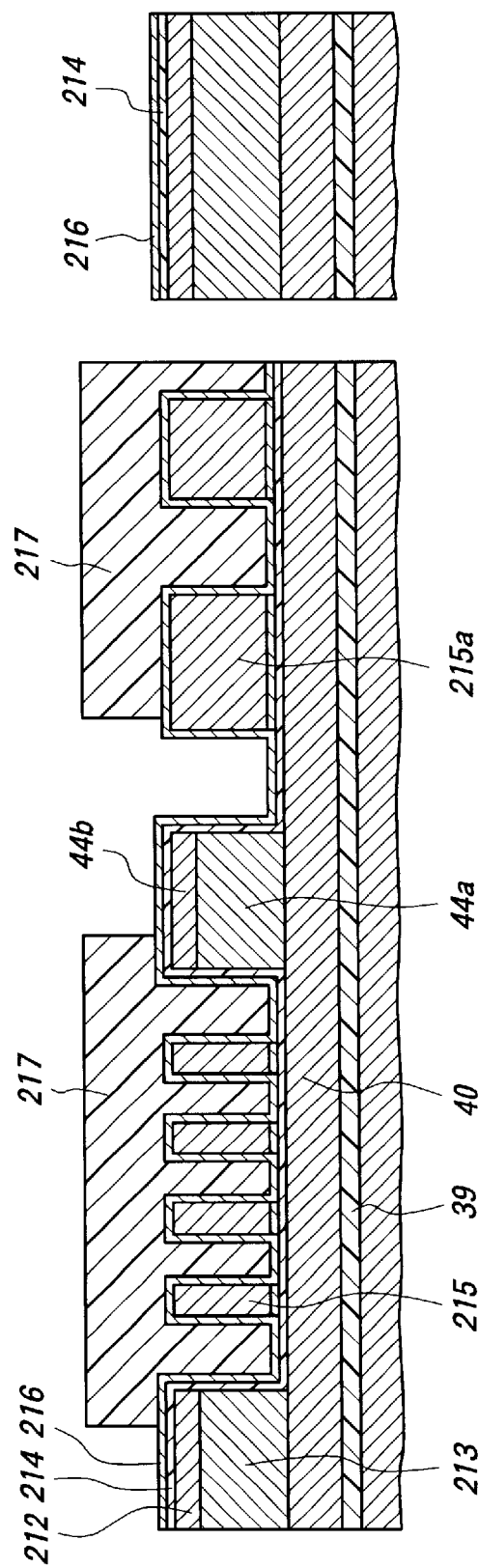

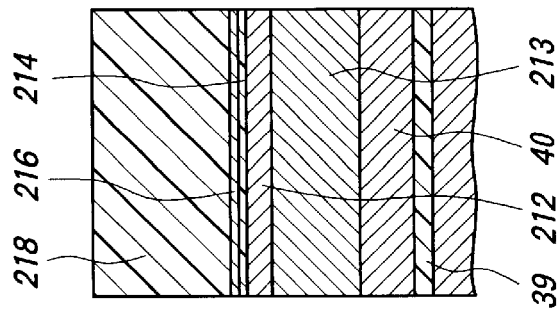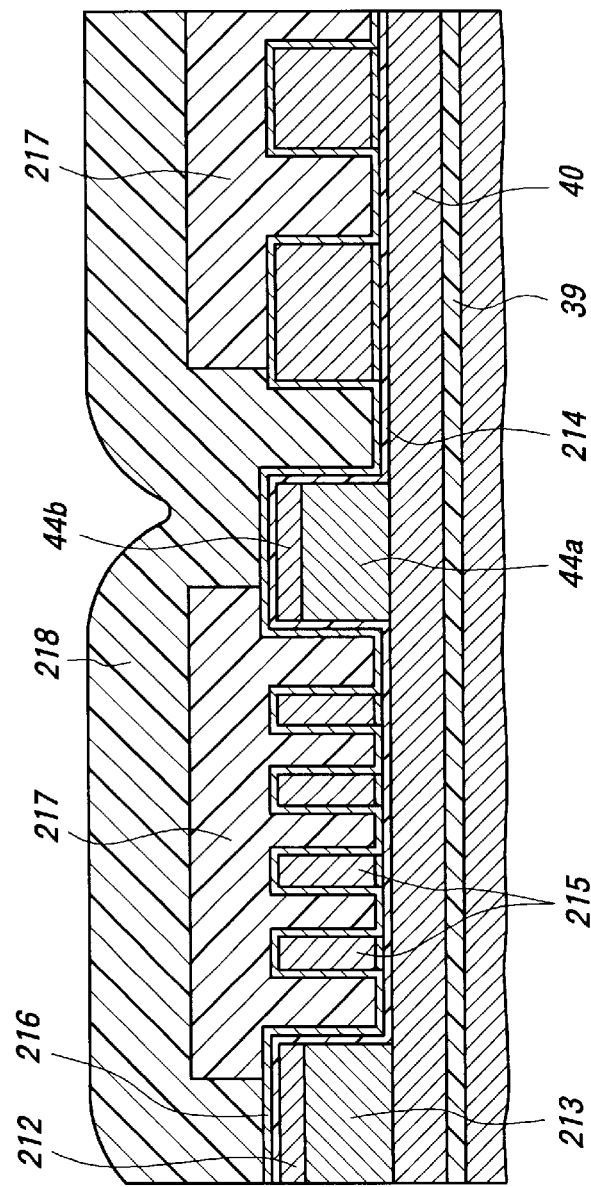

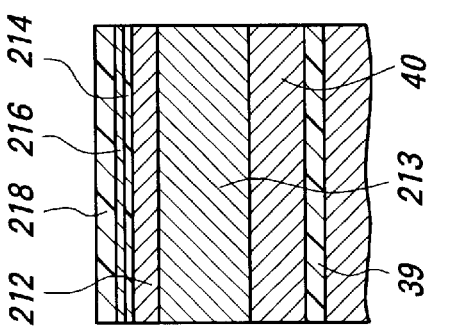
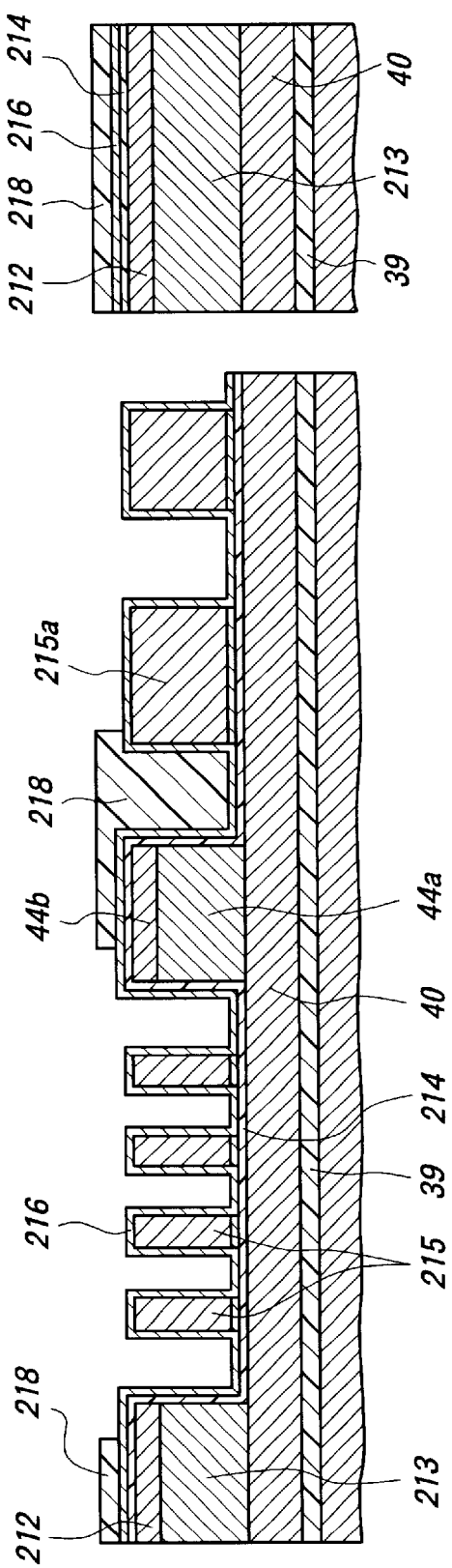

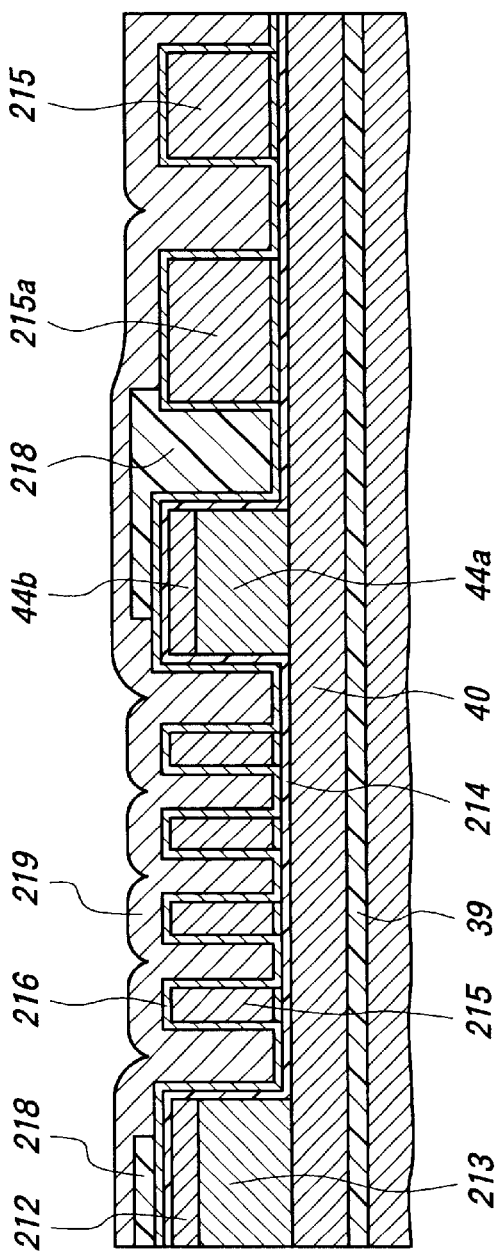

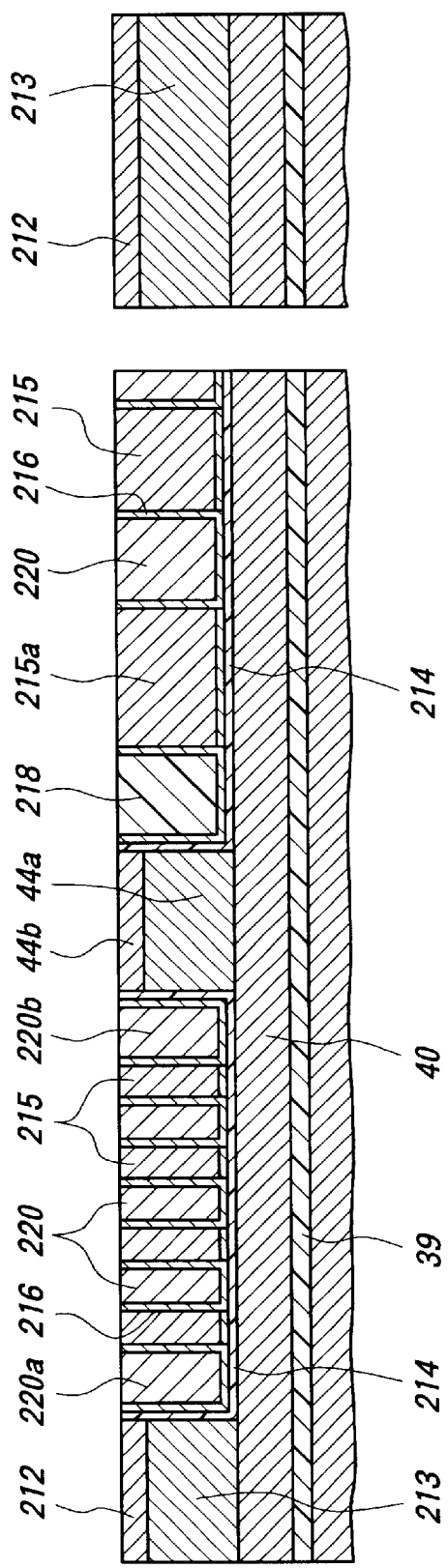

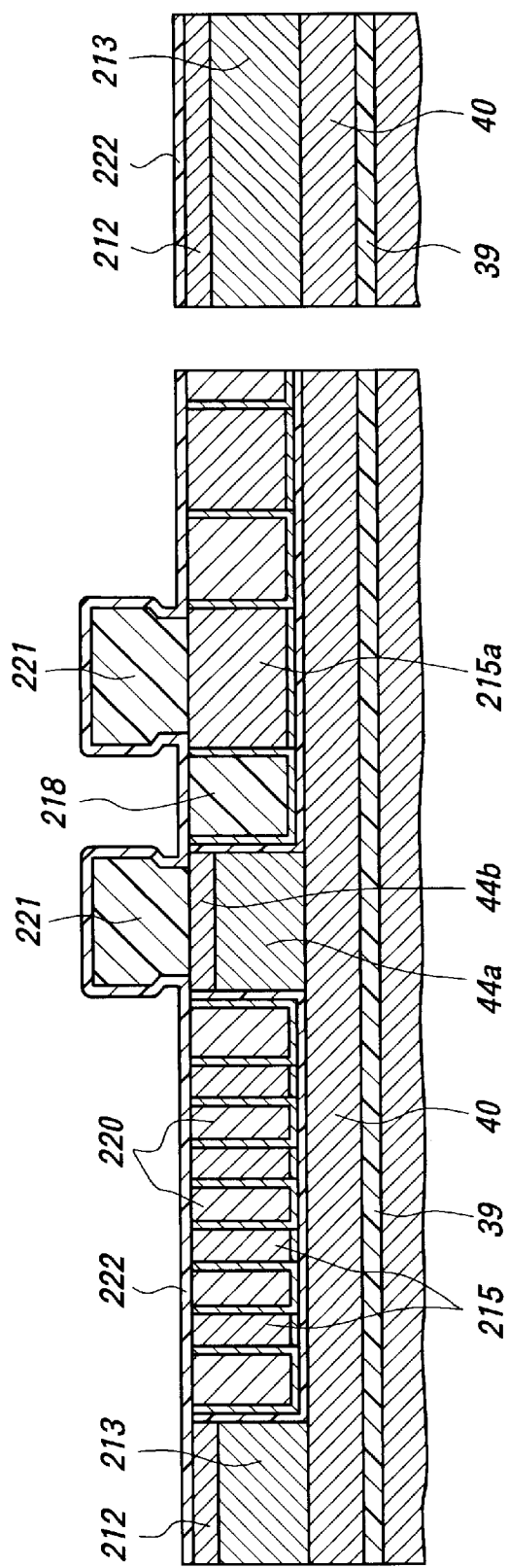

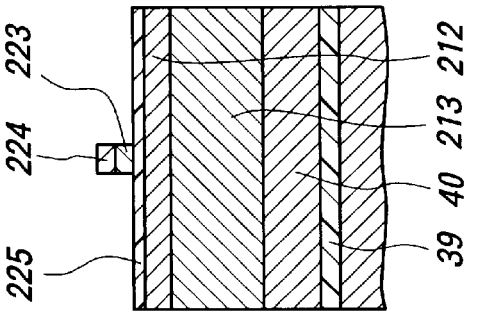
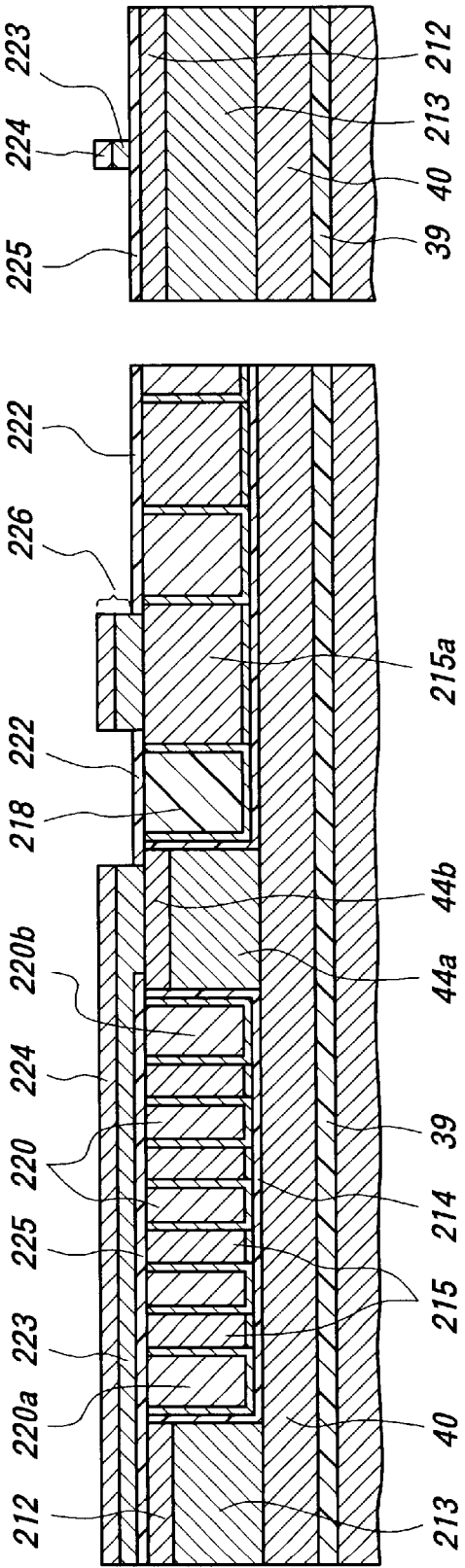
FIG. 56A
FIG. 56B

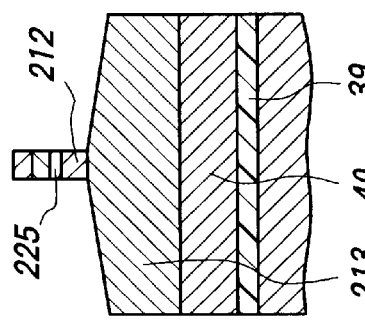
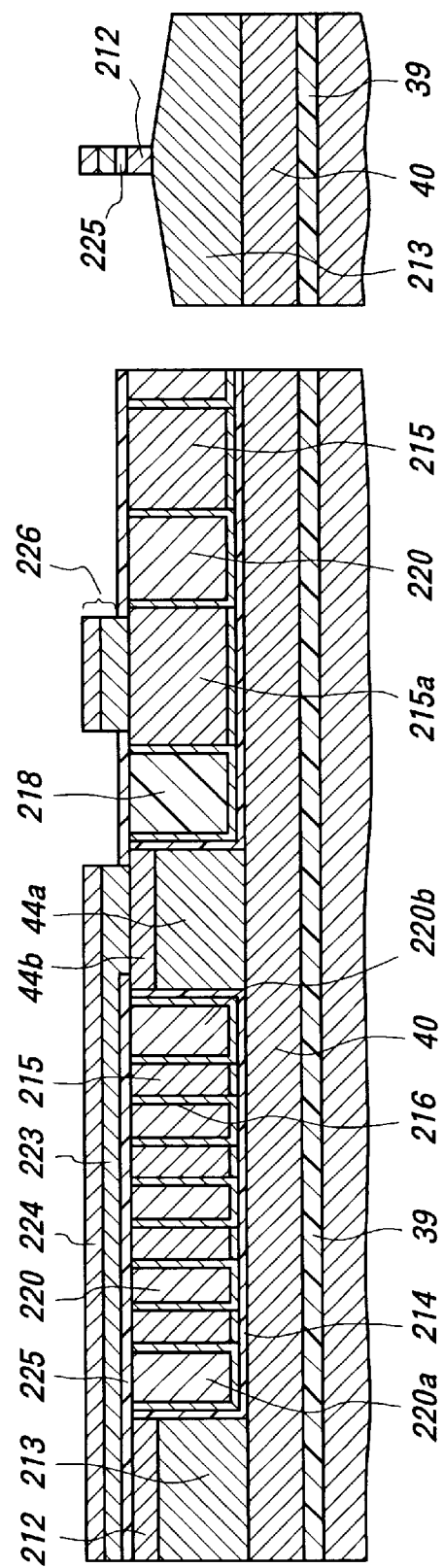

THIN FILM MAGNETIC HEAD AND METHOD OF MANUFACTURING THE SAME

BACKGROUND OF THE INVENTION

1. Field of the Invention

The present invention relates to a thin film magnetic bead and a method of manufacturing the same, and more particularly relates to a combination type thin film magnetic head having an inductive type writing thin film magnetic head element including a thin film coil and a magnetoresistive type reading thin film magnetic head element stacked one on the other, and a method of manufacturing the same. More particularly, the present invention relates to a combination type thin film magnetic head and a method of manufacturing the same, in which a GMR element is used as a magnetoresistive type thin film magnetic head element and an inductive type thin film magnetic head element has a superior NTSL property by extremely shortening a magnetic path length by reducing a coil winding pitch of a thin film coil and has a narrow record track for attaining a high surface recording density on a magnetic record medium by providing a miniaturized track pole made of a magnetic material having a high saturation magnetic flux density.

2. Description of the Related Art

Recently a surface recording density of a hard disc device has been improved, and it has been required to develop a thin film magnetic head having an improved performance accordingly. A recent magnetoresistive type thin film magnetic head using a GMR (Giant Magneto-Resistive) element has a surface recording density up to 100 gigabits/inch$^2$. A combination type thin film magnetic head is constructed by stacking an inductive type thin film magnetic head intended for writing information on a magnetic record medium and a magnetoresistive type thin film magnetic head intended for reading information out of the magnetic record medium on a substrate. As a reading magneto-resistive element, a GMR element having a magnetoresistive change larger than a normal anisotropic MR element by 5–15 times has been used. In order to improve a performance of the GMR element, there have been various proposals.

In a normal anisotropic MR element, a single film of a magnetic material showing the magnetoresistive effect is utilized. Many GMR elements have a multi-layer structure having a stack of a plurality of films. A spin-valve GMR film has a relatively simple structure, generates a large resistance change under a weak magnetic field, and is suitable for a large scale manufacture. A performance of the reading head element is determined by not only the above mentioned selection of materials, but also by pattern widths such as an MR height and a track width. The track width is determined by a photolithography process and the MR height is determined by an amount of polishing for forming an air bearing surface (ABS).

At the same time, the performance of the recording magnetic head is also required to be improved in accordance with the improvement of the performance of the reproducing magnetic head. In order to increase a surface recording density, it is necessary to realize a high track density on a magnetic record medium. To this end, a pole portion of the recording thin film magnetic head element has to be narrowed in a sub-micron order, particularly not larger than 0.2 μm by utilizing the semiconductor manufacturing process. However, upon decreasing a track width by utilizing the semiconductor manufacturing process, there is a problem that a sufficiently large magnetic flux could not be obtained due to a miniaturized structure of the pole portion. In this manner, by replacing the MR film by the GMR film in the reproducing head element and by selecting a material having a high magnetoresistive sensitivity, it is possible simply to attain a desired high surface recording density.

In order to realize a sufficiently high surface recording density of about 100 gigabits/inch$^2$, it is necessary to use a record medium, i.e. a magnetic disk material having a high magnetic coercive force. If a magnetic material having a high coercive force is not used, once recorded data might be erased due to the thermal fluctuation. When a material magnetic having a high coercive force is used, recoding requires a large magnetic flux, and therefore a inductive type thin film magnetic head element must generate a large magnetic flux. Generally, in order to generate a large magnetic flux in the inductive type thin film magnetic head element, a track pole is made of a magnetic material having a high saturation magnetic flux density (Hi-Bs material having a saturation magnetic flux density not less than 1.8 T (tesla). NiFe (80:20) of 1.0 T and NiFe (45:55) have been used as a magnetic material having a high saturation magnetic flux density. Recently, CoNiFe of 1.8~2.0 T has been used. In order to use a miniaturized track pole stably, a magnetic material having saturation magnetic flux density of about 1.8 T is generally used. However, when a width of the track pole is reduced to sub-micron order, such magnetic materials could not generate a sufficiently large magnetic flux for recording stably. In this manner, it is required to use a magnetic material having a higher saturation magnetic flux density. Heretofore, when a track pole is made of a magnetic material having a high saturation magnetic flux density, a plating method has been generally used. However, in order to manufacture a track pole having a narrow width, it is preferable to use a sputtering method. From this view point, it will be advantageous to form a track pole by sputtered films of FeN having a saturation magnetic flux density of 2.0 T FeCo of 2.4 T.

FIGS. 1–9 are cross sectional views showing successive steps of a method of manufacturing a conventional combination type thin film magnetic head. In these drawings, A represents a cross sectional view cut along a plane perpendicular to the air bearing surface and B denotes a cross sectional view of a pole portion cut along a plane parallel to the air bearing surface. The combination type thin film magnetic head includes an inductive type recording magnetic head element provided on a magnetoresistive type reading magnetic head element.

As shown in FIGS. 1A and 1B, an alumina ($Al_2O_3$) insulating film 2 having a thickness of about 2–3 μm is deposited on a substance 1 made of AlTiC. Next, a bottom shield film 3 made of a magnetic material for magnetically shielding a GMR reading head element from an external magnetic field on the substrate. On the bottom shield film 3, a shield gap film 4 made of alumina is formed with a thickness of 30–35 nm by sputtering. Then, a GMR film 5 having a given layer-structure is formed, and lead electrodes 6 for the GMR film are formed by a lift-off process. Next, a top shield gap film 7 made of alumina is formed with a thickness of 30–35 nm by sputtering, and a magnetic material film 8 serving as a top shield film is formed with a thickness of about 3 μm.

Next, an isolation film 9 made of alumina is formed with a thickness of about 0.3 μm for isolating the reading GMR head element from a writing induction type thin film magnetic head element to suppress noise in a reproduced output from the GMR head element. After that, a bottom pole 10 of the recording head element made of permalloy is formed with a thickness of 1.5–2.0 μm. The bottom pole 10 is formed by a plating film of CoNiFe. It should be noted that in the drawings a ratio of thickness of various portions does not exactly correspond to an actual ratio. For instance, the isolation film 9 is shown to have a smaller thickness.

Next, as depicted in FIGS. 2A and 2B, on the bottom pole 10, is formed a write gap film 11 made of a non-magnetic material to have a thickness of about 100 nm, and a top track pole 12 made of a permalloy which is a magnetic material having a high saturation magnetic flux density is formed in accordance with a given pattern. At the same time, a bridge portion 13 for magnetically coupling the bottom pole 10 with a top pole to be formed later at a back-gap is formed. The top track pole 12 and bridge portion 13 are formed by plating with a thickness of about 3–4 μm.

Then, in order to avoid a widening of an effective track width, i.e. in order to prevent a magnetic flux from extending at the bottom pole 10 during a writing operation, the write gap film 11 and the underlying bottom pole 10 around the top track pole 12 are etched by ion milling to form a so-called trim structure. After that, forming an alumina insulating film 14 having a thickness of about 3 μm over a whole surface, a surface is flattened by the chemical mechanical polishing (CMP) as shown in FIGS. 3A and 3B.

Next, as illustrated in FIGS. 4A and 4B, in order to form a thin film coil by the electrolytic plating of Cu, a thin seed layer 15 having a thickness of about 100 nm is formed by sputtering. After forming a resist film having a given opening pattern on the seed layer, a first layer thin film coil 16 is formed with a thickness of 1.5 μm in accordance with a given pattern by a plating process using a copper sulfate liquid. Then, after removing the resist film, the exposed seed layer 15 is removed by an ion milling process using an argon ion beam as depicted in FIGS. 5A and 5B. In this manner, the seed layer 15 is removed to separate coil windings to form a coiled conductor. During the ion milling, in order to prevent portions of the seed layer 15 projecting from side edges of the coil windings of the thin film coil 16 from being remained, the ion milling is performed at an angle of 5–10°. When the ion milling is carried out at an angle near a perpendicular angle, debris of the seed layer 15 splashed by impingement of the ion beam might be adhered again to the coil windings. Therefore, a distance between successive coil windings must be widened.

Then, as shown in FIGS. 6A and 6B, an insulating film 17 which supports the first layer thin film coil 16 in an electrically insolated manner is formed by photoresist. Next, as depicted in FIGS. 7A and 7B, a Cu seed layer 18 is formed and a second layer thin film coil 19 is formed in accordance with a given pattern with a thickness of 1.5 μm. Then, after removing the seed layer 18 by ion milling, an insulating film 20 of photoresist for supporting the second layer thin film coil 19 in an electrically insulating manner is formed. Next, as illustrated in FIGS. 8A and 8B, a top pole 21 made of permalloy is formed with a thickness of about 3 μm such that the top track pole 12 and bridge portion 13 are coupled with each other by the top pole 21, and a whole surface is covered with an overcoat film 22 made of alumina. It should be noted that during the formation of the second thin film coil 19, a connect portion 23 for connecting inner portions of the first and second thin film coils 16 and 19 is formed. Finally, an end surface into which the GMR film 5, write gap film 11, top track pole 12 and so on are exposed is polished to form an air bearing surface ABS to complete a slider. In a manufacturing process for forming an actual thin film magnetic head, after forming a number of the above mentioned structures on the wafer, the wafer is divided in a plurality of bars in each of which a number of thin film heads are aligned. Then, a side edge of the bar is polished to obtain the air bearing surface ABS.

FIG. 9 shows schematically a cross sectional view and a plan view illustrating the structure of the known combination type thin film magnetic head manufactured in the manner explained above. The bottom pole 10 has a large area, but the top track pole 12 and top pole 21 have a smaller area than the bottom pole. One of factors determining the performance of the writing head element is a throat height TH. The throat height TH is a distance from the air bearing surface ABS to an edge of the insulating film 14, and this distance is desired to be short. One of factors determining the performance of the reading head element is an MR height MRH. This MR height (MRH) is a distance from the air bearing surface ABS into which one edge of the GMR film 15 is exposed to the other edge of the GMR film. During the manufacturing process, a desired MR height MRH is obtained by controlling an amount of polishing the air bearing surface ABS.

There is another factor determining the performance of the thin film magnetic head together with the above mentioned throat height TH and MR height MRH. This factor is an apex angle θ, which is defined by an angle formed by a tangential line to a side wall of the insulating film 17 isolating the thin film coil 16 and an upper surface of the top pole 21. In order to miniaturize the thin film magnetic head, it is required to increase the apex angle θ as large as possible.

Now problems in the known combination type thin film magnetic head mentioned above will be explained. After forming the insulating film 17, 20 such that the thin film coil 16, 19 is supported by the insulating film in an electrically insulating manner, the top pole 21 is formed. In this case, the top pole 21 has to be formed into a given pattern along the side wall of the insulating film 17, 20. To this end, a photoresist is formed with a thickness of 3–4 μm at a step of the insulating film having a height of about 7–10 μm. Now it is assumed that at the side wall of the insulating film 16, 19, the photoresist should have a thickness of at least 3 μm, a thickness of the photoresist at the bottom of the step would become thick such as 8–10 μm. Since a width of record track of the writing head is mainly determined by a width of the top track pole 12, it is not necessary to miniaturize the top pole 21 compared with the top track pole 12, but if the track width of submicron order such as 0.2 μm is desired, the pole portion of the top pole 21 should be miniaturized in the order of submicrons.

Upon forming the top pole 21 into a desired pattern by plating, the photoresist has to be deposited on the top track pole 12 and insulating film 17, 20 having the step of more than 10 μm such that the photoresist has a uniform thickness. Then, the photoresist is subjected to the exposure of light to form the top pole 21 having the pole portion of submicron order. That is to say, a pattern of submicron order should be formed with the photoresist having a thickness of 8–10 μm. When the pole portion 21 is formed by plating, a seed layer made of permalloy serving as an electrode is previously formed. During the light exposure of the photolithography, light is reflected by the permalloy seed layer, and a desired pattern might be deformed. Therefore, it is quite difficult to form the pattern of submicron order precisely.

In order to improve the surface recording density, it is required to miniaturize the pole portion as explained above. Then, the miniaturized pole portion must be made of a magnetic material having a high saturation magnetic flux density. In general, FeN and FeCo have been known as magnetic materials having a high saturation magnetic flux density. However, these magnetic materials could not be easily formed by sputtering into a film having a given pattern. It has been known to shape the sputtered film into a given patter by the ion milling. However, etching rate is too slow and a track width of submicron order could not be controlled precisely.

NiFe, CoNiFe, FeCo have been known to have a high saturation magnetic flux density, and these magnetic materials could be formed into a given pattern by plating. For instance, Fe rich NiFe (more than 50%) has a saturation magnetic flux density of 1.5–1.6 tesla (T), and a composition could be controlled stably. However, in order to realize a surface recording density of 80–100 gigabits/inch$^2$, a track width has to be not larger than 0.2 $\mu$m. Then, there would be required to use a magnetic material having a higher saturation magnetic flux density. There has been proposed to form a magnetic film by plating using CoNiFe. However, this magnetic material could provide the magnetic faculty of about 1.8–2.0 T. In order to realize the surface recording density of about 80–100 gigabits/inch$^2$, it is desired to use a magnetic material having a high saturation magnetic flux density such as 2T.

A high frequency performance of the induction type thin film magnetic head is also determined by a magnetic path length which is defined as a length from the throat height zero position to the back-gap. A high frequency performance of the thin film magnetic head is improved by shortening the above mentioned magnetic path length. It would be possible to shorten the magnetic path length by reducing a pitch of successive coil windings of the thin film coil, but this solution has a limitation. Then, there has been proposed to construct the thin film coil to have two coil layers as explained above. Upon forming the two-layer thin film coil, after forming a first thin film coil layer, an insulating film of photoresist is formed with a thickness of about 2 $\mu$m. This insulating layer has a round outer surface, and thus upon forming a second thin film coil layer, a seed layer for electrolytic plating has to be formed on an inclined portion. Therefore, when the seed layer is etched by the ion milling, a portion of the seed layer hidden by the inclined portion could not be removed sufficiently and coil windings might be short-circuited. Therefore, the second thin film coil has to be formed on a flat surface of the insulating layer.

For instance, it is now assumed that a thickness of the first thin film coil layer is 2–3 $\mu$m, a thickness of the insulating film formed on the first thin film coil layer is 2 $\mu$m, and an apex angle of the inclined portion of the insulating film is 45–55°, an outer surface of the second thin film coil layer must be separated from the throat height zero reference position by a distance of 6–8 $\mu$m which is twice of a distance from the throat height zero reference position to the outer surface of the first thin film coil layer. Then, a magnetic path length would be longer accordingly. When the thin film coil has space/line of 1.5 $\mu$m/0.5 $\mu$m and a total number of coil windings is eleven, six coil windings are provided in the first thin film coil layer and five coil windings are formed in the second thin film coil layer. Then, a length of the whole thin film coil becomes 11.5 $\mu$m. In this manner, in the known thin film magnetic head, a magnetic path length could not be shortened, and a high frequency property could not be improved.

In the known combination type thin film magnetic head explained above, there is a problem of miniaturizing the writing inductive type thin film magnetic head element. That is to say, by reducing the magnetic path length $L_M$, i.e. a length portions of the bottom pole 10 and top pole 21 surrounding the thin film coil 16, 19 as shown in FIG. 9, a flux rise time, non-linear transition shift NLTS and over write property of the inductive type thin film magnetic head element can be improved. In order to shorten the magnetic path length $L_M$, a coil width $L_C$ of a portion of the thin film coil 16, 19 surrounded by the bottom pole 10 and the top pole 21 has to be shortened. In the known thin film magnetic head, the coil width $L_C$ could not be shortened due to the following reason.

In order to shorten the coil width $L_c$ in the known inductive type thin film magnetic head element, a width of coil windings of the thin film coil must be shortened, and at the same time, a distance between successive coil windings must be shortened. However, in order to reduce an electric resistance of the thin film coil, a width of coil winding should be shortened only with a limitation. When the thin film coil is made of copper having a high conductivity, a width of coil winding could not be reduced less than 1.5 $\mu$m, because a height of the thin film coil is limited to 2–3 $\mu$m. If a width of coil winding is shortened not larger than 1.5 $\mu$m, a property of the GMR film 15 might be deteriorated due to heat generated by the thin film coil. Furthermore, the bottom pole 10 and top pole 21 are also heated to expand and a serious problem of pole protrusion might occur and the thin film magnetic head might be brought into contact with the record medium. Therefore, in order to reduce the coil width $L_C$ without shortening a width of coil winding, a distance between successive coil windings must be shortened.

In the known thin film magnetic head, a distance between coil windings of the thin film coil 16, 19 could not be shortened. Now a reason of this will be explained. As explained above, the coil windings of the thin film coil are formed by the electrolytic plating method using the copper sulfate liquid. In order to deposit a copper film uniformly within the opening formed in the resist film formed on the seed layer, the seed layer is first formed with a thickness of 100 nm, and then the copper film deposited by the electrolytic plating on the seed layer through the opening formed in the resist film to form the coil windings. After that, the seed layer is selectively removed to separate the coil windings. The seed layer is removed by the ion beam milling using, for instance an argon gas, while the coil windings are used as a mask.

In order to remove the seed layer between successive coil windings, it is preferable to perform the ion beam milling from a direction perpendicular to the wafer surface. However, this result in a re-deposition of debris of the seed material and successive coil windings might not be separated well, and thus a distance between successive coil windings could not be shortened. Such a problem could be solved by effecting the ion beam milling at an angle of 5–10°, a sufficient ion irradiation could not be attained at a shadow portion of the photoresist film and the seed layer might be remained partially. Therefore, a distance between successive coil windings could not be shortened in order to prevent an insufficient insulation between coil windings. In the known thin film magnetic head, a distance between successive coil windings is long such as 0.3–0.5 $\mu$m. If a distance between successive coil windings is shortened less than the above value, the above mentioned problem might occur.

When the thin film coil 16, 19 is formed by the electrolytic plating method as explained above, in order to keep a thickness of the thin film coil uniformly, a plating liquid such as a copper sulfate must be stirred during the plating. If a width of a wall defining the opening in the photoresist film is shorted in order to shorten a distance between successive coil windings, the thin wall might be broken due to the stirring of the plating liquid. Then, the thin film coil could not be formed accurately. Also from this point of view, a distance between successive coil windings of the thin film coil could not be shortened.

The NLTS property of the inductive type thin film magnetic head could be improved by increasing the number of coil windings of the thin film coil. In order to increase the number of coil windings without increasing the magnetic path length, the number of thin film coil layers has to be increased to four or five layers. However, then an apex angle might be increased and a narrow track width could not be attained. In order to keep an apex angle within a given range, it is preferable to limit the number of thin film coil layers to not larger than three, preferably two. Then, the number of coil windings could not be increased and the NLTS property could not be improved.

Furthermore, when two thin film coil layers are provided as explained above, the second layer thin film coil 19 could not be formed perpendicularly, because the insulating film 17 is not flat, but is inclined at a peripheral portion of the second layer thin film coil. For instance, when a thin film coil having a space not larger than 0.3 µm with a thickness not less than 1.5 µm, argon ions could not effectively go onto the seed layer 18 between successive coil windings at a portion in which the thin film coil is not formed perpendicularly. Moreover, since an angle of the ion milling differs between a central portion and a peripheral portion of the wafer, the seed layer 18 could not be removed sufficiently and might be remained partially. When a space between successive coil windings is short, even if argon particles enter into this narrow space, Cu particles carried out together with argon particles might be deposited on side wall of the coil windings. Such etching debris might short-circuit the coil windings.

In Japanese Patent Application Laid-open Publication Kokai Sho 55-41012, there is disclosed a thin film coil, in which first and second thin film halves are arranged alternately with interposing therebetween an insulating film. In FIG. 7 of the Publication, there is shown a thin film coil, in which first and second thin film coils of a first layer thin film coil are formed as coils of anti-clockwise direction, and first and second thin film coil halves of a second layer thin film coil are formed as coil of a clockwise direction, and inner contact pads are connected to each other and outer contact pads are connected to each other such that an electric current flows in a same direction. However, in this known thin film coil, after forming the first thin film coil half, an insulating film and a conductive film are formed on a whole surface by sputtering or vacuum deposition, and a mask is formed selectively on the conductive film. After that, a portion of the conductive film formed above the first thin film coil half is selectively etched such that a portion of the conductive film deposited in a space between successive coil windings of the first thin film coil half is remained to form the second thin film coil half. Therefore, the first and second thin film coil halves are not formed in a self-aligned manner and a distance between successive coil windings could not be shortened in the order of submicrons.

One of the inventors of the present application has proposed in U.S. Pat. Nos. 6,191,916 and 6,204,997 a method of manufacturing a thin film coil, in which after forming a first thin film coil half by the electrolytic plating process using a seed layer, a thin insulating film and a seed layer are formed on a whole surface, a photoresist film having openings at portions corresponding to spaces of successive coil windings of the first thin film coil half is formed, and a second thin film coil half is formed by the electrolytic plating process using the photoresist film as a mask. In this method of manufacturing the thin film coil, the first and second thin film coil halves can be formed accurately by the electrolytic plating.

However, since use is made of the photoresist film having a given patter of openings for forming the second thin film coil half, the first and second thin film coil halves could not be formed in a self-aligned manner. Therefore, it is difficult to shorten a space between successive coil windings in the order of quartermicrons.

SUMMERY OF THE INVENTION

The present invention has for its object to provide a thin film magnetic head, in which a coil width $L_C$ of a thin film coil of an inductive type thin film magnetic head is shortened by decreasing a space between successive coil windings and a magnetic path length $L_M$ is shortened to improve a performance of the head.

It is further object of the invention to provide a method of manufacturing easily and precisely a thin film magnetic head, in which a coil width $L_C$ of a thin film coil of an inductive type thin film magnetic head is shortened by decreasing a space between successive coil windings and a magnetic path length $L_M$ is shortened to improve a performance of the head.

It is another object of the invention to provide a combination type thin film magnetic head, in which a high frequency characteristic is improved by shortening a magnetic path length and a surface recording density can is improved by providing a fine pole chip of the order to quartermicrons, while undesired side write can be avoided.

It is still another object of the invention to provide a method of manufacturing a combination type thin film magnetic head, in which a high frequency characteristic is improved by shortening a magnetic path length and a surface recording density can is improved by providing a fine pole chip of the order to quartermicrons, while undesired side write can be avoided.

According to the invention, a thin film magnetic head comprises:
  a first magnetic member made of a magnetic material and including a pole portion which is to be opposed to a magnetic record medium;
  a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
  a write gap film made of a non-magnetic material and being sandwiched between said pole portions of the first and second magnetic members at least at the air bearing surface;
  a thin film coil having a portion arranged between said first and second magnetic members in an electrically isolated manner; and
  a substrate for supporting said first and second magnetic members, write gap film and thin film coil;
wherein said thin film coil comprises:
  a first thin film coil half having coil windings mutually separated by a given distance;
  a second thin film coil half having coil windings which are formed between successive coil windings of the first thin film coil half in a self-aligned manner;

an insulating film formed to embed spaces between successive coil windings of the first and second thin film coil halves; and a jumper wiring connecting electrically an innermost coil winding of one of the first and second thin film coil halves to an outermost coil winding of the other of the first and second thin film coil halves.

According to the invention, a combination type thin film magnetic coil including a substrate, an inductive type thin film magnetic head element and a magnetoresistive type thin film magnetic head element, said inductive and magnetoresistive type thin film magnetic head elements being stacked on the substrate to define an air bearing surface;

wherein said inductive type thin film magnetic head element comprises:

a first pole made of a magnetic material and extending inwardly from the air bearing surface;

a write gap film made of a non-magnetic material and formed on one surface of the first pole to extend inwardly from the air bearing surface over a distance at least equal to a length of a track pole;

a bottom track pole made of a magnetic material and formed on a surface of the write gap film opposite to a surface which is brought into contact with the first pole to extend inwardly from the air bearing surface over a distance at most equal to a length of the track pole;

a first non-magnetic material film extending inwardly over a given distance such that the first non-magnetic material film has a flat surface which is coplanar with a second surface of the bottom track pole opposite to a first surface which is brought into contact with the write gap film and an outer end surface of the non-magnetic material film which is brought into contact with an inner end surface of the bottom track pole remote from the air bearing surface defines a throat height zero reference position;

a top track pole made of a magnetic material and formed on the coplanar flat surface of the bottom track pole and first non-magnetic material film to form a track chip portion extending inwardly from the air bearing surface at least to the outer end surface of the first non-magnetic material film and an end surface of the track chip portion is exposed to the air bearing surface and a contact portion which is continued from the track chip portion and has a width larger than a width of the track chip portion;

a second non-magnetic material film made of a non-magnetic material and formed to surround an aligned side surface of the bottom track pole, first non-magnetic material film and top track pole and have a flat surface which forms a coplanar flat surface together with a second surface of the top track pole opposite to a first surface which is brought into contact with a flat coplanar surface of the top track pole, bottom track pole and first non-magnetic material film;

a thin film coil formed in an electrically isolated manner in an inner region with respect to an end surface of the second non-magnetic material film which is brought into contact with an end surface of the contact portion of the top track pole; and a second pole made of a magnetic material and formed such that one end of the second pole is magnetically coupled with the contact portion of the top track pole and the other end of the second pole is magnetically coupled with the first pole at the back gap remote from the air bearing surface, said first and second poles surrounding a part of the thin film coil;

wherein said thin film coil comprises:

a first thin film coil half having coil windings mutually separated by a given distance;

a second thin film coil half having coil windings which are formed between successive coil windings of the first thin film coil half in a self-aligned manner;

an insulating film formed to embed spaces between successive coil windings of the first and second thin film coil halves; and a jumper wiring connecting electrically an innermost coil winding of one of the first and second thin film coil halves to an outermost coil winding of the other of the first and second thin film coil halves.

According to the invention, a combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;

wherein said inductive type thin film magnetic head element comprises:

a bottom pole made of a magnetic material and formed on the substrate to extend inwardly from the air bearing surface;

a bottom track pole made of a magnetic material and formed on one surface of the bottom pole to extend inwardly from the air bearing surface over a distance equal to a length of a track portion;

a bridge portion made of a magnetic material and formed on one surface of the bottom pole to define a back gap remote from the air bearing surface;

a thin film coil formed on the one surface of the bottom pole, one surface of the thin film coil opposite to the bottom pole forming a flat coplanar surface together with the bottom track pole;

a write gap film made of a non-magnetic material and formed the flat coplanar surface of the bottom track pole and thin film to form a flat surface; and a bottom pole made of a magnetic material and formed on the flat surface of the thin film coil opposite to the bottom track pole such that the bottom pole includes a top track pole aligned with the bottom track pole and is brought into contact with said bridge portion;

wherein said thin film coil comprises:

a first thin film coil half having coil windings mutually separated by a given distance;

a second thin film coil half having coil windings which are formed between successive coil windings of the first thin film coil half in a self-aligned manner;

an insulating film formed to embed spaces between successive coil windings of the first and second thin film coil halves;

a first jumper wiring connecting electrically an innermost coil winding of one of the first and second thin film coil halves to an outermost coil winding of the other of the first and second thin film coil halves; and a second jumper wiring having one end connected to an innermost coil winding of the other of the first and second thin film coil halves.

In the thin film magnetic head and combination type thin film magnetic head according to the invention, it preferable that the coil windings of the first thin film coil half are formed by electrolytic plating and the coil windings of the second thin film coil half are formed by CVD. More particularly, it preferable that the coil windings of the first thin film coil half are formed by electrolytic plating of copper and the coil windings of the second thin film coil half are formed by Cu-CVD. However, according to the invention, the coil windings of the first and second thin film coil halves may be formed by electrolytic plating of copper. Furthermore, the insulating film provided between successive coil windings of the first and second thin film coil halves has a preferably a thickness of 0.03–0.15 µm. This insulating film may be made of an inorganic material such as alumina, silicon oxide and silicon nitride, and more particularly the insulating film may be preferably made of alumina-CVD.

In the thin film magnetic head and combination type thin film magnetic head according to the invention, since the thin film coil is formed by the first and second thin film coil halves and spaces between successive coil windings of the first thin film coil half are set to a value slightly larger than a width of the coil windings, successive coil windings of the second thin film coil half can be formed in these spaces in a self-aligned manner. Therefore, distances between successive coil windings of the first and second thin film coil halves can be extremely shortened and a magnetic path length can be shortened. Then, characteristics such as the flux rise time property, NLTS property and over write property can be improved.

In the thin film magnetic head and combination type thin film magnetic head according to the invention, a space between successive coil windings of the first and second thin film coil halves may be preferably not larger than 0.2 µm, and more particularly may be preferably set to a value within a range of 0.03–0.15 µm. If a space between successive coil windings is smaller than 0.03 µm, the coil windings could not be isolated well. If a space between successive coil windings is larger than 0.2 µm, a magnetic path length of the thin film magnetic head could not be shortened effectively. As explained above, according to the present invention, by reducing a space between successive coil windings to not larger than 0.2 µm, particularly to a value within a range of 0.03–0.15 µm, a magnetic path length can be shortened less than a half of the conventional thin film magnetic head illustrated in FIG. 9 without decreasing a width of coil windings. According to the invention, a magnetic path length can be shorter than that of the inductive type thin film magnetic heads disclosed in the above mentioned U.S. Pat. Nos. 6,191,916 and 6,204,997. In this manner, the performance of the thin film magnetic head can be improved to a large extent.

In the combination type thin film magnetic head according to the invention, it is preferable that said top track pole and bottom track pole are formed by RIE (Reactive Ion Etching) in a self-aligned manner and the surface of the second non-magnetic material film opposite to the surface which constitutes the flat coplanar surface together with the surface of the top track pole is extended toward the first pole beyond the write gap film to form a trim structure. Furthermore, the thin film coil is preferably formed on the flat coplanar surface of the top track pole and second non-magnetic material film. The top track pole may be preferably made of FeN, FeCo, CoNiFe, FeAlN or FeZrN, and the bottom track pole may be preferably made of FeN, FeCo, CoNiFe, FeAlN, FeZrN or NiFe. In this case, CoNiFe, FeCo and NiFe films may be formed as a plating film, and FeN, FeCo, FeAlN and FeZrN films may be formed as a sputtering film.

According to the invention, a method of manufacturing a thin film magnetic head comprising:

a first magnetic member made of a magnetic material and including a pole portion which is to be opposed to a magnetic record medium;

a second magnetic member made of a magnetic material and including a pole portion which constitutes an air bearing surface together with an end surface of the first magnetic member, said second magnetic member being magnetically coupled with said first magnetic member at a back gap remote from the air bearing surface;

a write gap film made of a non-magnetic material and being sandwiched between said pole portions of the first and second magnetic members at least at the air bearing surface;

a thin film coil having a portion arranged between said first and second magnetic members in an electrically isolated manner; and a substrate for supporting said first and second magnetic members, write gap film and thin film coil;

wherein said step of forming the thin film coil comprises the steps of:

forming a plurality of coil windings of a first thin film coil half mutually separated by a given distance;

forming a first insulating film over a whole surface of the first thin film coil half;

forming a conductive film on the first insulating film such that spaces between successive coil windings of the first thin film coil half;

removing a portion of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;

forming a second insulating film to cover the first and second thin film coil halves; and forming a jumper wiring connecting electrically an innermost coil winding of one of the first and second thin film coil halves to an outermost coil winding of the other of the first and second thin film coil halves.

According to the invention, a method of manufacturing a combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;

wherein a process of forming said inductive type thin film magnetic head element comprises the steps of:

forming a first pole made of a magnetic material;

forming a write gap film made of a non-magnetic material on a surface of the first pole;

forming a first magnetic material film on the write gap film;

performing a first etching process for removing the first magnetic material film except for a width which is at least equal to a distance from a position defining the air bearing surface to a throat height zero reference position;

forming a first non-magnetic material film in a space formed by the first etching process such that the first non-magnetic material film is brought into contact with the first magnetic material film at the throat height zero reference position;

polishing the first non-magnetic material film to form a flat coplanar surface together with a surface of the first magnetic material film opposite to a surface which is brought into contact with the write gap film;

forming a top track pole made of a magnetic material on the coplanar flat surface of the first magnetic material film and first non-magnetic material film to form a track chip portion extending inwardly from the air bearing surface at least to an end surface of the first non-magnetic material film and a contact portion which is continued from the track chip portion and has a width larger than a width of the track chip pole;

performing a second etching process of reactive ion etching using at least said top track pole as an etching mask to remove selectively the first non-magnetic material film and first magnetic film to form a bottom track pole;

forming a second non-magnetic material film in a space formed by the second etching process;

polishing the second non-magnetic material film to form a flat coplanar surface together with the top track pole;

forming a thin film coil in an electrically isolated manner in an inner region with respect to a boundary surface at which the first and second non-magnetic material films are adjoined; and forming a second pole made of a magnetic material such that one end of the second pole is magnetically coupled with the contact portion of the top track pole and the other end of the second pole is magnetically coupled with the first pole at a back gap remote from the air bearing surface, said first and second poles surrounding a part of the thin film coil;

wherein said step of forming the thin film coil comprises the steps of:

forming a plurality of coil windings of a first thin film coil half mutually separated by a given distance;

forming a first insulating film over a whole surface of the first insulating film;

forming a conductive film on the first insulating film such that spaces between successive coil windings of the first thin film coil half;

removing portions of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;

forming a second insulating film to cover the first and second thin film coil halves; and forming a jumper wiring connecting electrically an innermost coil winding of one of the first and second thin film coil halves to an outermost coil winding of the other of the first and second thin film coil halves.

According to the invention, a method of manufacturing a combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;

wherein a process of forming said inductive type thin film magnetic head element comprises the steps of:

forming a first magnetic material film made of a magnetic material and constituting a bottom pole;

forming, on the first magnetic material film, a second magnetic material film constituting a bottom track pole and a bridge portion of a back gap;

forming a thin film coil on the first magnetic material film to be supported in an electrically isolated manner;

polishing the second magnetic material film and thin film to obtain a flat coplanar surface;

forming, on the flat coplanar surface, a write gap film made of a non-magnetic material to have a flat surface;

forming, on the flat surface of the write gap film, a third magnetic film constituting a top track pole and top pole, said third magnetic material film being brought into contact with the bridge portion;

forming a mask on the third magnetic material film at a position at which the top track pole is to be formed;

performing an etching process for selectively removing the third magnetic material film to form the top track pole and further selectively removing a portion of the write gap film surrounding the top track pole and the underlying second magnetic material film to form the bottom track pole; and forming an overcoat film made of an electrically insulating material on a whole surface;

wherein the step of forming the thin film coil comprises the steps of:

forming, on said first magnetic material film, a plurality of coil windings of the first thin film coil half isolated from the first magnetic material film such that the coil windings are separated from each other by a given distance;

forming a first insulating film all over the first thin film coil half;

forming a second insulating film on an area except for a thin film coil forming region at which a second thin film coil half is to be formed;

forming, on said first insulating film covering the first thin film coil half, a conductive film such that spaces formed between successive coil windings of the first thin film coil half are filled with said conductive film; and removing a portion of the conductive film covering top surfaces of the coil windings of the first thin film coil half and an underlying portion of the first insulating film to form a second thin film coil half having coil windings which are formed between successive coil windings of the first thin film coil half in a self-aligned manner and are electrically isolated by the first insulating film; wherein prior to forming said third magnetic material film, contact portions provided at ends of innermost and outermost coil windings of the first and second thin film coil halves are exposed, during the formation of the third magnetic material film, a first jumper wiring for electrically connecting a contact portion at the end of the innermost coil winding of one of the first and second thin film coil halves to a contact portion of the outermost coil winding of the other of the first and second thin film coil halves and a second jumper wiring connected to a contact portion at the end of the innermost coil winding of the other of the first and second thin film coil halves are formed with a same magnetic material as that of the third magnetic material film.

In a preferable embodiment of the method of manufacturing a combination type thin film magnetic head according to the invention, after forming the first insulating film on a whole surface of the first thin film coil half and prior to forming the conductive film on the first insulating film such that spaces between successive coil windings are embedded, a third insulating film is formed to cover the thin film coil forming region, a fourth insulating film is formed selectively, and then the third insulating film is removed to form spaces between successive coil windings of the first thin film coil half. By forming the fourth insulating film while the thin film coil forming region is covered with the third insulating film, the fourth insulating film could not be inserted into the spaces formed between successive coil windings of the first thin film coil half. Moreover, when the third insulating film is made of an organic material such as photoresist, polyimide and spin-on-glass which can be easily removed by a wet chemical etching, the spaces can be easily formed between successive coil windings of the first thin film coil half.

Furthermore, after forming the conductive film constituting the coil windings of the second thin film coil half, the conductive film may be selectively removed by CMP using an alkaline slurry or a neutral slurry or by a dry etching such as ion beam milling and sputter etching. Alternatively, the second conductive film and second insulating film may be first etched roughly by CMP and then may be precisely etched by a dry etching.

Moreover, in the method of manufacturing a thin film magnetic head as well as the method of manufacturing a combination type thin film magnetic head, the coil windings of the first thin film coil half may be preferably formed by electrolytic plating of copper and the coil windings of the second thin film coil half may be preferably formed by CVD of copper. However, both the first and second thin film coil halves may be formed by electrolytic plating of copper.

Moreover, a coil winding which situates most closer to the air bearing surface is preferably formed by the outermost coil winding of the second thin film coil half and a coil winding which situates most closer to the bridge portion constituting the back gap may be formed by the innermost coil winding of the second thin film coil half. In this case, a width of the outermost and innermost coil windings of the second thin film coil half is preferably larger than that of the remaining coil windings. Then, even if a position of the first thin film coil half is deviated, a width of these outermost and innermost coil windings might not be small and a resistance value might not increase excessively.

In a preferable embodiment of the method of manufacturing a combination type thin film magnetic head according to the invention, during said etching process, after forming the bottom track pole, RIE is continued to remove the write gap film selectively, and further the bottom pole is partially etched over a part of its thickness to form a trim structure in a self-aligned manner. In this case, the step of forming the top track pole includes a step of forming the second magnetic material film on the flat surface of the first magnetic material film and first non-magnetic material film to have a flat surface, a step of forming, on the flat surface of the second magnetic material film, a mask having a pattern corresponding to the shape of the top track pole to be formed, and a step of selectively removing the second magnetic material film by RIE using the mask, and then this RIE is continued and the first magnetic material film is etched to form the bottom track pole in a self-aligned manner. The first magnetic material film may be advantageously made of FeN or FeCo, and the second magnetic material film may be formed by plating of FeN or FeCo. The RIE process for removing the first and second magnetic material films may be preferably performed at a high etching temperature above 50° C., particularly 200–300° C. under an atmosphere of $Cl_2$ or a mixed gas of $Cl_2$ and boron series gas such as $BCl_2$ or a mixed gas of $Cl_2$ and an inert gas such as Ar and $N_2$.

In a preferable embodiment of the method of manufacturing a combination type thin film magnetic head according to the invention, said step of forming the top track pole includes the steps of:

forming the second magnetic material film on the flat surface of the first magnetic material film and first non-magnetic material film to have a flat surface; and forming the top track pole by RIE using a mask formed on the flat surface of the second magnetic material film and having a pattern corresponding to the shape of the top track pole;

wherein RIE is performed to etch the first magnetic material film to form the bottom track pole in a self-aligned manner, while said top track pole is used as an etching mask. In this case, the latter RIE may be conducted under a same condition as the former RIE.

In the method of manufacturing a thin film magnetic head and the method of manufacturing a combination type thin film magnetic head according to the invention, it is preferable that said insulating film for isolating the first and second thin film coil halves may be preferably formed by alumina-CVD. The alumina-CVD may be preferably a reduced pressure $Al_2O_3$-CVD film formed by an atomic layer process, in which $Al(CH_3)_3$ or $AlCl_3$ and $H_2O$, $N_2$, $N_2O$ or $H_2O_2$ are alternately projected intermittently under a reduced pressure of 1–2 Torr at a temperature of 100–300° C., preferably 150–200° C. In this manner, it is possible to obtain the insulating film having a superior step-coverage and containing no key hole and void, and thus an excellent electrically insulating property can be attained although the insulating film has a large thickness.

BRIEF DESCRIPTION OF THE DRAWINGS

FIGS. 1A, 1B–8A, 8B are cross sectional views showing successive steps of a known method of manufacturing a known thin film magnetic head;

FIGS. 10A, 10B–23A, 23B are cross sectional views illustrating successive steps of the method of manufacturing a first embodiment of the combination type thin film magnetic head according to the invention;

FIGS. 26A, 26B–29A, 29B are cross sectional views showing successive steps of the method of manufacturing a second embodiment of the combination type thin film magnetic head according to the invention;

FIGS. 30A, 30B–35A, 35B are cross sectional views depicting successive steps of the method of manufacturing a third embodiment of the combination type thin film magnetic head according to the invention;

FIGS. 47A, 47B–56A, 56B are cross sectional views showing successive steps of the method of manufacturing a seventh embodiment of the combination type thin film magnetic head according to the invention;

FIGS. 58A and 58B are cross sectional view showing a next manufacturing step;

DESCRIPTION OF THE PREFERRED EMBODIMENTS

Figure 2A:
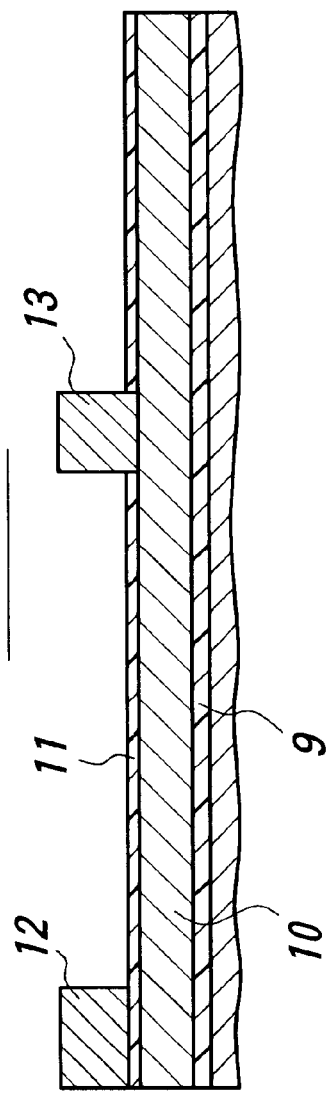
Figure 2B:
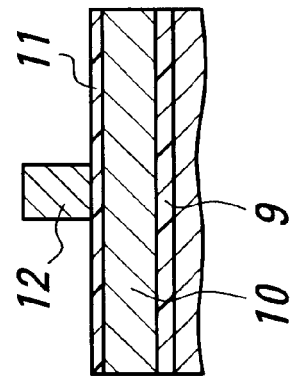
Figure 4A:
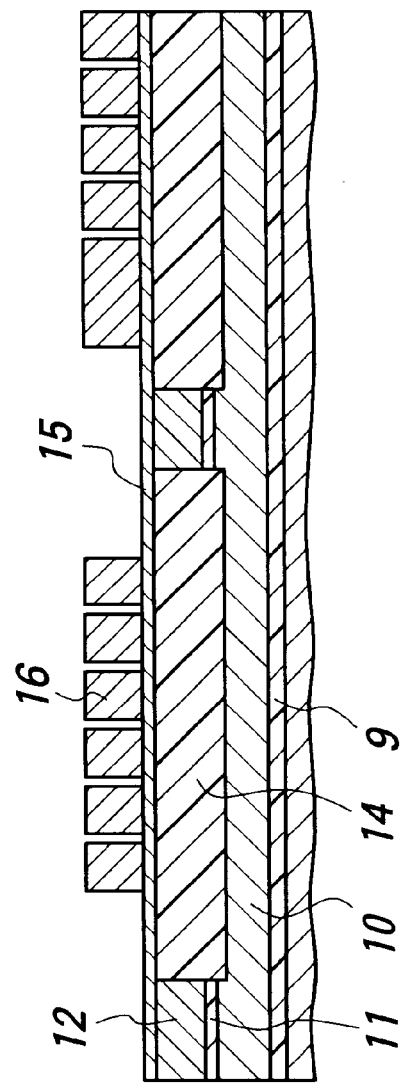
Figure 4B:
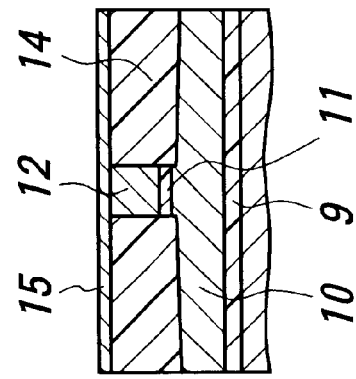
Figure 6A:
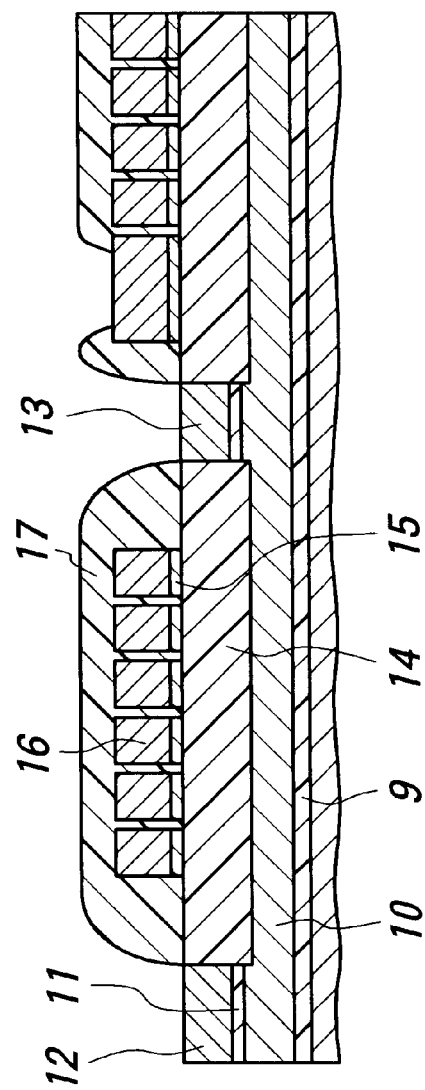
Figure 6B:
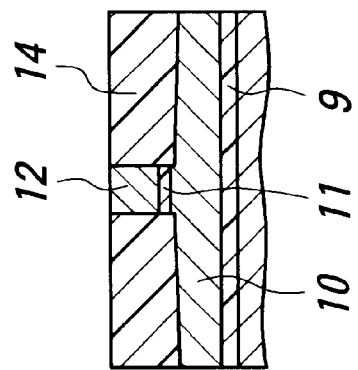
Figure 8B:
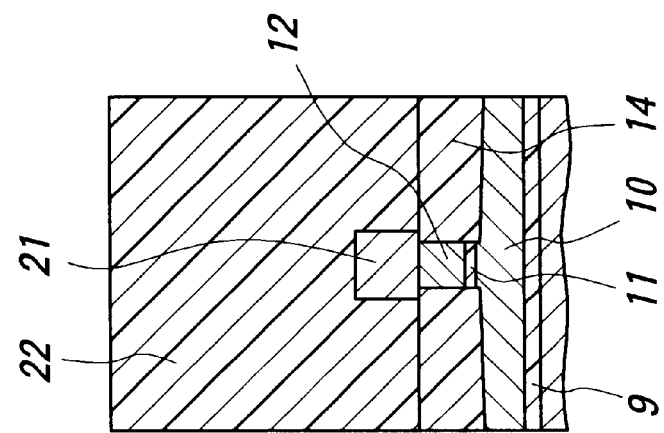
Figure 8A:
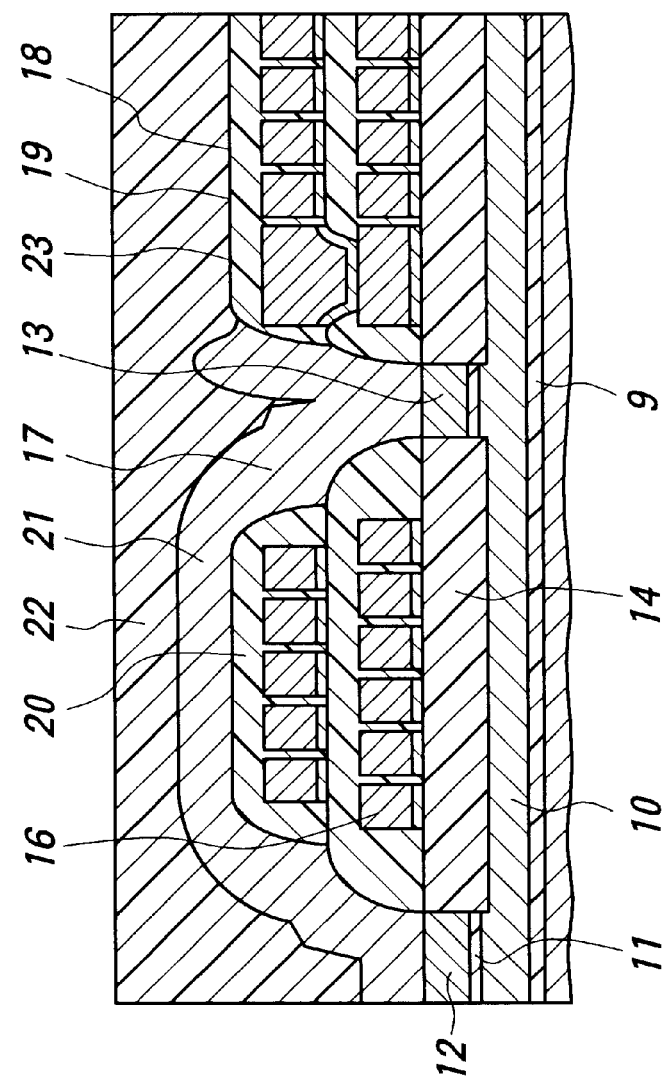
Figure 9:
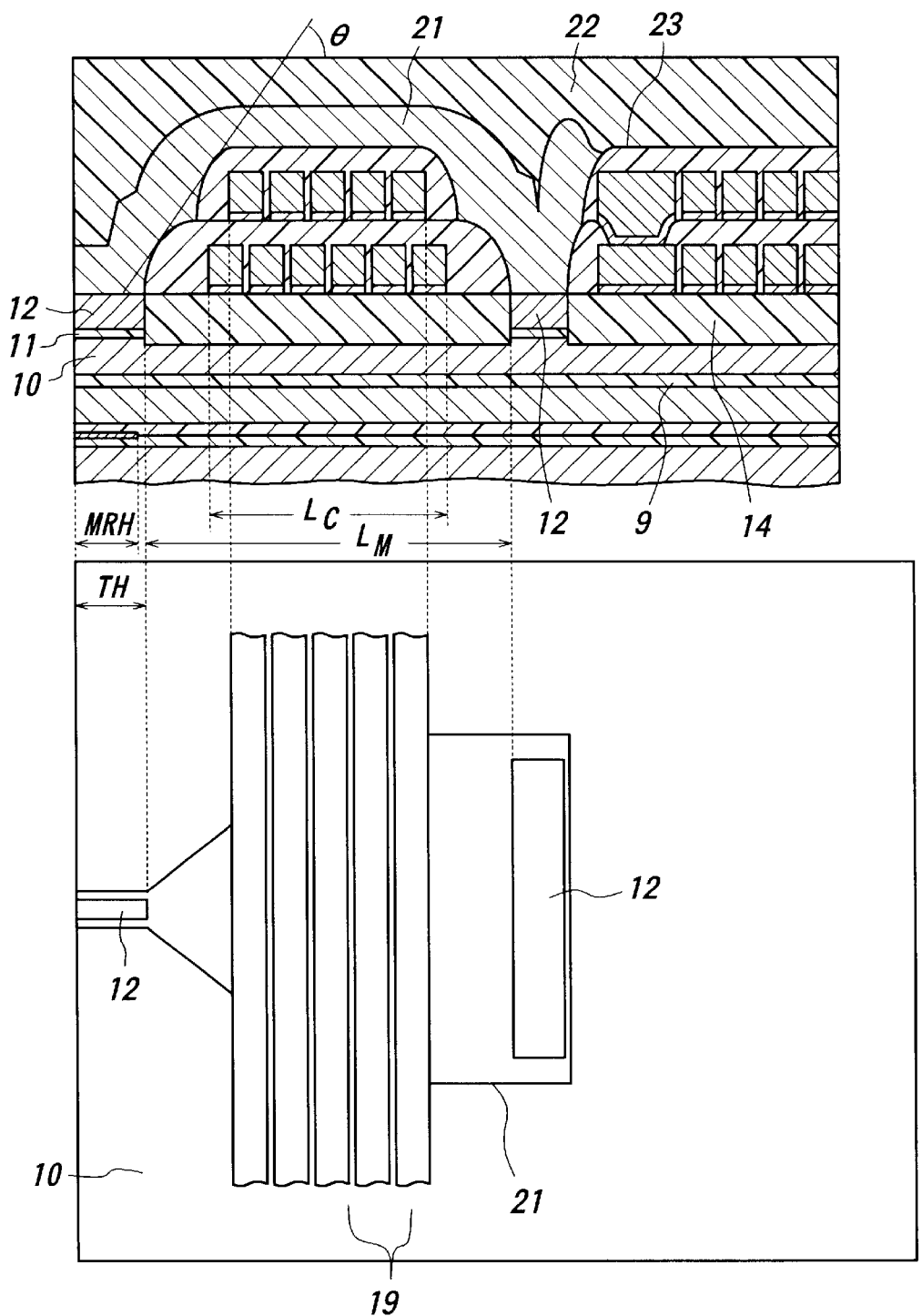
FIGS. 9A and 9B are cross sectional and plan views, respectively illustrating the known thin film magnetic head.

FIGS. 10A, 10B–23A, 23B are cross sectional views showing successive steps of the method of manufacturing a first embodiment of the combination type thin film magnetic head according to the invention. In these drawings, A denotes a cross sectional view cut along a line perpendicular to the air bearing surface, and B represents a cross sectional view of a pole portion cut along a line parallel to the air bearing surface. It should be noted that the structure of a reading GMR head element formed by a magnetoresistive type thin film magnetic head and the method of manufacturing the same are substantially identical with those of the known head. As illustrated in FIGS. 10A and 10B, an insulating film 32 made of alumina and having a thickness of about 3 $\mu$m is deposited on one surface of a substrate 31 made of AlTiC. Furthermore, a bottom shield film 33 made of a permalloy for the magnetoresistive type thin film magnetic head is formed on the insulating film with a thickness of about 2–3 $\mu$m into a desired pattern by means of a plating method using a photoresist mask.

Subsequently, after forming an alumina film on a whole surface of the wafer with a thickness of 3–4 $\mu$m, a surface the alumina film is flattened by CMP to expose the bottom shield film. Next, after forming a bottom shield gap film 34 made of alumina with a thickness of 30–35 nm by sputtering, a GMR film 35 having a given layer-structure and lead electrodes 36 for the GMR film are formed by a lift-off process. Then, a top shield gap film 37 is formed with a thickness of 30–35 nm by sputtering of alumina, and a top shield film 38 for the GMR head element is formed with a thickness of about 1–1.5 $\mu$m.

Next, an isolation film 39 made of alumina is formed with a thickness of about 0.15–0.3 $\mu$m for isolating the reading GMR head element from a writing inductive type thin film magnetic head element to suppress noise in a reproduced output from the GMR head element. After that, a bottom pole 40 of the recording head element is formed with a thickness of 2.0–2.5 $\mu$m. The bottom pole 40 may be formed by a plating film of NiFe (80%:20%), NiFe (45%:55%) or CoNiFe (64%:18%;18%) or may be formed by a sputtering film of FeAlN, FeN, FeCo or FeZrN. In the present embodiment, the bottom pole is formed by a sputtering film of FeN.

Next, as shown in FIGS. 11A and 11B, an alumina insulating film 41 is formed on the bottom pole 40 with a thickness of 0.3–0.5 $\mu$m, and then the alumina insulating film is shaped by a dry etching into a given pattern for defining a throat height zero reference position. Furthermore, a non-magnetic film 142 constituting a write gap film is formed on a whole surface of a wafer with a thickness of 0.08–0.10 $\mu$m. In the present embodiment, the non-magnetic film 142 is made of W, but according to the invention, it may be made of a non-magnetic metal such as Ta, Mo, TiN and TaN or an inorganic non-magnetic material such as alumina.

Then, as illustrated in FIGS. 12A and 12B, the non-magnetic film 142 is selectively removed to form a write gap film 42. During this process, a portion of the non-magnetic film 142 situating at a position at which a back gap will be formed later is also removed. Then, a magnetic material film 143 having a high saturation magnetic flux density is formed by sputtering with a thickness of 1–1.5 $\mu$m. As will be explained later, the magnetic material film 143 constitutes a track pole and is preferably made of After flattening the surface by CMP, a seed layer 145 is formed with a thickness of FeN (2.0 T) or FeCo (2.4 T) having a high saturation magnetic flux density. In the present embodiment, the magnetic material film 143 is made of FeN. By using the magnetic material having a high saturation magnetic flux density, it is possible to obtain a sufficiently large magnetic flux although a width of track is narrowed in the order of quartermicrons, particularly about 02. $\mu$m.

Next, as shown in FIGS. 13A and 13B, after forming an alumina insulating film 144 on the magnetic material film 143 made of FeN with a thickness of 1–2 $\mu$m, a surface of the insulating film 144 is flattened by CMP and a seed layer 145 made of NiFe is formed on the insulating film with a thickness of about 50 nm. Then, a photoresist mask 146 having a given pattern is formed on the seed layer 145, and a NiFe film 147 constituting a hard mask is formed by an electrolytic plating process with a thickness of 1.0–2.0 $\mu$m on an exposed surface of the seed layer. Since the photoresist mask 146 has a pattern corresponding to a track chip having a narrow width, the NiFe film 147 also has a given track chip pattern.

Next, as shown in FIGS. 14A and 14B, after removing the photoresist mask 146, an ion milling is performed using the NiFe film 147 as a mask to removed an exposed portion of the seed layer 145. Then, RIE is carried out at 50° C. in an atmosphere of BCl$_2$ gas to remove the alumina insulating film 144, and further the magnetic material film 143 is selectively removed by RIE at 200° C. in an atmosphere of a chlorine series gas such as BCl$_2$ and Cl$_2$ to form a top track pole 43. The RIE process is continued to remove the write gap film 42 while a portion of the write gap film underlying the top track pole 43 is remained. Then, the surface of the underlying bottom pole 40 is selectively removed over a depth equal to a part of a thickness of the bottom pole to form a trim structure. During this RIE process, the surface of the alumina insulating film 41 is exposed.

In a modification of the present embodiment, after removing an exposed portion of the seed layer 145 by ion milling, RIE is performed at 150–200° C. in an atmosphere of a mixed gas of BCl$_2$ and Cl$_2$ to remove the alumina insulating film 144, while the NiFe film 147 is used as a mask, then the magnetic material film 143 is selectively removed, a portion of the write gap film 42 other than a portion situating under the magnetic material film 143 is removed, and then the surface of the underlying bottom pole 40 is selectively removed over a depth equal to a part of a thickness of the bottom pole to form the trim structure.

Next, after removing the remaining NiFe film 147 and seed layer 145, an alumina insulating film 148 is formed on a whole surface with a thickness of 1–2 μm as shown in FIGS. 15A and 15B. Then, the alumina insulating film 148 and magnetic material film 143 are polished by CMP to obtain a flat surface. During CMP, an amount of polishing is adjusted such that a thickness of the magnetic material film 143 is reduced to 0.8–1.8 μm to form a top track pole 43 as illustrated in FIGS. 16A and 16B. An end surface of the alumina insulating film 41 defines a throat height zero reference position $TH_0$ near a MR height zero reference position $MR_0$ of the GMR film 35. A lower bridge portion 44 is formed from the magnetic material film 143 during the formation of the top track pole 43. As stated above, the NiFe film 147 serving as the mask for forming the top track pole is formed on the flat surface of the alumina insulating film 145, and therefore an extremely narrow track of 01.–0.3 μm can be realized.

According to the present invention, the RIE process for forming the top track pole having a narrow width is carried out under a chlorine series gas such as $BCl_2$ and $Cl_2$ or a mixture gas of $Cl_2$ a boron series gas such as $BCl_2$ at a high temperature of 50–300° C., particularly 150–300° C. Then, undesired adhesion of debris of etched particles in RIE can be avoided. By conducting RIE under the above mentioned condition, a magnetic material having a high saturation magnetic flux density can be etched accurately and effectively.

Next, as shown in FIGS. 16A and 16B, in order to form a first thin film coil half, after forming a seed layer 151 made of copper with a thickness of 50 nm and forming a photoresist mask having a given opening pattern, a first thin film coil half 51 is formed with a thickness of 1.5–2.5 μm such that a line width is 0.5 μm and a space having a width (0.53–0.65 μm) which is wider than the line width by 0.03–0.15 μm, and then the photoresist mask is removed and an exposed portion of the seed layer 151 is removed. A width of an end portion 51a of an innermost coil winding is larger than a width of the remaining coil windings.

Next, a CoNiFe film is formed by a plating method with a thickness of 2.0–2.5 μm, and a middle pole 52 for magnetically coupling the top track pole 43 to a top pole to be formed later and an upper bridge portion 53 is formed on the lower bridge portion 44 constituting the back gap. Then, an alumina insulating film 152 is formed on a whole surface with a thickness of 0.1 μm. The alumina insulating film 152 may be preferably formed by a reduced pressure $Al_2O_3$-CVD film which is formed by an atomic layer process, in which $Al(CH_3)_3$ or $AlCl_3$ and $H_2O$, $N_2$, $N_2O$ or $H_2O_2$ are alternately projected intermittently at 100–400° C. under a reduced pressure of 1–2 Torr. In order to avoid a deterioration of a magnetic material, the temperature is preferably lower than 300° C., but as long as a heating time is short, a deterioration of a magnetic material does not occur even at 400° C., a heating temperature is set 100–400° C.

Since a magnetic path length is determined by a thickness of the alumina insulating film 152, it is preferable to set the thickness to 30–250 nm. In the conventional method of forming the thin film coil, when a space between successive coil windings is smaller than 250 nm, during the ion milling process for removing the exposed seed layer, coil windings might be short-circuited due to adhesion of debris of etched particles. According to the invention, such an undesired short-circuit can be avoided. If a space between successive coil windings is smaller than 30 nm, during a CMP process for the first thin film coil halve 51 formed by Cu-plating and a second thin film coil half to be formed later by Cu-CVD, a smear phenomenon in which copper fine particles move between these thin film coil halves might occur easily and the coil windings might be short-circuited.

Figure 17A:
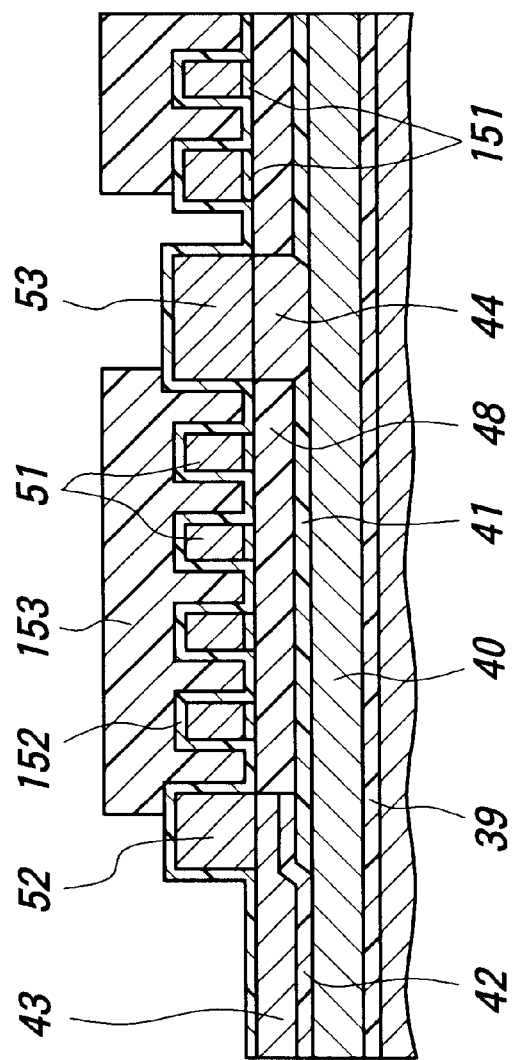
Figure 17B:
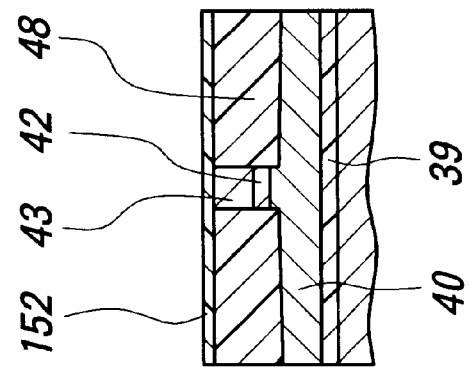

Next, as shown in FIGS. 17A and 170B, a thin film coil forming region is covered with a photoresist film 153 having a thickness of 2.5–3.0 μm, and then an alumina insulating film 154 having a thickness of 3–4 μm is formed on a whole surface as illustrated in FIGS. 18A and 18B. After that, the alumina insulating film 154 is polished by CMP using an alkaline slurry or a neutral slurry to obtain a flat surface to which the photoresist film 153 is exposed as depicted in FIGS. 19A and 19B. In the present embodiment, an amount of polishing during the CMP process is adjusted such that the alumina insulating film 152 covering the middle pole 52 is exposed, but according to the invention, it is also possible to control a polishing amount such that the alumina insulating film is not exposed. In the present embodiment, it is important that spaces in which a second thin film coil half is to be formed is not filled with the alumina insulating film 154, but with the photoresist film 153. To this end, the photoresist film may be replaced by a SOG (Spin-On-Glass) film or polyimide film which can be easily removed than alumina.

Next, after removing the photoresist film 153 by a chemical wet etching as shown in FIGS. 20A and 20B, a Cu-CVD film 155 is formed with a thickness of 1.5–2.5 μm as illustrated in FIGS. 21A and 21B. Then, the Cu-CVD film 155 is flattened by CMP as depicted in FIGS. 22A and 22B. An amount of polishing of this CMP process is adjusted such that the alumina insulating film 152 formed on the top surface of the first thin film coil half 51 is removed and the surface of the coil windings of the first thin film coil half is exposed to form a second thin film coil half 54. Therefore, the surfaces of the middle pole 52 and upper bridge portion 53 are also exposed. Since the surfaces of the first and second thin film coil halves 51 and 54 are polished during the CMP process for polishing the Cu-CVD film 155, the alumina insulating film 152 is not damaged by CMP although the alumina insulating film has a very small thickness of 30–250 nm as explained above, and the first and second thin film coil halves can be isolated from each other sufficiently well. In this manner, the coil windings of the second thin film coil half 54 are formed in spaces between successive coil windings of the first thin film coil half 51. The alumina insulating film 152 is interposed between successive coil windings of the first and second thin film coil halves 51 and 54, a space of the coil windings is determined by a thickness of the alumina insulating film 152. As stated above, in the present embodiment, the alumina insulating film 152 has a thickness of 0.1 μm, an extremely narrow space of 0.1 μm can be obtained between successive coil windings.

Next, as shown in FIGS. 23A and 23B, an alumina insulating film 55 having a thickness of 0.2–0.5 μm is formed to cover the thin film coil, contact holes are formed at given positions, a top pole 56 made of FeCo is formed by plating with a thickness of 2 μm such that each ends of the top pole are brought into contact with the middle pole 52 and upper bridge portion 53, and an overcoat film 57 made of alumina is formed on a whole surface with a thickness of 20–40 μm. In the present embodiment, the top pole 56 is made of FeCo, but it may be formed by a plating film of CoNiFe, NiFe (80%:20%) or NiFe (45%:55%) having a high saturation magnetic flux density. Moreover, the top pole 56 may be formed by a sputtering film of FeN or FeZrN. Furthermore, the top pole 56 may be formed by a multi-layer of inorganic insulating films and magnetic material films such as permalloy. In this case, a high frequency property can be further improved. In an actual process for manufacturing the thin film magnetic head, after forming a number of the above mentioned structures on the wafer, the wafer is divided in a plurality of bars in each of which a number of thin film heads are aligned. Then, a side edge of the bar is polished to obtain the air bearing surface, and the bar is divided into particular thin film magnetic heads. In FIG. 23A, a polishing surface defining the air bearing surface is denoted by a broken line A—A.

Figure 24:
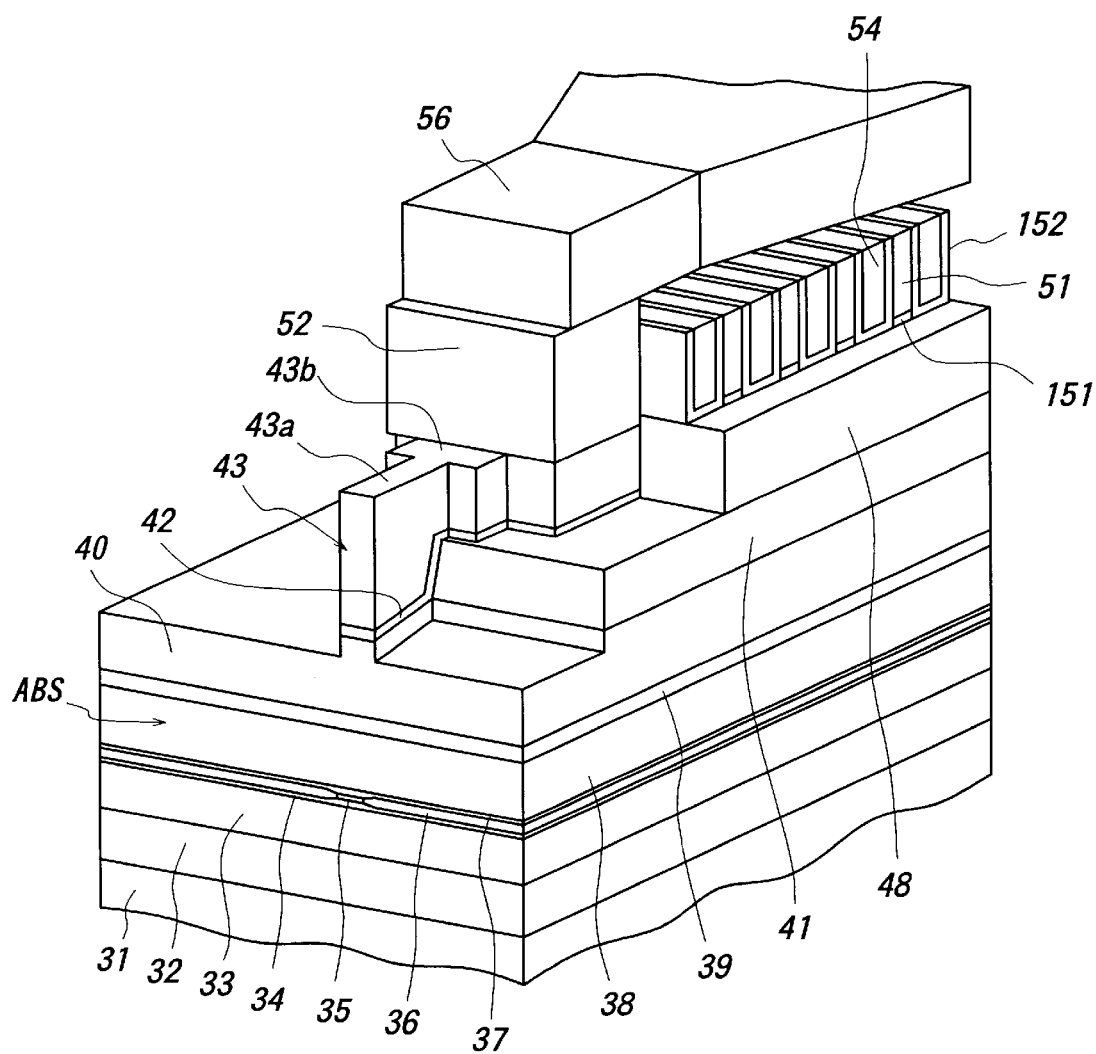
FIG. 24 is a perspective view showing the arrangement of a pole portion and thin film coil.

FIG. 24 is a perspective view showing the structure after forming the top pole 56, while some insulating films are dispensed with. The first and second thin film coil halves 51 and 54 are formed in a self-aligned manner with interposing therebetween the extremely thin alumina insulating film 152 having a thickness of 0.1 $\mu$m. Therefore, a distance between successive coil windings is very narrow and a magnetic path length can be shortened largely.

Furthermore, the throat height zero reference position $TH_0$ is defined accurately by the boundary surface between the top track pole 43 and write gap film 42 and the end surface of the alumina insulating film 41 facing to the air bearing surface. The top track pole 43 includes a pole chip portion 43a having a very small width and a contact portion 43b having a larger width, and the contact portion is brought into contact with the middle pole 52 over a large area. Therefore, a saturation of a magnetic flux can be effectively prevented. Moreover, since the top track pole 43 is made of a magnetic material such as FeN and FeCo having a very high saturation magnetic flux density not less than 2 T, a height of the whole track pole can be reduced, and thus a broadening of a magnetic flux during the recording operation can be suppressed to attain a high surface recording density. The top pole 56 is retarded from the air bearing surface ABS, any leakage of a magnetic flux from the top pole can be avoided and the over-write property and NLTS property can be improved.

As explained above, the front end of the top pole 56 facing to the air bearing surface ABS is retarded from the air bearing surface. This retarding distance is preferably not less than 0.5 $\mu$m in order to suppress an undesired side-write due a leakage of a magnetic flux from the top pole. The end surface of the middle pole 52 facing to the air bearing surface ABS is also retarded from the air bearing surface and only the top track pole 43 is exposed to the air bearing surface. Therefore, a track having an extremely narrow width can be written.

Figure 25:
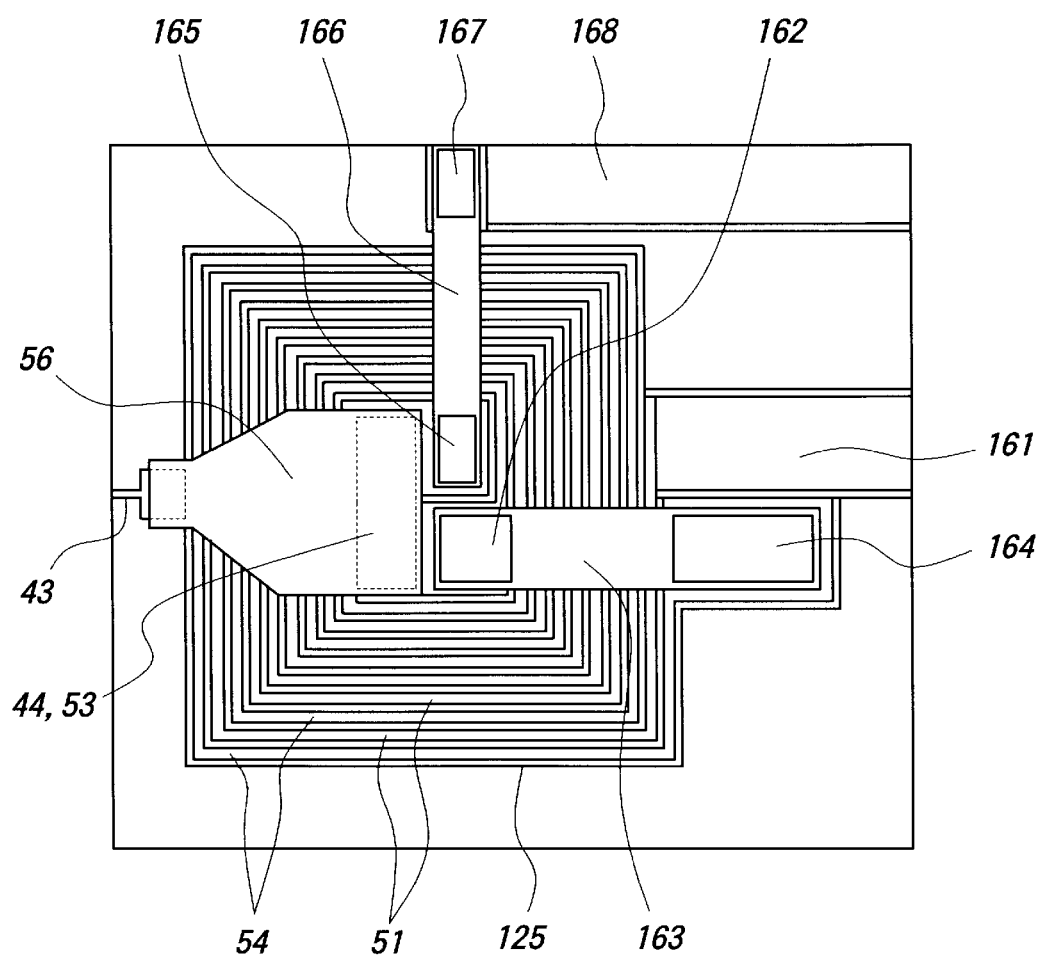
FIG. 25 is a plan view illustrating a connection between a thin film coil and jumper wirings.

FIG. 25 is a plan view the connection of the first and second thin film coil halves 51 and 54, and the alumina insulating film 152 isolating successive coil windings are denoted by thick lines. A first coil lead 161 is connected to the outermost coil winding of the first thin film coil half 51 and an end portion of the innermost coil winding of the first thin film coil half 51 is connected one end of a first jumper wiring 153 by means of a contact portion 162 formed at the end portion of the innermost coil winding. The other end of the first jumper wiring 153 is connected to the wide end portion of the outermost coil winding of the second thin film coil half 54 via a contact portion 164 formed at the end portion of the outermost coil winding. The wide end portion of the innermost coil winding of the second thin film coil half 54 is connected to one end of a second jumper wiring 166 by means of a contact portion 165 formed at the end portion of the innermost coil winding. The other end of the second jumper wiring 166 is connected to a second coil lead 168. In this manner, an electric current flows through the coil windings of the first and second thin film coil halves 51 and 54 in a clockwise direction. The first and second jumper wirings 163 and 166 are made of a same magnetic material as that of the top pole 56 during the formation of the top pole.

Now a second embodiment of the combination type thin film magnetic head according to the invention will be explained. In the second embodiment, portions similar to those of the first embodiment are denoted by same reference numerals used in the first embodiment. Similar to the first embodiment, after forming the magnetoresistive type reading thin film magnetic head element and forming the isolation film 39 on the shield film 38, an alumina insulating film 141 constituting the write gap film is formed on the flat surface of the bottom pole 40 with a thickness of 0.3–0.5 $\mu$m as shown in FIGS. 10A and 10B. Then, a photoresist film 171 is formed on the alumina insulating film 142 as illustrated in FIGS. 26A and 26B. The photoresist film 171 has a same performance as the alumina insulating film 41 of the first embodiment, and the throat height zero reference position is defined by an end surface of the photoresist film facing to the air bearing surface. The photoresist film 171 may be made of a non-magnetic metal such as W, Ta, Mo, TiN and TaN or an inorganic non-magnetic material such as alumina.

Next, as depicted in FIGS. 27A and 27B, after selectively removing portions of the non-magnetic film 142 and photoresist film 171 at a position of the back gap. a magnetic material film 143 having a high saturation magnetic flux density is formed by sputtering with a thickness of 1.5–2.5 $\mu$m. Similar to the first embodiment, the magnetic material film 143 may be made of FeN or FeCo.

As depicted in FIGS. 28A and 28B, the surface of the magnetic material film 143 is flattened by CMP, an alumina insulating film 172 is formed with a thickness of 1–2 $\mu$m. Then, a seed layer 145 made of NiFe is formed with a thickness of about 50 nm, and a photoresist mask 146 having a given pattern is formed on the seed layer 145. Furthermore, a NiFe film 147 constituting a hard mask is formed by an electrolytic plating process with a thickness of 1.5–2.5 $\mu$m on an exposed surface of the seed layer 145. After removing the photoresist mask 146, a RIE process is carried out using the NiFe film 147 as a mask to remove selectively an exposed portion of the seed layer 145, the alumina insulating film 172, the magnetic material film 143, the photoresist film 171 and non-magnetic material film 142.

Following processes are similar to those of the first embodiment shown in FIGS. 15–22, and finally a structure illustrated in FIGS. 29A and 29B is obtained. The second embodiment differs from the first embodiment in a point that the insulating film defining the throat height zero reference position is formed by the photoresist film 171 and the write gap film 42 is formed under the photoresist film 171. The remaining structures of the second embodiment are identical with the first embodiment.

Figure 30A:
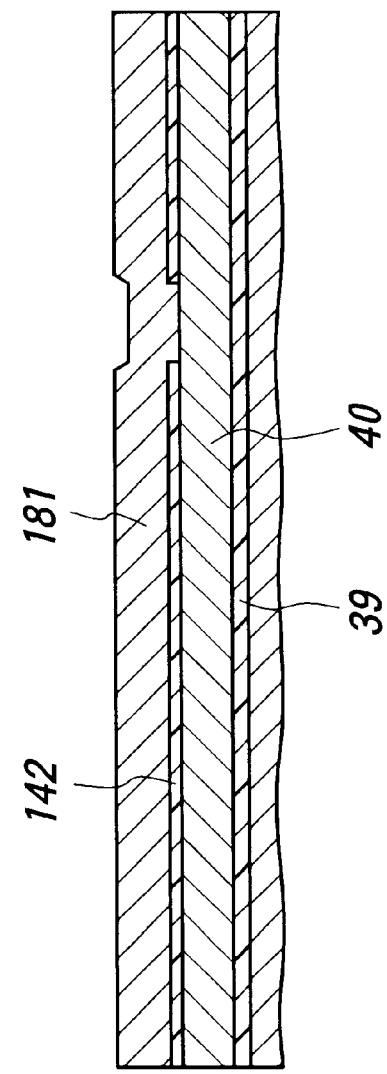
Figure 30B:
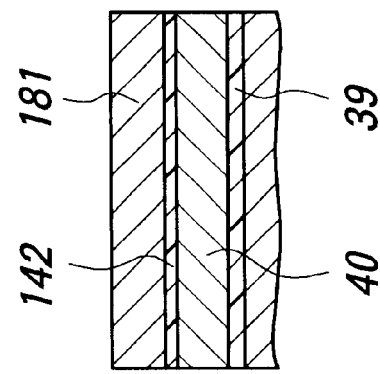

Next, a third embodiment of the combination type thin film magnetic head according to the invention will be explained. The present embodiment differs from the first and second embodiments in a point that the top track pole is constructed to have a two-layer structure of a first track pole and a second track pole. After forming the magnetoresistive type reading thin film magnetic head element and forming the isolation film 39 on the isolation film 39 as shown in FIGS. 10A and 10B explaining the first embodiment, an alumina insulating film 142 constituting the write gap film is formed on the flat surface of the bottom pole 40 with a thickness of 0.08–0.1 µm, and then, after removing the alumina insulating film 142 selectively as the back gap, a magnetic material film 181 constituting a first track pole is formed by sputtering with a thickness of 0.5–0.8 µm as illustrated in FIGS. 30A and 30B. Similar to the first and second embodiments, the magnetic material film 181 may be made of FeN or FeCo like as the magnetic material film 143 constituting the top track pole 43. In the present embodiment, the magnetic material film 181 is made of FeCo.

Figure 31A:
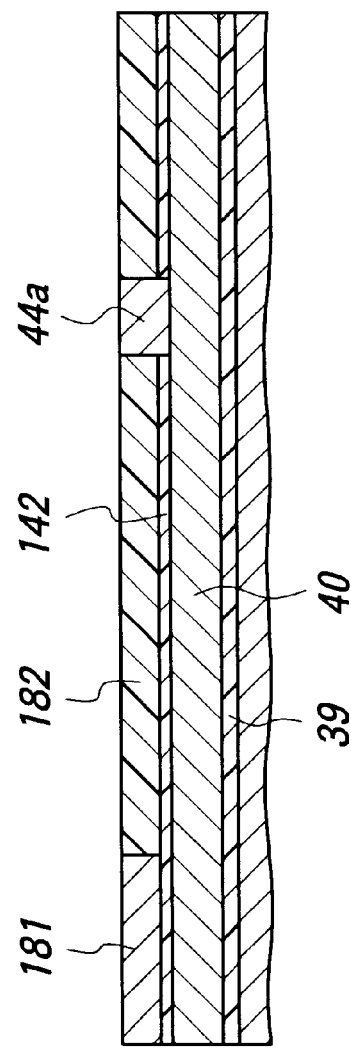
Figure 31B:
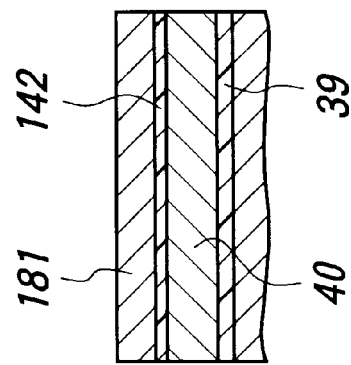

Next, as shown in FIGS. 31A and 31B, a mask made of photoresist, metal or alumina is formed on a thin film forming region, and the magnetic material film 181 is selectively removed by RIE at 200° C. in an atmosphere of a chlorine series gas such as $BCl_2$ and $Cl_2$ to shape the magnetic material film 181 into a band-shaped pattern. Then, an alumina insulating film 182 is formed on a whole surface with a thickness of 1.0 µm, and its surface is flattened by CMP. This CMP process is controlled such that a thickness of the strip-shaped magnetic material film 181 becomes 0.3–0.6 µm. In this manner, an end surface of the alumina insulating film 182 facing to the air bearing surface defines the throat height zero reference position. It should be noted that the MR height zero reference position is defined near the throat height zero reference position. During this process, a first lower bridge portion 44a constituting the back gap is also formed.

Then, as shown in FIGS. 32A and 32B, a magnetic material film 183 constituting a first track pole is formed on the flat surface by sputtering with a thickness of 0.5–0.8 m as illustrated in FIGS. 30A and 30B. The magnetic material film 183 may be made of FeN or FeCo. In the present embodiment, the magnetic material film 183 is made of FeN. Then, a hard mask 184 made of alumina is formed by photolithography on the magnetic material film 183 in accordance with a given pattern. Upon forming the hard mask 184, an alumina insulating film is first formed, a NiFe film is selectively formed by electrolytic plating, and then the alumina insulating film is selectively etched using the NiFe film as an etching mask.

Figure 33B:
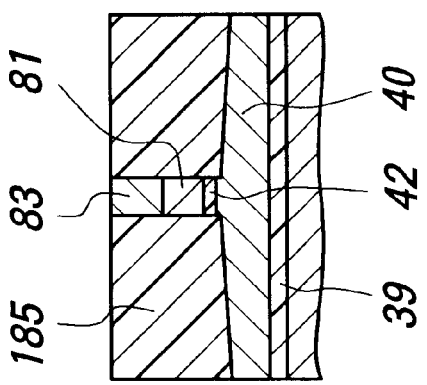
Figure 33A:
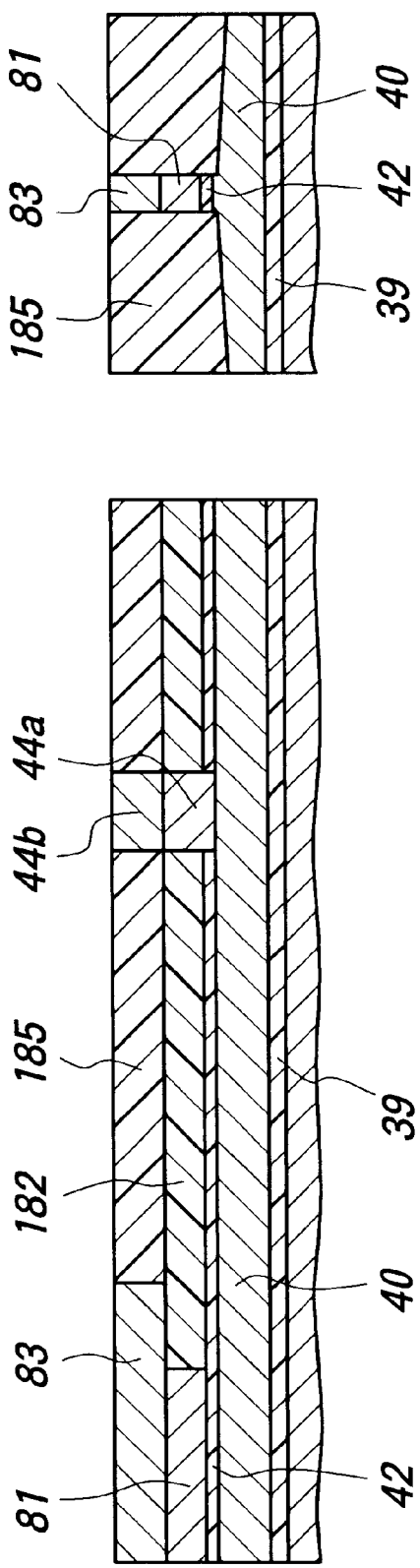
Figure 36:
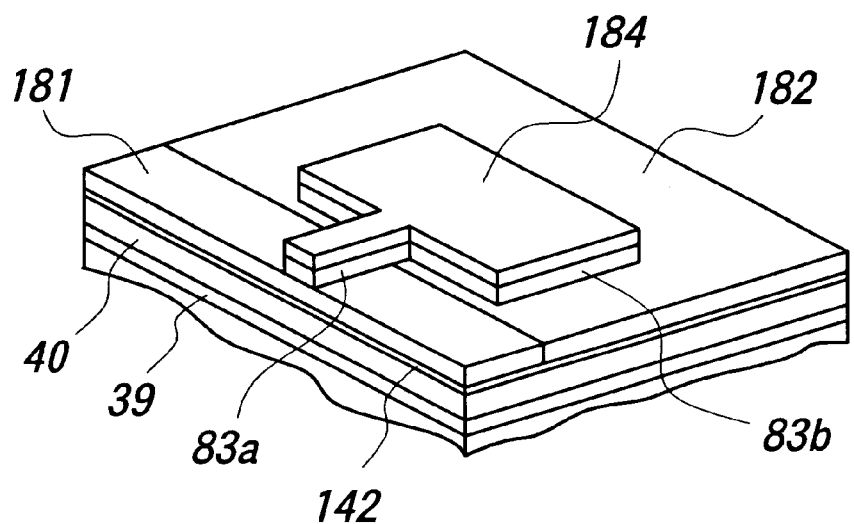
FIGS. 36 and 37 are perspective views representing a process for forming bottom and top track poles.

Next, as illustrated in FIGS. 33A and 33B, the magnetic material film 183 made of FeN is selectively removed by RIE using the alumina hard mask 184 to form a second track pole 83. At the same time, a second lower bridge portion 44b is formed to be coupled with the first lower bridge portion 44a. FIG. 36 is a perspective view showing the shape of the hard mask 184 and second track pole 83. The second track pole 83 includes a pole chip portion 83a having a narrow width of 0.1–0.3 µm and a contact portion 83b which will be coupled with a top pole to be formed later. The pole chip portion 83a situates on the band-shaped magnetic material film 181 constituting the first track pole, but the contact portion 83b situates on the alumina insulating film 182. That is to say, the throat height zero reference position $TH_0$ situates at a boundary between the pole chip portion 83a and the contact portion 83b. It should be noted that t according to the invention, it is not always to construct in such a manner, but the throat height zero reference position $TH_0$ may be shifted toward the air bearing surface ABS from the boundary between the pole chip portion 83a and the contact portion 83b as will be explained later. In an actual process for manufacturing the thin film magnetic head, after forming a number of the above mentioned structures on the wafer, the wafer is divided in a plurality of bars in each of which a number of thin film heads are aligned. Then, a side edge of the bar is polished to obtain the air bearing surface ABS, and the bar is divided into particular thin film magnetic heads. Therefore, in FIG. 36, the pole chip portion 83a of the second track pole 83 is represented to have a longer length.

In the present embodiment, the RIE process for forming the second track pole 83 having the narrow pole chip portion 83a is performed at a high temperature of 50–300° C., particularly 50–300° C. in an atmosphere of a $Cl_2$ gas, a mixed gas of $BCl_2$ and $Cl_2$ or a mixed gas of $Cl_2$ and $O_2$, Ar, $N_2$. Then, the re-adhesion of debris of etched particles can be effectively prevented. By conducting the RIE process under such a condition, a magnetic material such as FeN and FeCo having a high saturation magnetic flux density can be etched in an accurate and effective manner. Since the magnetic material film 183 constituting the second track pole 83 is formed on the coplanar flat surface of the band-shaped magnetic material film 181 constituting the first track pole and alumina insulating film 182 to have a flat surface, there is no depressions and protrusions which might affect RIE and an accurate patterning can be realized. When the RIE process is carried out under the above mentioned condition, an etching rate for the magnetic material such as FeN and FeCo having a high saturation magnetic flux density is higher than that for the alumina, and therefore portions of the magnetic material film 181 and alumina insulating film 182 surrounding the second track pole 83 are remained.

Figure 37:
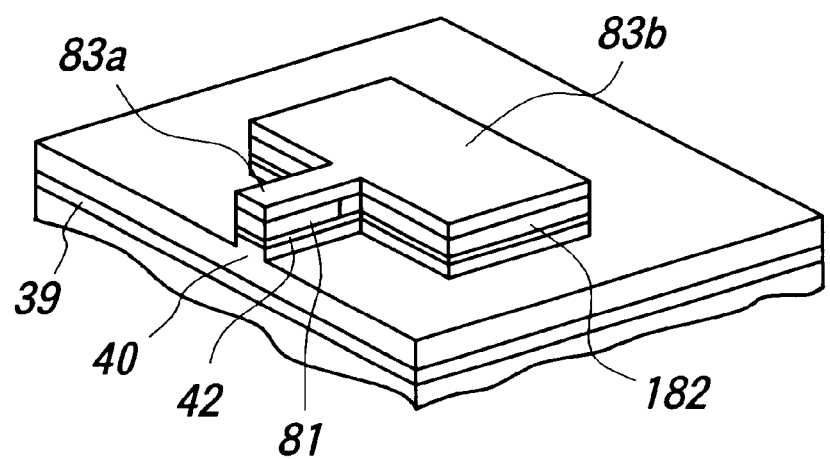
Figure 38:
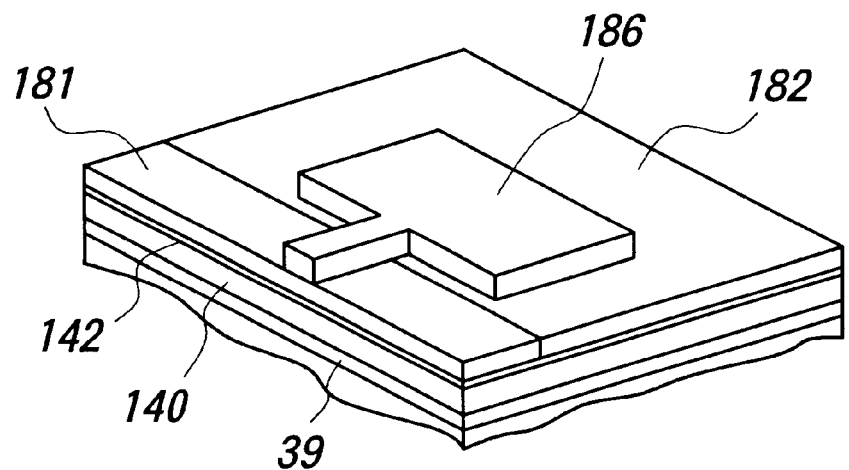
FIGS. 38 and 39 are perspective views representing a process for forming bottom and top track poles in a modification of the third embodiment.
Figure 39:
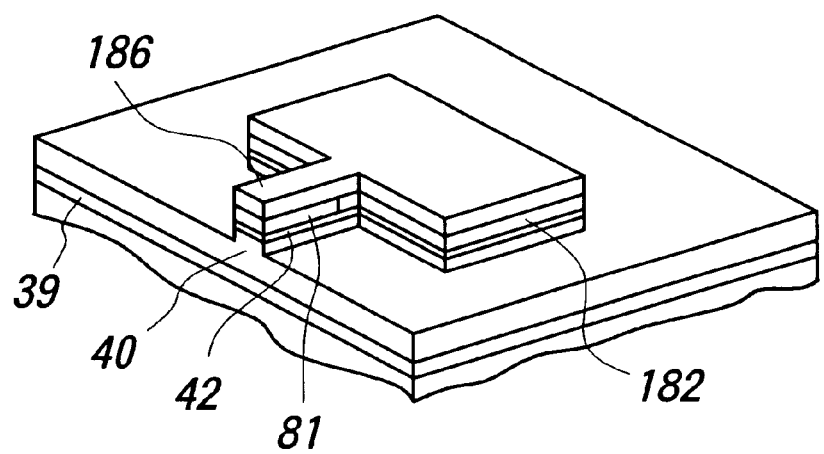

After forming the second track pole 83 in the manner explained above, the RIE process using the hard mask 184 is continued to remove selectively the band-shaped magnetic material film 181 to form a first track pole 81. In this manner, the top track pole is constructed by the two-layer structure of the first and second track poles 81 and 83 which is formed in a self-aligned manner, and thus the pole chip of the order of submicrons can be formed accurately and stably. During this RIE process, a portion of the alumina insulating film 182 free from the top track pole is also removed. The RIE process is further continued to remove a portion of the non-magnetic material film 182 free from the top track pole to form a write gap film 42, and then the surface of the underlying bottom pole 40 is selectively removed over a depth equal to a part of a thickness of the bottom pole to form the trim structure as depicted in FIG. 37. In the present embodiment, the trim structure is formed by etching the surface of the bottom pole 40 over a distance of 0.3–0.4 µm, but according to the invention, after removing the non-magnetic film 142 by RIE, the surface of the bottom pole 40 may be removed partially by ion milling. By forming the trim structure solely by RIE, the bottom pole 40 can be trimmed precisely. Therefore, an undesired broadening of a magnetic flux at the air bearing surface ABS can be avoided and an erroneous writing into an adjacent track can be suppressed to avoid a side-write.

When the trimming is performed by RIE, a trimming time can be shortened to a large extent than the ion milling, because an etching rate of ion milling for a magnetic material of the bottom pole 40 is about 300 Å/min, but an etching rate of RIE is about 2000 Å/min. A width of the second track pole 83 becomes large abruptly from the boundary between the pole chip portion 83a and the contact portion 83b located at or near the throat height zero reference position, and therefore the second track pole is formed by ion milling, a shadow portion is formed at the boundary and a width of the track pole is gradually decreased toward its tip and the track pole is tapered. However, according to the invention, the top track pole is formed by RIE, and a uniform width can be attained over a whole length and a track width at the air bearing surface ABS can be defined precisely and stably.

Next, after forming an alumina insulating film 185 on a whole surface with a thickness of 1.0–2.0 μm, the hard mask 184 is removed by CMP to obtain a flat surface as shown in FIGS. 33A and 33B. In this case, an amount of polishing in CMP is adjusted such that a thickness of the second track pole becomes 0.5–1.0 μm.

Figure 34B:
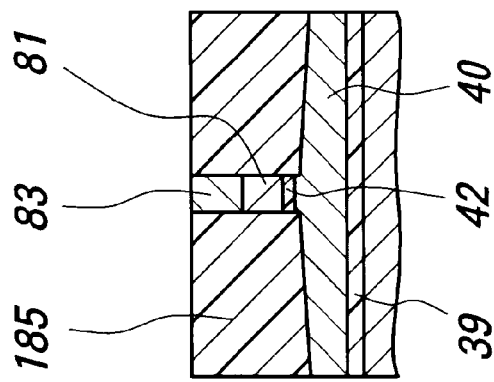
Figure 34A:
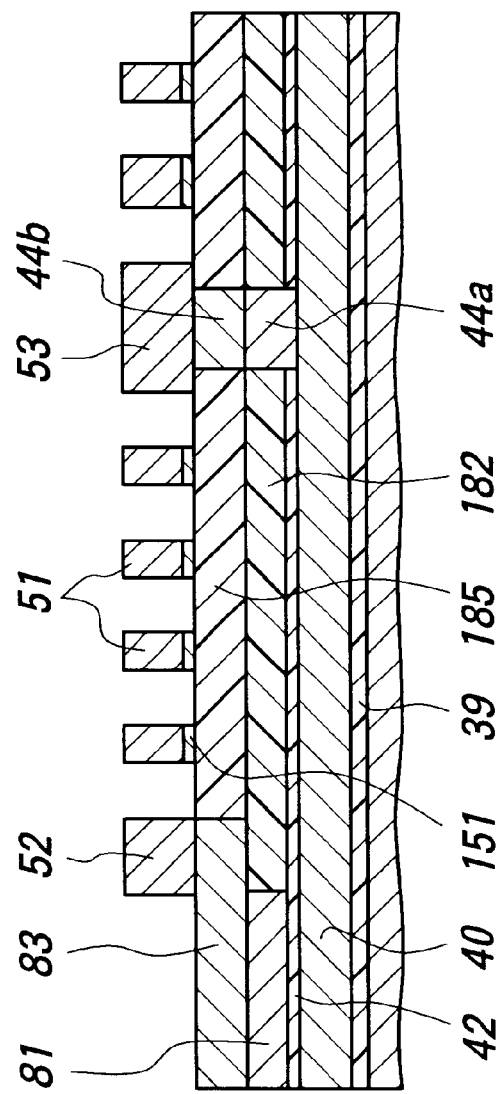

Next, as shown in FIGS. 34A and 34B a first thin film coil half 51 is formed on the surface flattened by CMP and a middle pole and upper bridge portion 53 are formed in a similar manner to the first embodiment. Following processes are identical with those of the first embodiment shown in FIGS. 15–22. Finally, the structure depicted in FIGS. 36A and 36B is obtained. The third embodiment differs from the first and second embodiments in a point that the insulating film defining the throat height zero reference position is formed by the alumina insulating film 182, the write gap film 42 is formed under the alumina insulating film 182 and first track pole 81, and the top track pole is formed to have the two-layer structure of the first and second track poles 81 and 83. The remaining structure of the third embodiment is identical with the first and second embodiments.

In a modification of the above mentioned third embodiment, instead of forming the hard mask 184 made of alumina, a second track pole 186 made of CoNiFe is formed by electrolytic plating into a given pattern and RIE is performed using the second track pole 186 as an etching mask to etch the band-shaped magnetic material film 181, alumina insulating film 182 and non-magnetic material film 142 to and further etch the surface of the bottom pole 40 partially to form the first track pole 81, write gap film and trim structure.

Figure 40:
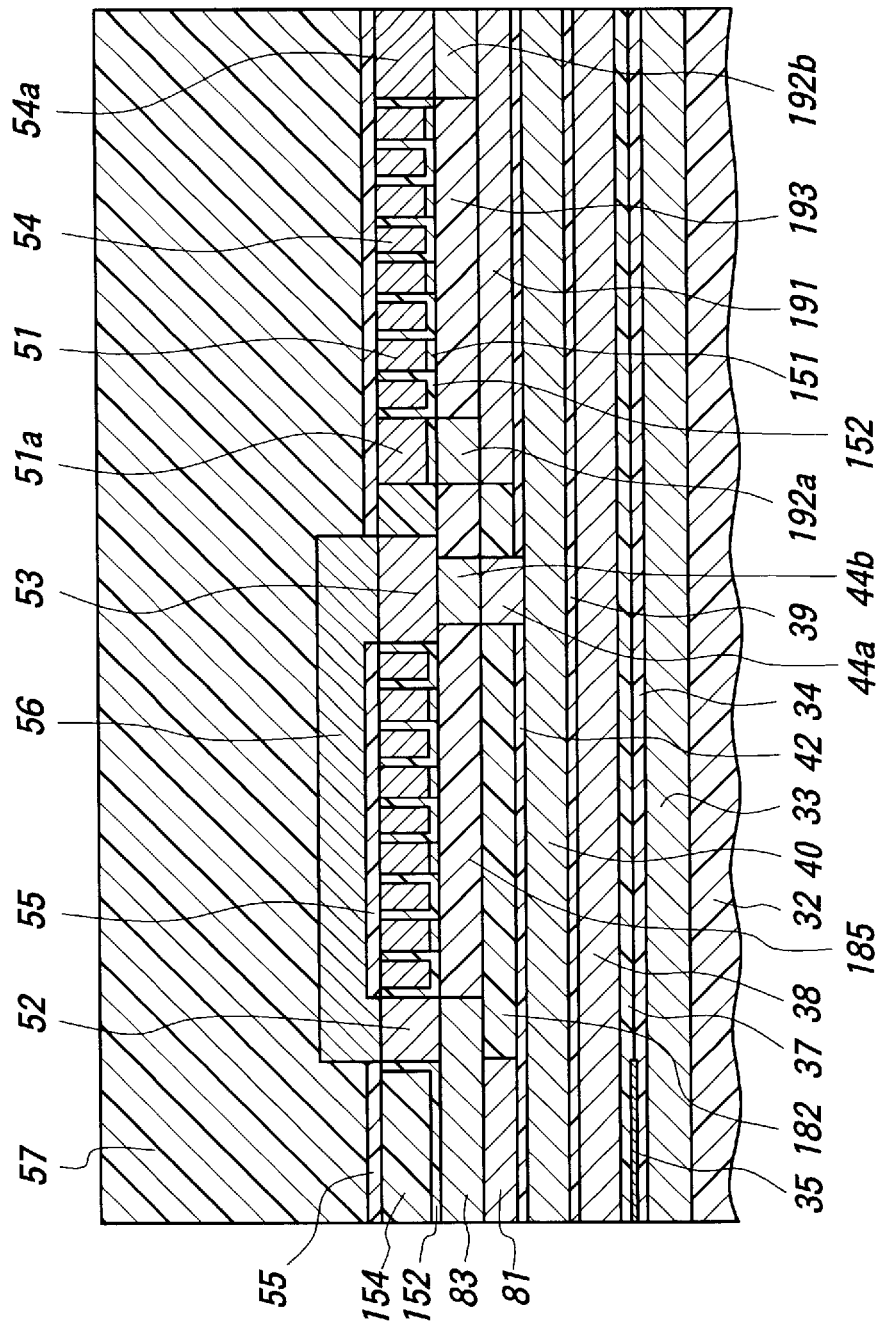
FIG. 40 is a cross sectional view showing a fourth embodiment of the combination type thin film magnetic head according to the invention.

FIG. 40 is a cross sectional view showing a fourth embodiment of the combination type thin film magnetic head according to the invention. Also in the present embodiment, portions similar to those of the previous embodiments are denoted by the same reference numerals. The structure of the pole portion and thin film coil are identical with those of the third embodiment, but the present embodiment differs from the third embodiment in a method of manufacturing the jumper wirings connecting the first and second thin film coil halves. In the third embodiment, after forming the thin film coil, the jumper wiring 163 simultaneously with the top pole 56. In the present embodiment, a first jumper wiring 191 is formed together with the first track pole 81, and when the second track pole 83 is formed, a second jumper wiring 192a is formed to be contacted with one end of the first jumper wiring 191 and a third jumper wiring 192b is formed to be contacted with the other end of the first jumper wiring 191 are formed simultaneously. Upon forming the thin film coil, the contact portion formed at the wide end portion 51a of the innermost coil winding of the first thin film coil half 51 is brought into contact with the second jumper wiring 192a, and the contact portion formed at the wide end portion 54a of the outermost coil winding of the second thin film coil half 54 is brought into contact with the third jumper wiring 192b. An alumina insulating film 193 is formed such that the first thin film coil half 51 is not directly contacted with the first jumper wiring 191.

Figure 41:
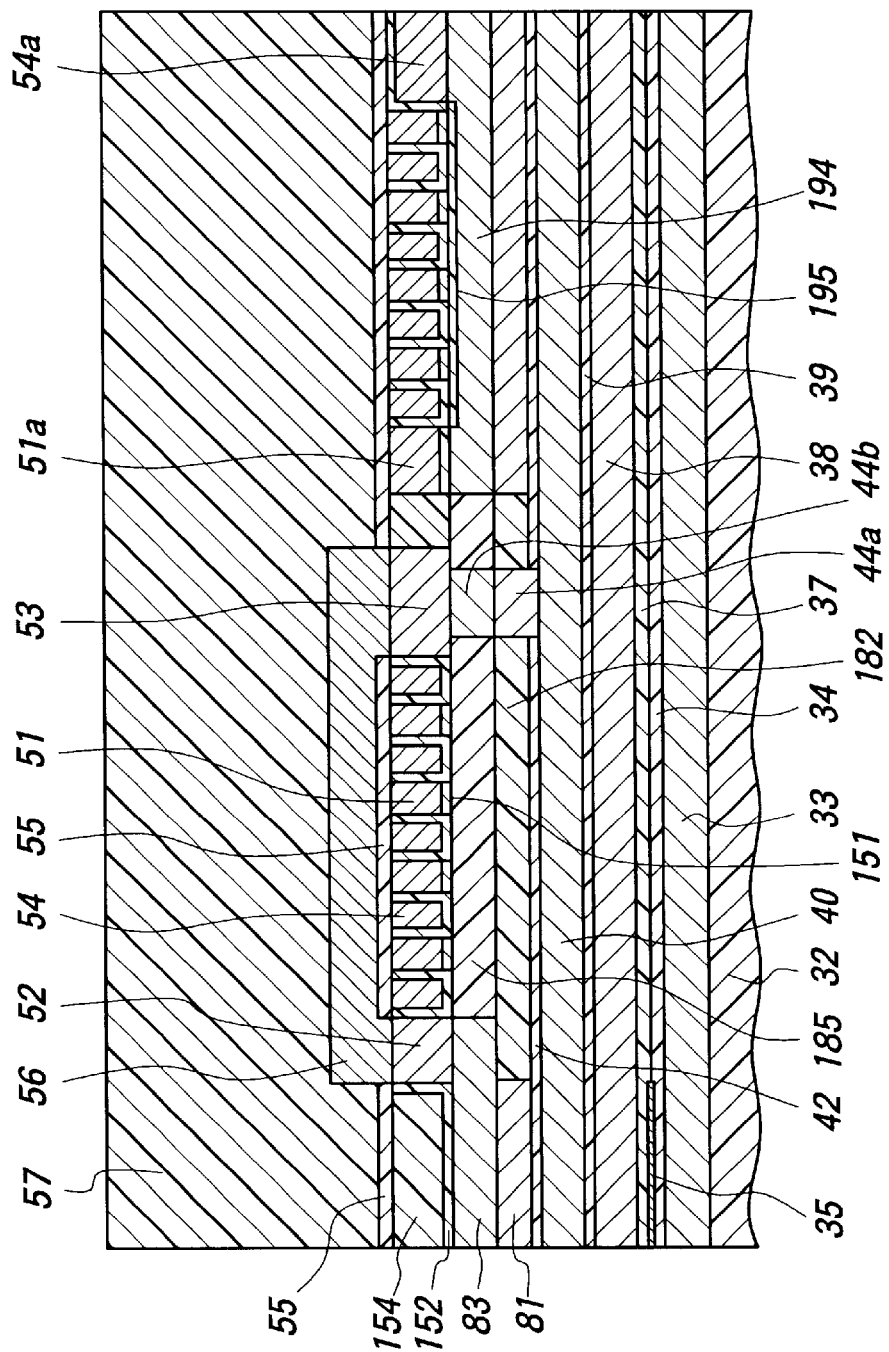
FIG. 41 is a cross sectional view illustrating a fifth embodiment of the combination type thin film magnetic head according to the invention.

FIG. 41 is a cross sectional view showing a fifth embodiment of the combination type thin film magnetic head according to the invention. In the present embodiment, a jumper wiring 194 for electrically connecting the first and second thin film coil halves is formed together with the second track pole 83. That is to say, the jumper wiring 194 is formed simultaneously with the second track pole 83 such that upon forming the thin film coil, the contact portion formed at the wide end portion 51a of the innermost coil winding of the first thin film coil half 51 is brought into contact with one end of the jumper wiring 194, and the contact portion formed at the wide end portion 54a of the outermost coil winding of the second thin film coil half 54 is brought into contact with the other end of the jumper wiring 194. An alumina insulating film 195 is formed such that the first thin film coil half 51 is not directly contacted with this jumper wiring 194. The remaining structure is identical with the fourth embodiment.

Figure 42:
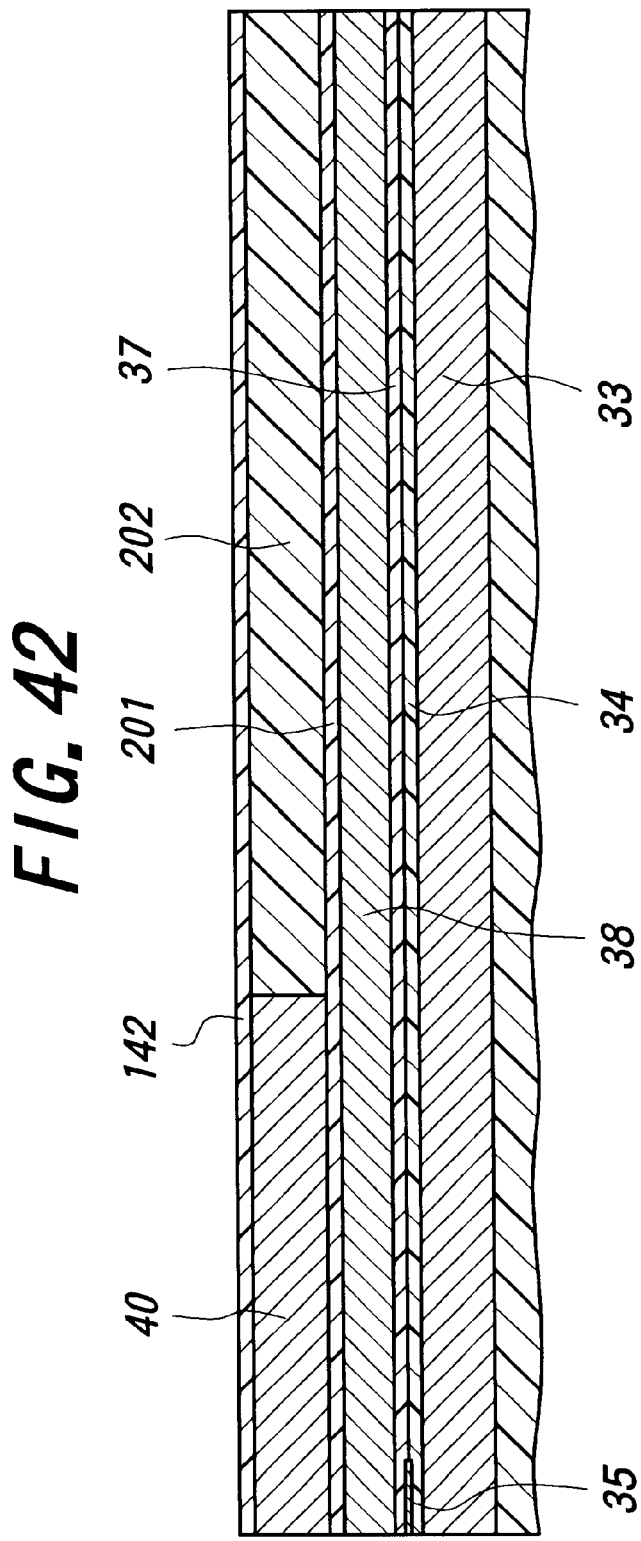
FIGS. 42–46 are cross sectional views depicting successive steps of the method of manufacturing a sixth embodiment of the combination type thin film magnetic head according to the invention.

FIGS. 42–46 are cross sectional views showing successive steps of the method of manufacturing a sixth embodiment of the combination type thin film magnetic head according to the invention. In the present embodiment, the top track pole is constructed to have the two-layer structure of first and second track poles. Similar to the first embodiment, after forming the magnetoresistive type reading thin film magnetic head element, an alumina insulating film 201 is formed on the top shield film 38 with a thickness of 0.15–0.2 μm as illustrated in FIG. 42. Then, the bottom pole 40 of the recording head element is formed on the alumina insulating film 201 with a thickness of 2.0–2.5 μm. After shaping the bottom pole 40 by a reactive ion etching (RIE) into a given pattern, an alumina insulating film 202 is formed on a whole surfaced and its surface is flattened by a chemical mechanical polishing (CMP). Like as the first embodiment, the bottom pole 40 may be formed by a plating film of NiFe (80%:20%), NiFe (45%:55%), FeCo (67%:33%) or CoNiFe (64%:18%;18%) or by a sputtering film of FeAlN, FeN, FeCo or FeZrN. In the present embodiment, the bottom pole 40 is formed by a sputtering film of FeN. Then, a non-magnetic material film 142 constituting the write gap film is formed on the flat surface of the bottom pole 40 with a thickness of 0.08–0.10 μm.

Figure 43:
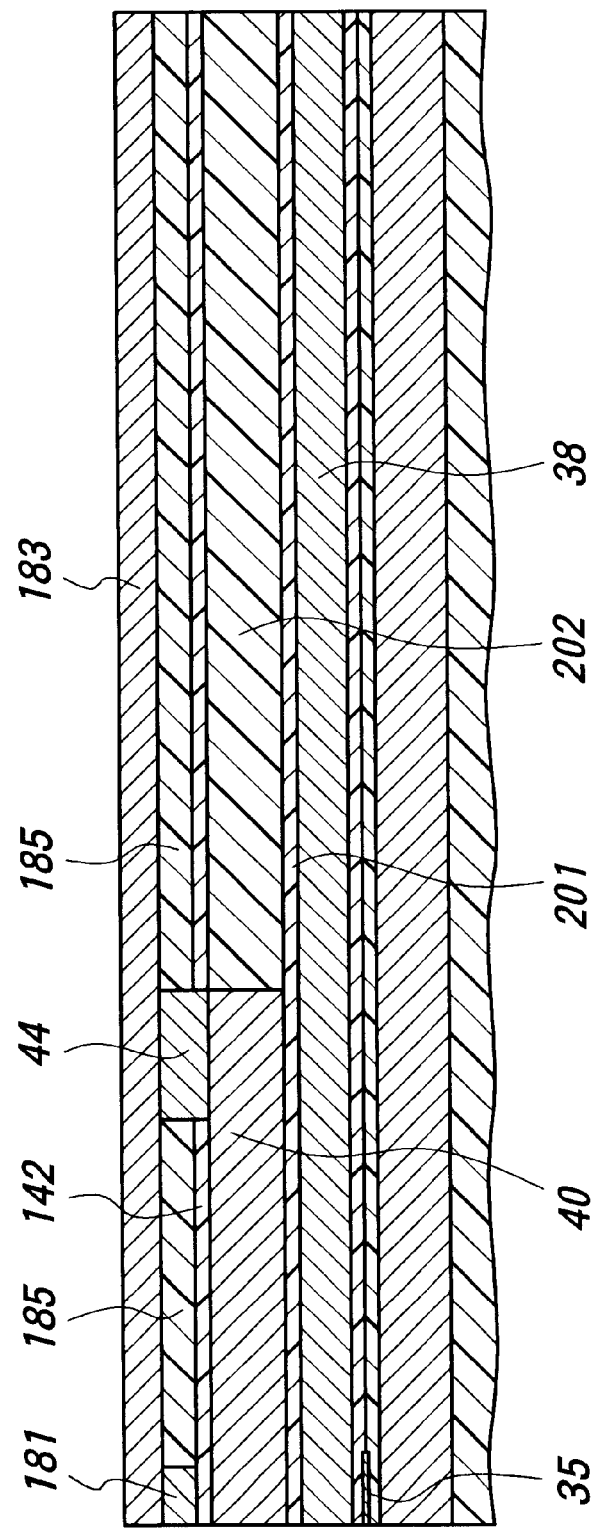
Figure 44:
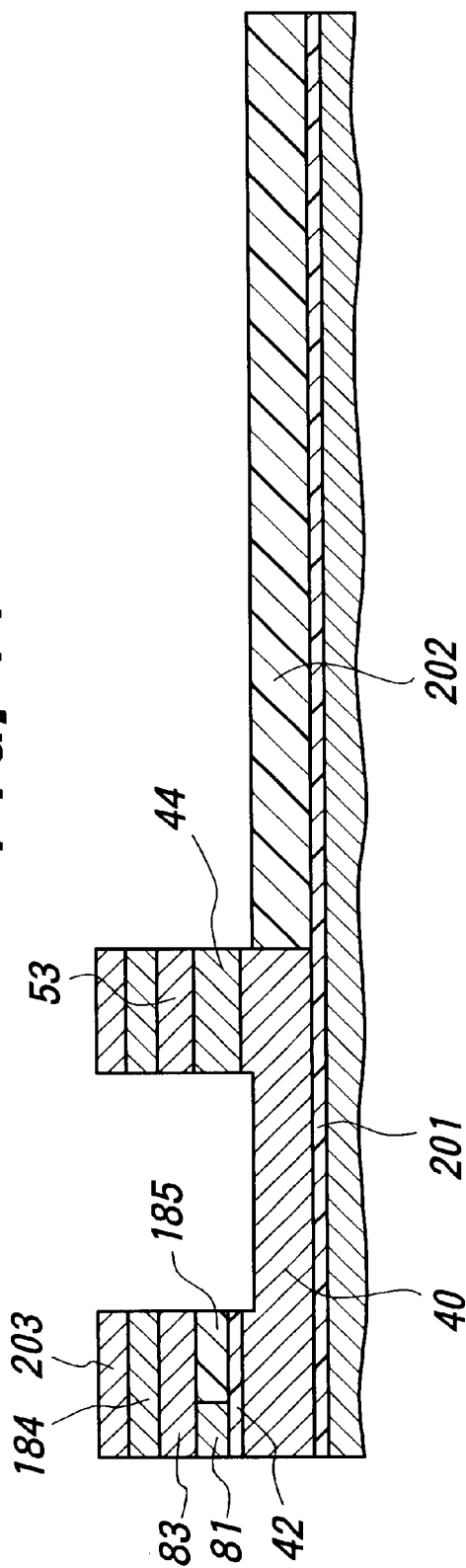

Next, as depicted in FIG. 43, after selectively removing a portion of the non-magnetic material film 142 constituting the back gap, a magnetic material film 181 having a high saturation magnetic flux density is formed by sputtering with a thickness of 0.5–0.8 μm. This magnetic material film 181 is to form a first track pole and is preferably made of FeN or FeCo having a high saturation magnetic flux density. In the present embodiment, the magnetic material film 181 is made of FeN.

Next, a mask having a given pattern is formed on the magnetic material film 181. The mask may be made of alumina, photoresist or metal. Then, a high temperature RIE process is carried out at 50–300° C., particularly at 200° C. in an atmosphere of a mixed gas of a chlorine series gas such as $BCl_2$ and $Cl_2$ and $O_2$ or $N_2$ to remove the magnetic material film 181 into a band-shape. During this process, the lower bridge portion 44a is formed. The RIE process is conducted until the surface of the non-magnetic material film 142 is exposed. After that, an alumina insulating film 185 is formed on a whole surface with a thickness of about 1 μm, and further the alumina insulating film 185 is polished by CMP to form a flat coplanar surface with the band-shaped magnetic material film 181. An amount of polishing of the CMP process is controlled such that a thickness of the magnetic material film 181 becomes to 0.3–0.6 μm. In this case, an end surface of the alumina insulating film 185 adjoining the inner end surface of the magnetic material film 181 situates near the MR height zero reference position $MR_0$ of the GMR film 35 and defines the throat height zero reference position $TH_0$. Then, a magnetic material film 183 having a high saturation magnetic flux density is formed by sputtering with a thickness of 0.8–1.5 μm, said magnetic material film 183 constituting a second track pole. The magnetic material film 183 may be made of FeCo having a high saturation magnetic flux density, but in the present embodiment, the magnetic material film 183 is made of FeN.

Next, after forming an alumina insulating film having a thickness of 0.5–1.5 μm on the magnetic material film 183 having a high saturation magnetic flux density and constituting the second track pole, a metal mask 203 made of NiFe is formed by a photolithography process at a position at which the second track pole and back gap. Then, the alumina insulating film is etched using the metal mask 203 as an etching mask to forma mask 184 made of alumina and having a given pattern. After forming a hard mask by the alumina mask 184 and metal mask 204 in the manner explained above, the magnetic material film 183 made of FeN is selectively removed by RIE to form the second track pole 83. At the same time, the upper bridge portion 44b is formed to be contacted with the lower bridge portion 44a.

After forming the second track pole 83 in the above mentioned manner, the RIE process using the hard mask formed by the alumina insulating film 184 and metal film 203 is continued to remove selectively the magnetic material film 181 and alumina insulating film 185 to form the first track pole 81. In this manner, the top track pole is formed to have the two-layer structure of the first and second track poles formed in a self-aligned manner, and therefore the pole chip of the order of submicrons can be formed accurately and stably. During this RIE process, a portion of the alumina insulating film 183 free from the track pole is also selectively removed. The RIE process is further continued to remove selectively a portion of the non-magnetic material film 142 free from the top track pole to form the write gap film 42, and then the surface of the underlying bottom pole 40 is selectively removed over a depth equal to a part of a thickness of the bottom pole to form the trim structure. In the present embodiment, the trim structure is formed by etching the surface of the bottom pole 40 over a distance of 0.3–0.4 μm, but according to the invention, after removing the non-magnetic film 142 by RIE, the surface of the bottom pole 40 may be removed partially by ion milling. By forming the trim structure solely by RIE, the bottom pole 40 can be trimmed precisely, and therefore, an undesired broadening of a magnetic flux at the air bearing surface ABS can be avoided and an erroneous writing into an adjacent track can be suppressed to avoid a side-write. Furthermore, after forming the trim structure by partially removing the surface of the bottom pole by the reactive ion etching, an ion milling process is performed for side walls of the second track pole, first track pole and bottom pole constituting the trim structure to thin a width of these members. In this case, it is preferable that the ion milling is carried out at an angle of 40–75° with respect to the side walls.

Figure 45:
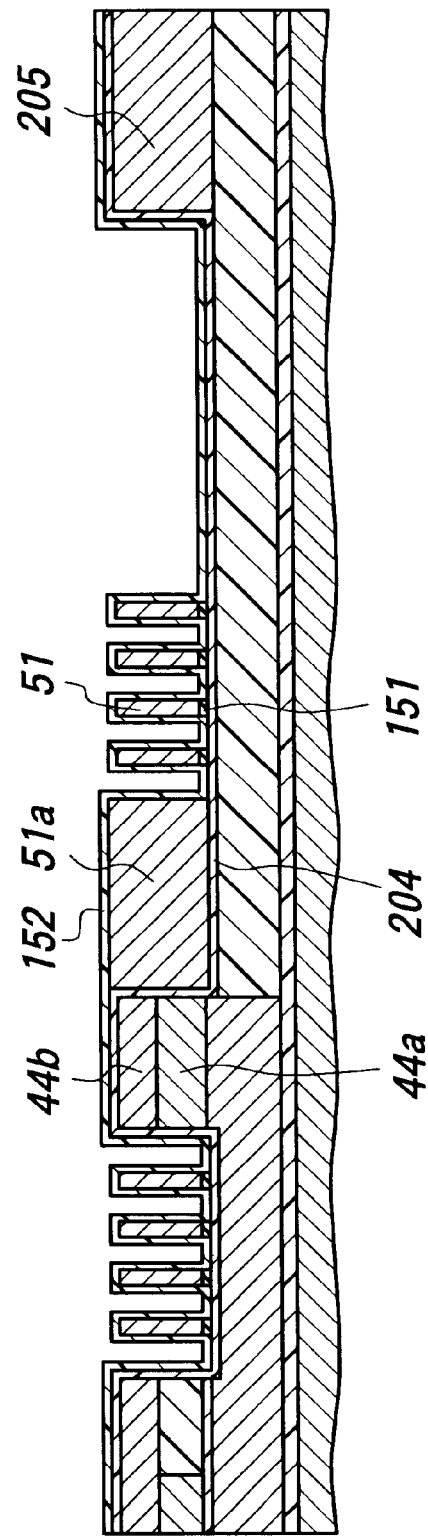
Figure 46:
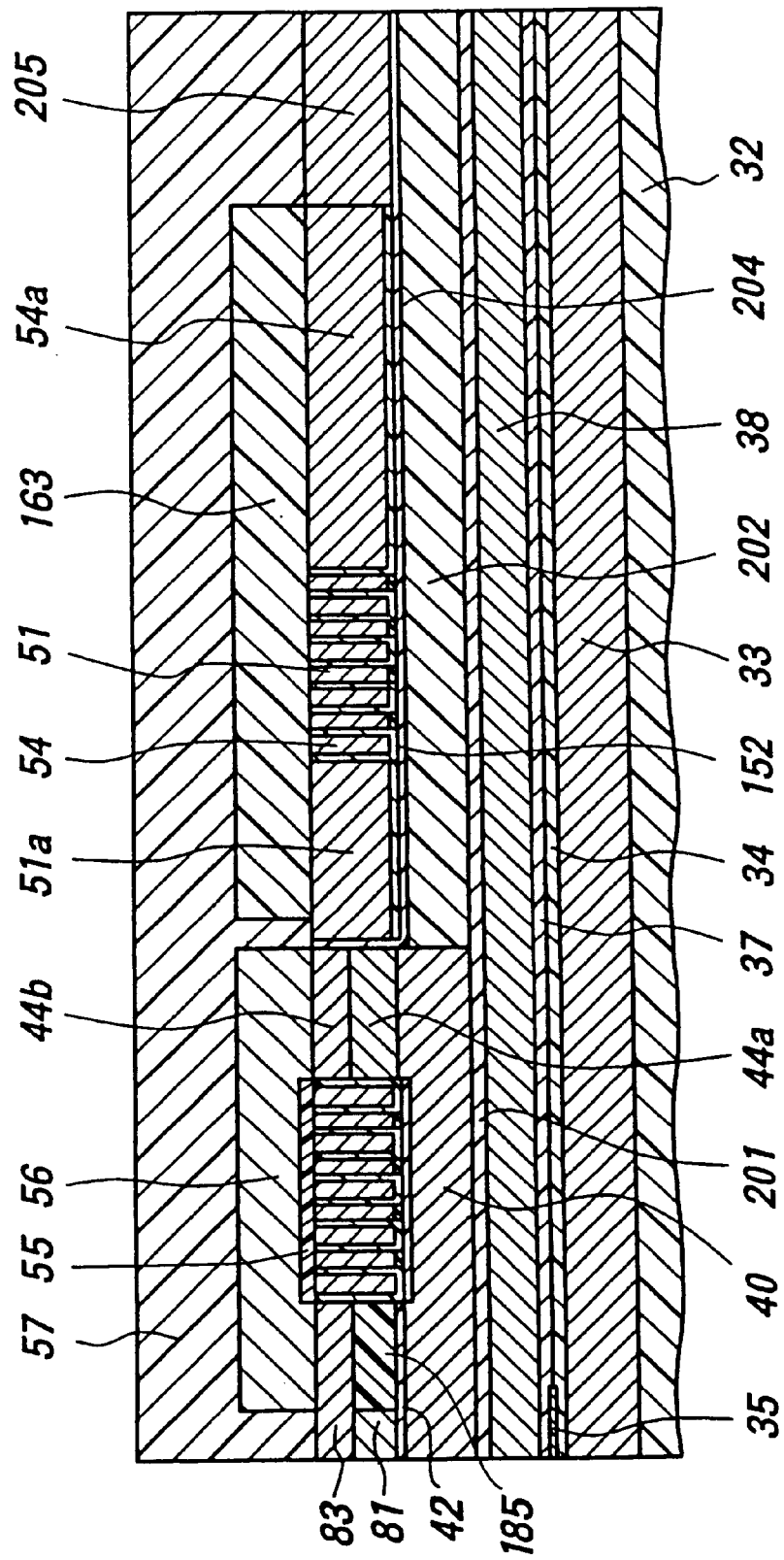

Then, after removing the hard mask formed by the alumina insulating film 184 and metal mask 203, an alumina insulating film 204 is formed on a whole surface with a thickness of 0.2 μm as shown in FIG. 45. After that, like as the previous embodiments, a thin film coil half 51 is formed using a seed layer 151, and after removing an exposed portion of the seed layer 151 is selectively removed by ion milling, an alumina insulating film 152 is formed. By conducting processes which are identical with those of the first embodiment illustrated in FIGS. 17–23, a combination type thin film magnetic head having the structure shown in FIG. 46 is obtained finally. It should be noted that an alumina insulating film 205 shown in FIG. 46 may be formed in the following manner That is to say, after forming the first thin film coil half 51, but before forming the second thin film coil half 54, the thin film coil forming region is covered with the photoresist film 153, and an alumina insulating film is formed, and then CMP is performed for this alumina insulating film. Also in the present embodiment, similar advantages as those of the first embodiment, and further since the thin film coil 51, 54 is formed within a thickness of the top track pole consisting of the first and second track poles 51 and 54, it is no more necessary to provide the middle pole 52 and the top pole 56 can be formed flat. This results in that a height of the whole head can be reduced.

FIGS. 47–60 are cross sectional and plan views illustrating successive steps of the method of manufacturing a seventh embodiment of the combination type thin film magnetic head according to the invention. In the present embodiment, thin film coil is formed by Cu-CVD or Cu-plating and a width of portions of innermost and outermost coil windings surrounded by the bottom pole and the top pole is larger that that of the remaining coil windings, and therefore a resistance of the innermost and outermost coil windings is decreased to suppress a heat generation. Furthermore, a bottom track pole is provided under the write gap film such that the bottom track pole is brought into contact with the bottom pole. Therefore, the track pole chip is constructed to have a three-layer structure consisting of the bottom track pole and two top track poles.

Similar to the first embodiment, after forming the magnetoresistive type reading thin film magnetic head element, the top shield film 38 and isolation film 39 made of alumina are formed, and then a magnetic material film 40 made of FeN is formed with a thickness of 1.0–2.0 μm as illustrated in FIGS. 47A and 47B. Then, a magnetic material film made of FeN is formed by sputtering on the magnetic material film 40 with a thickness of 1.5 μm, and a magnetic material film made of FeCo is formed by sputtering on the FeN film with a thickness of 1.0 μm. Then, a mask made of metal or alumina on the upper magnetic material film by photolithography, and the magnetic material film is etched to form a band-shaped magnetic material film 212, and the etching is further continued to form a band-shaped magnetic material film 213. Since the above mentioned mask is removed during the etching process, the mask is not shown in the drawing. Alternatively, the magnetic material film 213 made of CoNiFe may be first selectively formed on the magnetic material film 40 with a thickness of 1.5 μm by means of electrolytic plating, and then magnetic material film 212 made of CoFe may be formed on the magnetic material film 213 with a thickness of 1.0 μm. As will be explained later, the magnetic material film 213 forms the bottom track pole. A first bridge portion 44a is formed together with the magnetic material film 212 and a second bridge portion 44b is formed simultaneously with the magnetic material film 213.

Next, an alumina insulating film 214 is formed on a whole surfaced with a thickness of 0.2 μm, a seed layer made of Cu is formed on the alumina insulating film 214 with a thickness of 50 nm, and a resist mask is formed having a given pattern is formed on the seed layer. Then, a first thin film coil half 215 is formed with a thickness of 2.5–3.0 μm, and after removing the resist mask, an exposed portion of the seed layer is removed as depicted in FIGS. 48A and 48B. It should be noted that in the drawing, a seed layer formed at a bottom of the first thin film coil half 215 is shown without a reference numeral. IN this case, an end portion 215a of the innermost coil winding has a wider width to form a contact portion. In the present embodiment, in a portion of the thin film coil surrounded by the bottom pole and the top pole, innermost and outermost coil windings are formed by a second thin film coil half to be formed later, and a width of these coil windings is larger than that of the remaining coil windings. To this end, a distance W1 between the outermost coil winding of the first thin film coil half 215 and the magnetic material films 212, 213 constituting the track pole and a distance W2 between the innermost coil winding of the first thin film coil half 215 and the bridge portions 43a, 43b constituting the back gap are larger than a width W3 between successive coil windings. In the present embodiment, a width of coil windings of the thin film coil half 215 is set to 0.3 μm, W1=W2=0.4 μm and W3=0.08 μm, and a width of the innermost and outermost coil windings is larger than that of the remaining coil windings by 0.1 μm. According to the invention, this difference in a width of coil windings may be set to 0.1–0.3 μm. In order to widen a width of coil windings in a region other than that surrounded by the bottom pole and the top pole, a width W4 of a space formed on a side of the bridge portions 44a, 44b remote from the air bearing surface is larger than W1, W2 and W3. It should be noted that in the drawing a ratio of these widths is not shown accurately and only a large and small relation is represented.

Now a reason for setting the condition of W1, W2>W3 will be explained hereinbelow. As mentioned above, the first thin film coil half 215 is formed using the resist mask, and a position of the resist mask relative to the wafer might deviate. For instance, if the resist mask shifts toward the air bearing surface, a distance W1 between the outermost coil winding of the first thin film coil half 215 and the end faces of the magnetic material films 212, 213 is shortened, and if the resist mask shifts in a direction away from the air bearing surface, a distance W2 between the innermost coil winding of the first thin film coil half 215 and the bridge portions 43a, 43b constituting the back gap is shortened. If the distance W1 or W2 is shortened by a misalignment, a width of outermost or innermost coil winding of the second thin film coil half to be formed later is decreased and a resistance becomes higher than a give value. Particularly, since the outermost coil winding has a longer length than the remaining coil windings, if its width W1 is shortened, a resistance value becomes extremely high and an undesired heat generation might occur. If such a heat generation occurs near the air bearing surface, the pole chip might protrude outwardly (pole protrusion) and might be contacted with a record medium. When W1, W2>W3 is satisfied, although a position of the resist mask for forming the first thin film coil half 215 is deviated, a width of the outermost and innermost coil windings of the second thin film coil half is never smaller than a given width, and the above mentioned problem of pole protrusion can be effectively avoided. Furthermore, upon forming the first thin film coil half 46, since the distances between the outermost and inner coil windings of the first thin film coil half 215 and the magnetic material films 212, 213 and bridge portions 43a, 43b are long, undesired light reflection from the magnetic material films and bridge portions during a light exposure of a photolithography can be reduced, and therefore the photolithography can be performed easily and accurately.

Next, as illustrated in FIGS. 49A and 49B, an alumina insulating film 216 is selectively formed on a whole surface with a thickness of 0.1 μm, and a resist film 217 is formed on the thin film coil forming region. The alumina insulating film 216 is preferably formed by CVD. That is to say, the alumina insulating film is preferably formed by an atomic layer process, in which a CVD chamber having the wafer installed therein is kept at a temperature of 100–400° C. under a reduced pressure state of 1–2 Torr, and Al(CH$_3$)$_3$ or AlCl$_3$ and H$_2$O, N$_2$, N$_2$O or H$_2$O$_2$ are alternately projected intermittently to deposit an alumina by a chemical reaction. In the present embodiment, the reduced pressure alumina-CVD film 216 is formed by projecting a steam (H$_2$O$_2$) and Al(CH$_3$)$_3$ alternately at a rate of once a second to the chamber kept at 250° C. under a reduced pressure of 1.5 Torr Such an alumina-CVD film 216 has an excellent electrically insulating property as well as a superior step-coverage. Then, a photoresist film 217 having a thickness of 3–4 μm is formed to cover the thin film coil forming region.

Figure 51A:
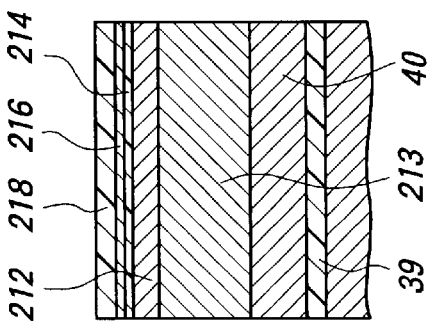
Figure 51B:
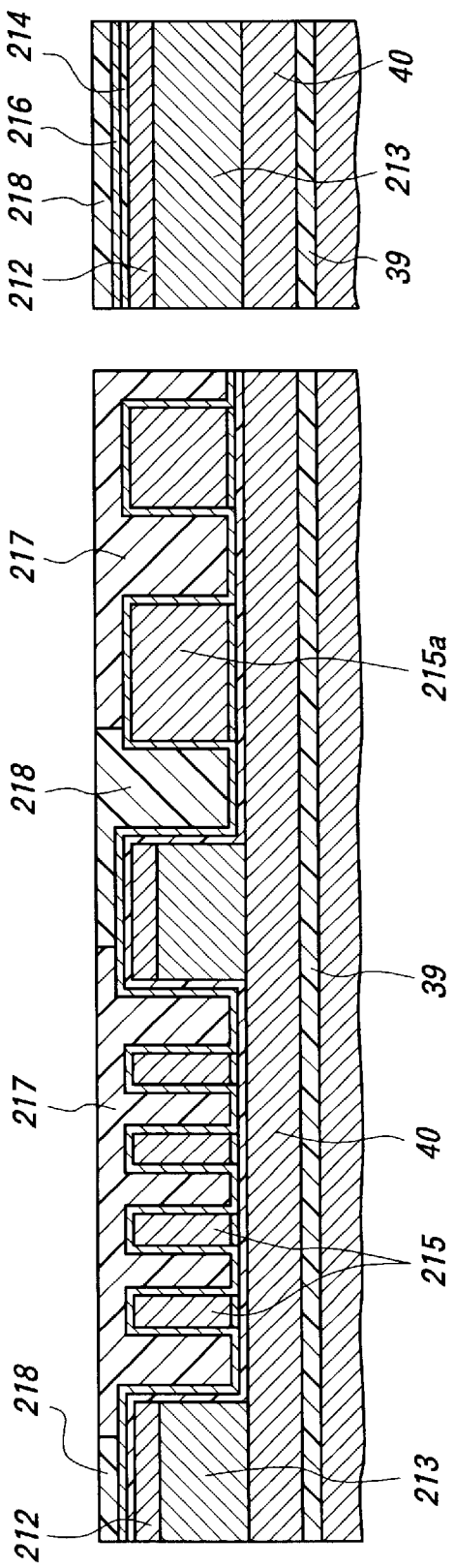

Next, after forming an alumina insulating film 218 on a whole surface with a thickness of 3–4 μm as shown in FIGS. 50A and 50B, the alumina insulating film 218 is polished by CMP to expose the photoresist film 217 as depicted in FIGS. 51A and 51B. As shown in the drawing, the alumina insulating film 218 is remained between the bridge portions 44a, 44b made of a magnetic material constituting the back gap and the innermost coil winding of the first thin film coil half 215. The alumina insulating film 218 is also remained near the air bearing surface.

Furthermore, after forming the photoresist film 217 by a wet chemical etching as shown in FIGS. 52A and 52B, a Cu-CVD film 219 is formed with a thickness of 1.5–2.5 μm as depicted in FIGS. 53A and 53B. Next, a CMP process is performed to expose the first thin film coil half 215, magnetic material film 214, second bridge portion 44b and alumina insulating film 218 are exposed to a flat coplanar surface as illustrated in FIGS. 54A and 54B. By this CMP process, a second thin film coil half 220 is formed in a self-aligned manner between successive coil windings of the first thin film coil half 215 with interposing the alumina-CVD insulating film 216. In the present embodiment, since W2, W2>W3, an outermost coil winding 220a and an innermost coil winding 220b of the second thin film coil half 220 have a width larger than a width of the remaining coil windings. Although not shown in FIGS. 54A and 54B, an end portion of the innermost coil winding 220b of the second thin film coil half 220 constituting a contact portion has a wide width. In the present embodiment, the second thin film coil half 220 is formed by the Cu-CVD film, but like as the previous embodiments, the second thin film coil half may be formed by a Cu-plating film like as the first thin film coil half.

Next, a photoresist mask 221 is selectively formed on the second bridge portion 44b and the end portions of the innermost coil windings of the first and second thin film coil halves 215 and 220, and then an alumina insulating film 222 constituting the write gap film is formed with a thickness of 0.1 μm as shown in FIGS. 55A and 55B.

Next, as depicted in FIGS. 56A and 56B, in order to form a top track pole, a magnetic material film 223 made of FeCo or FeN is formed with a thickness of 1.0 μm, and further a magnetic material film 224 made of CoNiFe is formed with a thickness of 2–3 μm in accordance with a given pattern. After that, the lower magnetic material film 223 made of FeN or FeCo is selectively removed by RIE at a temperature of 200° C. under a chlorine series gas atmosphere such as BCl$_2$ and Cl$_2$ to form the top track pole while the upper magnetic material film 224 made of CoFeNi is used as an etching mask.

Figure 57:
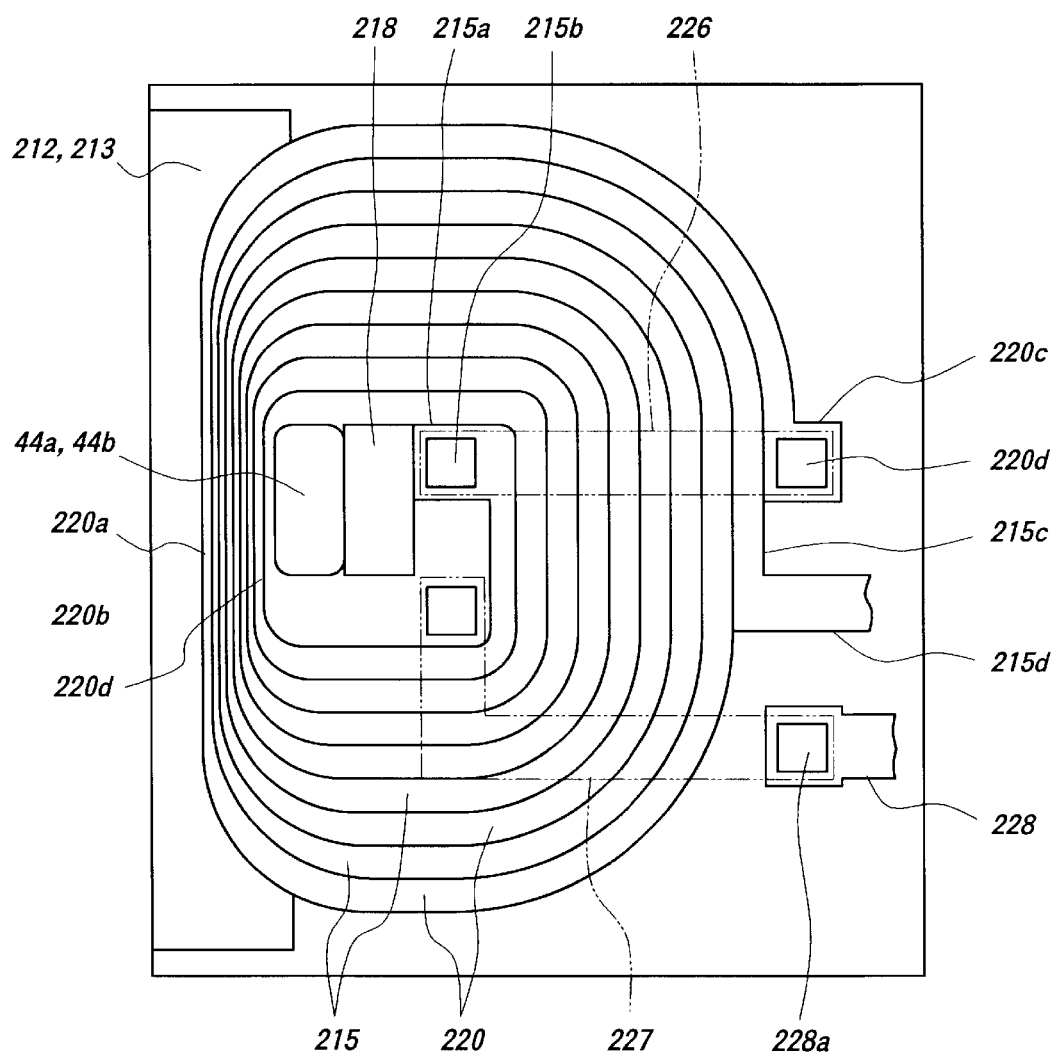
FIG. 57 is a plan view representing an arrangement of first and second thin film coil halves and first and second jumper wirings connecting the thin film coil halves.
Figure 59:
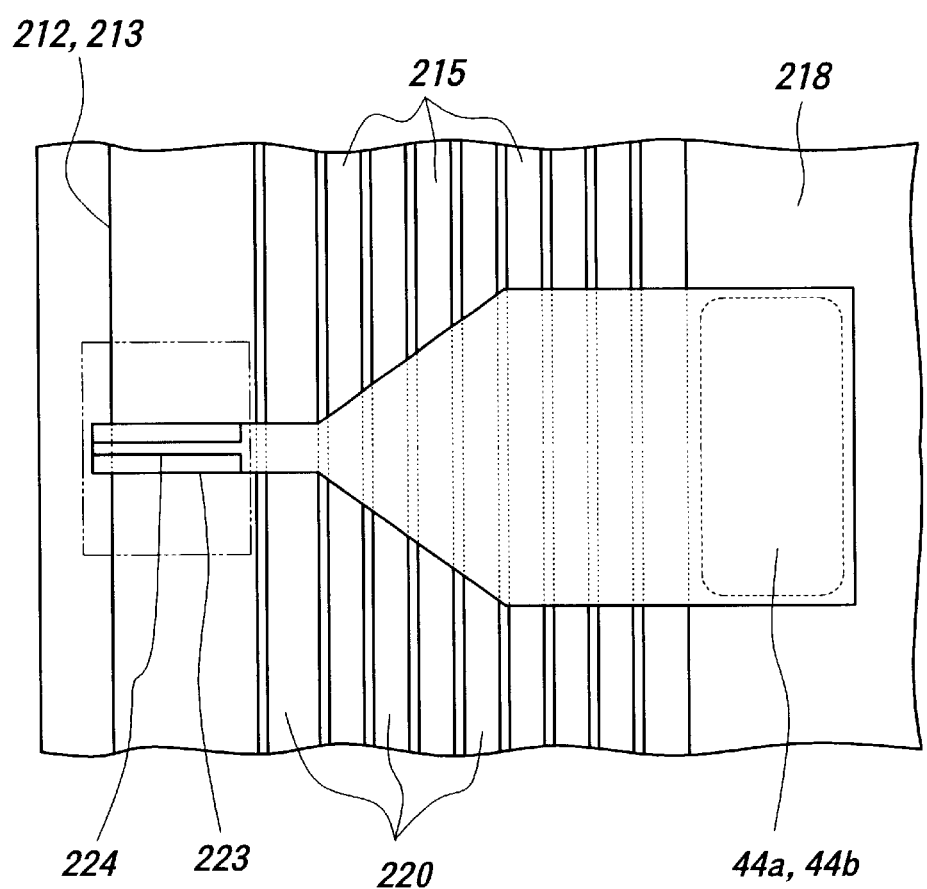
FIG. 59 is a plan view depicting a top track pole and a resist opening patter.

During the formation of the magnetic material films 223 and 224, a first jumper wiring for connecting electrically the end portion of the innermost coil winding of the first thin film coil half 215 to the end portion of the outermost coil winding of the second thin film coil half 220 and a second jumper wiring for electrically connecting the end portion of the innermost coil winding of the second thin film coil half 220 to a contact pad for connecting the thin film coil to an external circuit are made of same magnetic materials as those of the magnetic material films 223 and 224. That is to say, as shown in FIG. 57, a first jumper wiring 226 having one end contacted with the contact portion 215b of the innermost coil winding 215a of the first thin film coil half 215 and the other end contacted with the contact portion 220d formed at the end portion 220c of the outermost coil winding 220a of the second thin film coil half 220 and a second jumper wiring 227 one end contacted with the contact portion 220d formed at the end portion of the innermost coil winding 220b of the second thin film coil half 220 are formed. It should be noted that these jumper wirings 226 and 227 are formed on the alumina-CVD insulating film 222, but in FIG. 57, this alumina-CVD insulating film is dispensed with. The end portion 215c of the outermost coil winding of the first thin film coil half 215 is conducted to the first contact pad by means of a third wiring 215d which is formed integrally with the outermost coil winding. The other end of the second jumper wiring 227 is brought into contact with a fourth contact portion 228a of a fourth wiring 228 which is formed together with the first thin film coil half 215 via an opening formed in the alumina-CVD film 222, and the fourth wiring 228 extends up to the second contact pad.

As stated above, the first and second contact pads are connected to the opposite ends of the thin film coil, and the third and fourth contact pads are connected to the electrode films 36 of the GMR element. Furthermore, the first and second jumper wirings 226 and 227 are formed simultaneously with the formation of the magnetic material film constituting the top pole, and since the alumina insulating film 218 is formed between the bridge portions 43a, 43b constituting the back gap and the end portions of the innermost coil windings of the first and second thin film coil halves 215 and 220, the first and second jumper wirings 226 and 227 can be effectively prevented from being brought into contact with the bridge portions 43a, 43b and can be protected from being short-circuited by means of the bridge portions 44a, 44b.

Figures 60A, 60B:
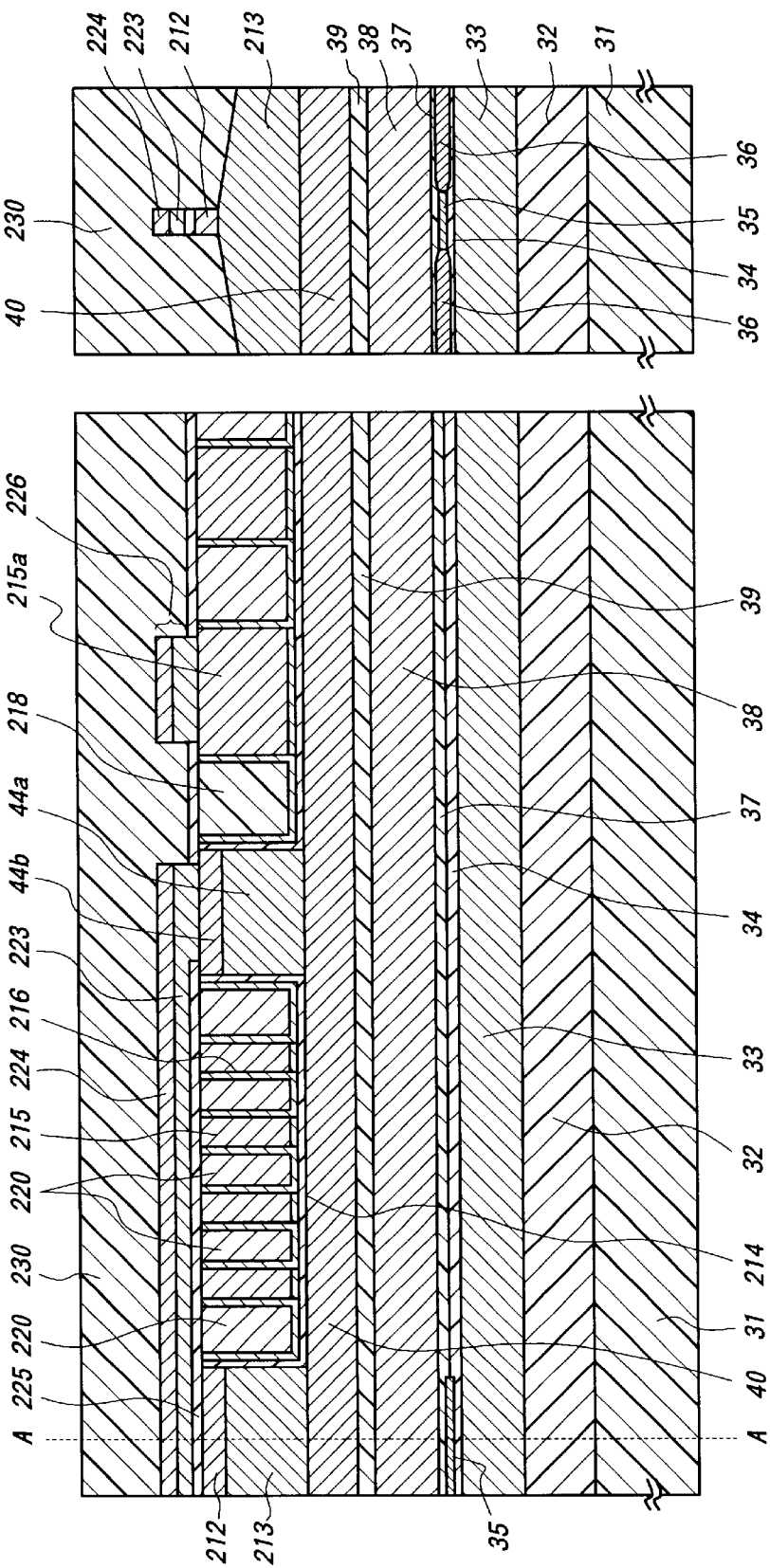
FIGS. 60A and 60B are cross sectional views illustrating a structure after forming an overcoat film.

After that, a photoresist pattern covering the thin film coil forming region is formed or a photoresist pattern having an opening at the writing track pole, the alumina insulating film 222 is etched by ion milling to form the write gap film 225, and then the magnetic material film 212 is selectively removed to form the bottom track pole. Furthermore, the surface of the underlying magnetic material film 212 is selectively removed partially over a depth equal to a part of a thickness of this film 212 to form the trim structure as shown in FIGS. 58A and 58B as well as in FIG. 59. The above mentioned opening formed in the photoresist pattern is denoted by an imaginary line in FIG. 59. Finally, as illustrated in FIGS. 60A and 60B, an overcoat film 230 made of alumina is formed on a whole surface.

The present invention is not limited to the embodiments explained above, but many modifications and alternations may be conceived with the scope of the invention. For instance, in the above embodiments, the thin film magnetic head is constructed as the combination type thin film magnetic head having the magnetoresistive type thin film magnetic head element and inductive type thin film magnetic head element stacked one on the other, but according to the invention, the thin film magnetic head may be constructed as the inductive type thin film magnetic head. In the above embodiments, the first thin film coil half is formed by electrolytic plating and the second thin film coil half is formed by Cu-CVD, but according to the invention, the second thin film coil half may be formed by electrolytic plating. Since the Cu-CVD film has a superior step-coverage than the Cu-plating film the second thin film coil half is preferably formed by Cu-CVD. Furthermore, in the above explained embodiments, after forming the Cu-CVD film having a large thickness, unnecessary portions of Cu-CVD film is removed by CMP, but it may be removed by a dry etching or ion beam milling. Alternatively, the Cu-CVD film may be first etched roughly by CMP and then may be precisely etched by a dry etching such as an ion beam milling and sputter etching. In the above mentioned embodiments, the innermost coil winding of the first thin film coil half is connected electrically to the outermost coil winding of the second thin film coil half by means of the jumper wiring, but the innermost coil winding of the second thin film coil half may be connected to the outermost coil winding of the first thin film coil half.

In the thin film magnetic head, the combination type thin film magnetic head and the method of manufacturing them according to the invention, the thin film coil can be formed very precisely in a self-aligned manner, and therefore a distance between successive coil windings of the thin film coil halves can be shortened extremely. This results in that a magnetic path length can be shortened and the properties of the thin film magnetic head such as magnetic flux rising property, NLTS property and over-write property can be improved. That is to say, the very thin insulating film having a thickness of 0.03–0.25 $\mu$m and provided between successive coil windings of the thin film coil halves is made of an inorganic insulating material such as alumina, silicon oxide and silicon nitride which can be miniaturized very finely, and thus a distance between successive coil windings can be shortened to 0.03–0.25 $\mu$m. It is particularly preferable to form the second thin film coil by CVD having a superior step-coverage. In this manner, it is possible to generate a sufficiently large magnetic flux by a single layer thin film coil, and an apex angle can be reduced and a width of track can be decreased. Moreover, since a distance between successive coil windings of the first thin film coil half can be large, an etching process for removing the seed film can be performed well and debris of etched material could hardly adhered to coil windings.

In the embodiment in which the top track pole of the pole chip portion is formed by the two-layer structure of the first and second track poles an in the embodiment in which the pole chip portion is formed by the stacked structure of the bottom track pole and top track pole, the magnetic material films forming the pole chip portion are formed on the flat surfaces, and therefore the track poles can be formed by etching into a given pattern accurately. Furthermore, these track poles are formed in a self-aligned manner, and thus the track poles having a very narrow width such as 0.1–0.3 $\mu$m can be formed precisely and stably. These track poles are made of magnetic materials having a high saturation magnetic flux density such as FeN and FeCo, and a magnetic flux generated by the thin film coil is not saturated and passes effectively through the track poles having a miniaturized structure. Therefore, a loss of a magnetic flux can be avoided and a large magnetic flux required by a record medium having a high surface recording density can be generated effectively. In this manner, the performance of the thin film magnetic head can be improved.

In the embodiment in which the track chip portion is formed by the track pole having a laminated structure, when the plating film of CoNiFe is used as an etching mask in RIE for forming the second track pole of the top track pole, an etching rate of the plating film of CoNiFe is smaller than that of the magnetic film of FeN or FeCo by two to three times. Therefore, the plating film of CoNiFe is suitable for RIE and the track pole having a desired thickness can be formed accurately. Furthermore, the plating film of CoNiFe has a higher hardness than FeN or FeCo, and thus if the track pole is formed solely by the plating film of CoNiFe, a thickness has to be increased and an undesired peeling-off might occur due to an internal stress. However, according to the invention, since the top track pole has the two-layer structure, the plating film of CoNiFe can be made thin although the plating film of CoNiFe is used as the top track pole, and the problem of peeling-off can be avoided.

If the track pole having a narrow width of 0.1–0.2 $\mu$m is formed solely by the plating film of CoNiFe, there are many problems in a mass production due to a difficulty in a composition control of three components. However, in the embodiment according to the invention in which the track pole is formed to have the two-layer structure, even if a thickness or a composition of the upper magnetic material film formed by the plating film of CoNiFe fluctuate slightly, the underlying magnetic material film can be etched accurately. In this manner, according to the present invention, it is possible to provide the thin film magnetic head comprising the track chip portion having a very narrow width of 0.1–0.2 $\mu$m, while the thin film magnetic head has superior properties and undesired leakage and saturation of a magnetic flux can be suppressed.

In the combination type thin film magnetic head according to the invention, since the top track pole is made of the magnetic materials having a high saturation magnetic flux density, a height (thickness) of the track pole can be reduced. Therefore, a thickness of the frame pattern of photoresist defining a shape of the magnetic material films can be also reduced, and thus a focus of photolithography can be sharp and a resist having a higher sensitivity can be used. In this manner, a photolithography having a higher resolution can be performed and the miniaturized top track pole can be formed accurately.

In the embodiment of the present invention, the first track pole is formed by the track chip portion having a very narrow width and the contact portion having a wider width. If the bottom pole is partially etched to form the trim structure by a conventional ion milling process, a shadow portion is formed at a corner at which a width changes abruptly and the etching could not be performed accurately. However, according to the invention, the top track pole is formed by RIE, the etching can be conducted effectively even at such a corner and the bottom pole can be etched accurately to attain the precisely defined trim structure.

In the conventional method of forming the trim structure by etching the bottom pole partially by ion milling, a width of the track pole might be thinned by 0.1 $\mu$m. Particularly, when the track pole has the above mentioned corner at which a width changes abruptly, a width of the track pole becomes larger near the corner and is gradually decreased away from the corner. An amount of polishing for forming the air bearing surface is determined by the MR height of the GMR element and is not always constant. Therefore, a width of the track pole is decreased toward its tip, a width of the track pole at the air bearing surface fluctuates. According to the invention, since the track pole is formed to have a constant width over its whole length, even if a position of the air bearing surface is changed, the track pole has always a constant width at the air bearing surface.

Furthermore, in the embodiments, in which the jumper wirings for electrically connecting the first and second thin film coil halves to each other are formed by a same magnetic material as that of the top pole simultaneously with the top pole, the wiring pattern forming process becomes simple and a throughput can be improved.

What is claimed is:

1. A thin film magnetic head comprising:
    a first magnetic member made of a magnetic material and including a pole portion which is to be opposed to a magnetic record medium;
    a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
    a write gap film made of a non-magnetic material and being sandwiched between said pole portions of the first and second magnetic members at least at the air bearing surface;
    a thin film coil having a portion arranged between said first and second magnetic members in an electrically isolated manner; and
    a substrate for supporting said first and second magnetic members, write gap film and thin film coil;
    wherein said thin film coil comprises:
        a first thin film coil half having coil windings mutually separated by a given distance;
        a second thin film coil half having coil windings which are formed between successive coil windings of the first thin film coil half in a self-aligned manner;
        an insulating film formed to embed spaces between successive coil windings of the first and second thin film coil halves; and
        a jumper wiring connecting electrically an innermost coil winding of one of the first and second thin film coil halves to an outermost coil winding of the other of the first and second thin film coil halves,
        said first magnetic member is formed by a first pole, said second magnetic member is formed by a track pole which is opposed to said pole portion of the first magnetic member via the write gap film and a second pole having one end magnetically coupled with the track pole and the other end magnetically coupled with the first pole at the back gap, and said jumper wiring is made of a same material as that of the second pole of the second magnetic member and is formed simultaneously with the second pole.

2. The thin film magnetic head according to claim 1, wherein said first thin film coil half includes coil windings formed by electrolytic plating and said second thin film coil half includes coil windings formed by CVD.

3. The thin film magnetic head according to claim 2, wherein said first thin film coil half includes coil windings formed by electrolytic plating of copper and said second thin film coil half includes coil windings formed by Cu-CVD.

4. The thin film magnetic head according to claim 1, wherein said first and second thin film coil halves include coil windings formed by electrolytic plating.

5. The thin film magnetic head according to claim 4, wherein said first and second thin film coil halves include coil windings formed by electrolytic plating of copper.

6. The thin film magnetic head according to claim 1, wherein end portions of the coil windings to which said jumper wiring is connected have a larger width.

7. The thin film magnetic head according to claim 1, wherein a thickness of said insulating film interposed between successive coil windings of the first and second thin film coil halves is 0.03–0.25 µm.

8. The thin film magnetic head according to claim 7, wherein said insulating film interposed between successive coil windings of the first and second thin film coil halves is made of an inorganic insulating material selected from the group consisting of alumina, silicon oxide and silicon nitride.

9. The thin film magnetic head according to claim 8, wherein said insulating film interposed between successive coil windings of the first and second thin film coil halves is formed by an alumina-CVD film.

10. A combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;
wherein said inductive type thin film magnetic head element comprises:
a first pole made of a magnetic material and extending inwardly from the air bearing surface;
a write gap film made of a non-magnetic material and formed on one surface of the first pole to extend inwardly from the air bearing surface over a distance at least equal to a length of a track pole;
a bottom track pole made of a magnetic material and formed on a surface of the write gap film opposite to a surface which is brought into contact with the first pole to extend inwardly from the air bearing surface over a distance at most equal to a length of the track pole;
a first non-magnetic material film extending inwardly over a given distance such that the first non-magnetic material film has a flat surface which is coplanar with a second surface of the bottom track pole opposite to a first surface which is brought into contact with the write gap film and an outer end surface of the non-magnetic material film which is brought into contact with an inner end surface of the bottom track pole remote from the air bearing surface defines a throat height zero reference position;
a top track pole made of a magnetic material and formed on the coplanar flat surface of the bottom track pole and first non-magnetic material film to form a track chip portion extending inwardly from the air bearing surface at least to the outer end surface of the first non-magnetic material film and an end surface of the track chip portion is exposed to the air bearing surface and a contact portion which is continued from the track chip portion and has a width larger than a width of the track chip portion;
a second non-magnetic material film made of a non-magnetic material and formed to surround an aligned side surface of the bottom track pole, first non-magnetic material film and top track pole and have a flat surface which forms a coplanar flat surface together with a second surface of the top track pole opposite to a first surface which is brought into contact with a flat coplanar surface of the top track pole, bottom track pole and first non-magnetic material film;
a thin film coil formed in an electrically isolated manner in an inner region with respect to an end surface of the second non-magnetic material film which is brought into contact with an end surface of the contact portion of the top track pole; and
a second pole made of a magnetic material and formed such that one end of the second pole is magnetically coupled with the contact portion of the top track pole and the other end of the second pole is magnetically coupled with the first pole at the back gap remote from the air bearing surface, said first and second poles surrounding a part of the thin film coil;
wherein said thin film coil comprises:
a first thin film coil half having coil windings mutually separated by a given distance;
a second thin film coil half having coil windings which are formed between successive coil windings of the first thin film coil half in a self-aligned manner;
an insulating film formed to embed spaces between successive coil windings of the first and second thin film coil halves; and
a jumper wiring connecting electrically an innermost coil winding of one of the first and second thin film coil halves to an outermost coil winding of the other of the first and second thin film coil halves.

11. The combination type thin film magnetic head according to claim 10, wherein a surface of said first non-magnetic material film opposite to the flat coplanar surface with the bottom track pole is brought into contact with the surface of the write gap film.

12. The combination type thin film magnetic head according to claim 10, wherein a surface of said first non-magnetic material film opposite to the flat coplanar surface with the bottom track pole is extended through the write gap film to form a trim structure.

13. The combination type thin film magnetic head according to claim 10, wherein said bottom and top track poles are formed in a self-aligned manner by reactive ion etching, and a surface of said second non-magnetic material film opposite to the constituting the flat coplanar surface together with the top track pole is extended toward the first pole through the write gap film to form a trim structure.

14. The combination type thin film magnetic head according to claim 10, wherein said top track pole is made of a magnetic material selected from the group consisting of FeN, FeCo, CoNiFe, FeAlN and FeZrN.

15. The combination type thin film magnetic head according to claim 10, wherein said top track pole is formed by a plating film of CoNiFe or FeCo.

16. The combination type thin film magnetic head according to claim 10, wherein said top track pole is formed by a sputtering film of a magnetic material selected from the group consisting of FeN, FeCo, FeAlN and FeZrN.

17. The combination type thin film magnetic head according to claim 10, wherein both of said top and bottom track poles are made of a magnetic material selected from consisting of FeN, FeCo, FeAlN, CoNiFe and FeZrN.

18. The combination type thin film magnetic head according to claim 17, wherein said top track pole is formed by a sputtering film of a magnetic material selected from the group consisting of FeN, FeCo, FeAlN and FeZrN.

19. The combination type thin film magnetic head according to claim 10, wherein said top track pole is formed by a plating film of FeCo or CoNiFe.

20. The combination type thin film magnetic head according to claim 10, wherein said bottom track pole is made of a magnetic material selected from the group consisting of FeN, FeCo, CoNiFe, FeAlN, FeZrN and NiFe.

21. The combination type thin film magnetic head according to claim 20, wherein said bottom track pole is formed by a sputtering film of a magnetic material selected from the group consisting of FeN, FeCo, FeAlN and FeZrN.

22. The combination type thin film magnetic head according to claim 20, wherein said bottom track pole is formed by a plating film of a magnetic material selected from the group consisting of FeCo, CoNiFe and NiFe.

23. The combination type thin film magnetic head according to claim 10, wherein said first thin film coil half includes coil windings formed by electrolytic plating and said second thin film coil half includes coil windings formed by CVD.

24. The combination type thin film magnetic head according to claim 23, wherein said first thin film coil half includes coil windings formed by electrolytic plating of copper and said second thin film coil half includes coil windings formed by Cu-CVD.

25. The combination type thin film magnetic head according to claim 10, wherein said first and second thin film coil halves include coil windings formed by electrolytic plating.

26. The combination type thin film magnetic head according to claim 25, wherein said first and second thin film coil halves include coil windings formed by electrolytic plating copper.

27. The combination type thin film magnetic head according to claim 10, wherein the coil windings to which one end and the other end of said jumper wiring are connected have contact portions having a wide width.

28. The combination type thin film magnetic head according to claim 10, wherein said jumper wiring is made of a same material as the second pole and is formed simultaneously with the second pole.

29. The combination type thin film magnetic head according to claim 10, wherein said jumper wiring is made of a same material as the top track pole and is formed simultaneously with the top track pole.

30. The combination type thin film magnetic head according to claim 10, wherein said jumper wiring is formed by a first electrically conductive member made of a same material as the bottom track pole and is formed simultaneously with the bottom track pole and a second electrically conductive member made of a same material as the top track pole and is formed simultaneously with the top track pole.

31. The combination type thin film magnetic head according to claim 10, wherein a thickness of said insulating film interposed between successive coil windings of the first and second thin film coil halves is 0.03–0.25 $\mu$m.

32. The combination type thin film magnetic head according to claim 31, wherein said insulating film interposed between successive coil windings of the first and second thin film coil halves is made of an inorganic insulating material selected from the group consisting of alumina, silicon oxide and silicon nitride.

33. The combination type thin film magnetic head according to claim 10, wherein said insulating film interposed between successive coil windings of the first and second thin film coil halves is formed by an alumina-CVD film.

34. A combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;
    wherein said inductive type thin film magnetic head element comprises:
        a bottom pole made of a magnetic material and formed on the substrate to extend inwardly from the air bearing surface;
        a bottom track pole made of a magnetic material and formed on one surface of the bottom pole to extend inwardly from the air bearing surface over a distance equal to a length of a track portion;
        a bridge portion made of a magnetic material and formed on one surface of the bottom pole to define a back gap remote from the air bearing surface;
        a thin film coil formed on said one surface of the bottom pole such that one surface of the thin film coil opposite to the bottom pole constitutes a flat coplanar surface together with the bottom track pole;
        a write gap film made of a non-magnetic material and formed on the flat coplanar surface of the bottom track pole and thin film coil to form a flat surface; and
        a top pole made of a magnetic material and formed on the flat surface of the thin film coil opposite to the bottom track pole such that the top pole includes a top track pole aligned with the bottom track pole and is brought into contact with said bridge portion;
    wherein said thin film coil comprises:
        a first thin film coil half having coil windings mutually separated by a given distance;
        a second thin film coil half having coil windings which are formed between successive coil windings of the first thin film coil half in a self-aligned manner;
        an insulating film formed to embed spaces between successive coil windings of the first and second thin film coil halves;
        a first jumper wiring connecting electrically an innermost coil winding of one of the first and second thin film coil halves to an outermost coil winding of the other of the first and second thin film coil halves; and
        a second jumper wiring having one end connected to an innermost coil winding of the other of the first and second thin film coil halves.

35. The combination type thin film magnetic head according to claim 34, wherein a portion of the surface of the bottom pole which is not superposed with the bottom and top track poles is extended toward the substrate to form a trim structure.

36. The combination type thin film magnetic head according to claim 34, wherein said top pole has a two-layer structure of first and second magnetic material films.

37. The combination type thin film magnetic head according to claim 36, wherein said first and second magnetic material films of the top pole are formed by a plating film of a magnetic material selected from the group consisting of FeN, FeCo, FeAlN, CoNiFe and FeZrN.

38. The combination type thin film magnetic head according to claim 36, wherein both of said top and bottom poles are formed by a plating film of a magnetic material selected from the group consisting of FeN, FeCo, CoNiFe, FeAlN and FeZrN.

39. The combination type thin film magnetic head according to claim 34, wherein said first thin film coil half includes coil windings formed by electrolytic plating and said second thin film coil half includes coil windings formed by CVD.

40. The combination type thin film magnetic head according to claim 39, wherein said first thin film coil half includes coil windings formed by electrolytic plating of copper and said second thin film coil half includes coil windings formed by Cu-CVD.

41. The combination type thin film magnetic head according to claim 34, wherein said first and second thin film coil halves include coil windings formed by electrolytic plating of copper.

42. The combination type thin film magnetic head according to claim 34, wherein contact portions having a wide width are provided at end portions of the coil windings to which said first and second jumper wirings are connected.

43. The combination type thin film magnetic head according to claim 42, wherein said first and second jumper wirings are made of a same material as that of the top pole and is formed simultaneously with the top pole.

44. The combination type thin film magnetic head according to claim 43, wherein the contact portions provided at the end portions of the innermost coil winding of the first and second thin film coil halves to which said first and second jumper wirings are connected are arranged side by side on a side of the bridge portion remote from the air bearing surface.

45. The combination type thin film magnetic head according to claim 44, wherein an insulating film is provided between the contact portions formed at the end portions of the innermost coil winding of the first and second thin film coil halves to which said first and second jumper wirings are connected and the bridge portion.

46. The combination type thin film magnetic head according to claim 34, wherein a thickness of said insulating film interposed between successive coil windings of the first and second thin film coil halves is 0.03–0.25 µm.

47. The combination type thin film magnetic head according to claim 34, wherein a thickness of said insulating film interposed between successive coil windings of the first and second thin film coil halves is formed by an alumina-CVD film.

48. The combination type thin film magnetic head according to claim 34, wherein a coil winding which is closest to the air bearing surface and a coil winding which is closest to the bridge portion are formed by the outermost and innermost coil windings of the second thin film coil half, and a width of the outermost and innermost coil windings of the second thin film coil half is smaller than a width of the remaining coil windings of the second thin film coil half.

49. The combination type thin film magnetic head according to claim 48, wherein a width of the outermost and innermost coil windings of the second thin film coil half is smaller than a width of the remaining coil windings of the second thin film coil half.

50. The combination type thin film magnetic head according to claim 34, wherein said magnetoresistive type thin film magnetic head element is formed by a GMR head element.

51. A method of manufacturing a thin film magnetic head comprising:

forming a first magnetic member made of a magnetic material and including a pole portion which is to be opposed to a magnetic record medium;

forming a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;

forming a write gap film made of a non-magnetic material and being sandwiched between said pole portions of the first and second magnetic members at least at the air bearing surface;

forming a thin film coil having a portion arranged between said first and second magnetic members in an electrically isolated manner; and providing a substrate for supporting said first and second magnetic members, write gap film and thin film coil;

wherein said step of forming the thin film coil comprises the steps of:

forming a plurality of coil windings of a first thin film coil half mutually separated by a given distance;

forming a first insulating film over a whole surface of the first thin film coil half;

forming a conductive film on the first insulating film such that spaces between successive coil windings of the first thin film coil half;

removing a portion of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;

forming a second insulating film to cover the first and second thin film coil halves; and forming a jumper wiring connecting electrically an innermost coil winding of one of the first and second thin film coil halves to an outermost coil winding of the other of the first and second thin film coil halves, the step of forming the first magnetic member includes a step of forming a first magnetic material film and a step of patterning the first magnetic material film to form a first pole having a pole portion, and the step of forming the second magnetic member includes a step of forming a track pole which is opposed to the pole portion of said first pole via the write gap film and a step of forming a second pole such that one end of the second pole is magnetically coupled with the track pole and the other end of the second pole is magnetically coupled with the first pole at the back gap, whereby said jumper wiring is formed with a same material as the second pole simultaneously with the second pole.

52. The method according to claim 51, wherein after forming the first insulating film on a whole surface of the first thin film coil half but prior to forming the conductive film on the first insulating film such that spaces between successive coil windings are embedded, a third insulating film is formed to cover a thin film coil forming region, a fourth insulating film is formed selectively, and then the third insulating film is removed to form spaces between successive coil windings of the first thin film coil half.

53. The method according to claim 52, wherein after forming said third insulating film with an organic insulating material, said fourth insulating film is formed, and then the third insulating film is removed by a wet chemical etching.

54. The method according to claim 53, wherein said third insulating film made of an organic insulating material is formed with photoresist or polyimide.

55. The method according to claim 52, wherein after forming said third insulating film with spin-on glass, said fourth insulating film is formed, and then the third insulating film is removed by a wet chemical etching.

56. The method according to claim 52, wherein the step of selectively forming the fourth insulating film includes a step of forming an insulating film on a whole surface, and a step of flattening this insulating film and the third insulating film by CMP.

57. The method according to claim 56, wherein said insulating film constituting the fourth insulating film and said third insulating film are flattened by CMP using an alkaline slurry or a neutral slurry.

58. The method according to claim 51, wherein the coil windings of the first thin film coil half are formed by electrolytic plating and the coil windings of the second thin film coil half are formed by CVD.

59. The method according to claim 58, wherein the coil windings of the first thin film coil half are formed by electrolytic plating of copper and the coil windings of the second thin film coil half are formed by Cu-CVD.

60. The method according to claim 51, wherein the coil windings of the first and second thin film coil halves are formed by electrolytic plating.

61. The method according to claim 51, wherein the coil windings of the first and second thin film coil halves are formed by electrolytic plating of copper.

62. The method according to claim 51, wherein after forming the conductive material film on the first insulating film, a portion of the conductive material film covering a top surface of the coil windings of the first thin film coil half and a portion of the first insulating film situating under said portion of the conductive material film are removed by CMP.

63. The method according to claim 51, wherein after forming the conductive material film on the first insulating film, a portion of the conductive material film covering a top surface of the coil windings of the first thin film coil half and a portion of the first insulating film situating under said portion of the conductive material film are removed by a dry etching.

64. The method according to claim 51, wherein after forming the conductive material film on the first insulating film, a portion of the conductive material film covering a top surface of the coil windings of the first thin film coil half and a portion of the first insulating film situating under said portion of the conductive material film are removed by an ion beam etching.

65. The method according to claim 51, wherein after forming the conductive material film on the first insulating film, a portion of the conductive material film covering a top surface of the coil windings of the first thin film coil half and a portion of the first insulating film situating under said portion of the conductive material film are roughly removed by CMP, and then are removed finely.

66. The method according to claim 51, wherein said first insulating film covering the first thin film coil half is formed by alumina-CVD.

67. The method according to claim 66, wherein said first insulating film is formed by depositing alumina-CVD by a chemical reaction using an atomic layer process, in which $Al(CH_3)_3$ or $AlCl_3$ and $H_2O$, $N_2$, $N_2O$ or $H_2O_2$ are alternately projected intermittently under a reduced pressure of 1–2 Torr at a temperature of 100–400° C.

68. A method of manufacturing a combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;
wherein a process of forming said inductive type thin film magnetic head element comprises the steps of:
forming a first pole made of a magnetic material;
forming a write gap film made of a non-magnetic material on a surface of the first pole;
forming a first magnetic material film on the write gap film;
performing a first etching process for removing the first magnetic material film except for a width which is at least equal to a distance from a position defining the air bearing surface to a throat height zero reference position;
forming a first non-magnetic material film in a space formed by the first etching process such that the first non-magnetic material film is brought into contact with the first magnetic material film at the throat height zero reference position;
polishing the first non-magnetic material film to form a flat coplanar surface together with a surface of the first magnetic material film opposite to a surface which is brought into contact with the write gap film;
forming a top track pole made of a magnetic material on the coplanar flat surface of the first magnetic material film and first non-magnetic material film to form a track chip portion extending inwardly from the air bearing surface at least to an end surface of the first non-magnetic material film and a contact portion which is continued from the track chip portion and has a width larger than a width of the track chip pole;
performing a second etching process of reactive ion etching using at least said top track pole as an etching mask to remove selectively the first non-magnetic material film and first magnetic film to form a bottom track pole;
forming a second non-magnetic material film in a space formed by the second etching process;
polishing the second non-magnetic material film to form a flat coplanar surface together with the top track pole;
forming a thin film coil in an electrically isolated manner in an inner region with respect to a boundary surface at which the first and second non-magnetic material films are adjoined; and
forming a second pole made of a magnetic material such that one end of the second pole is magnetically coupled with the contact portion of the top track pole and the other end of the second pole is magnetically coupled with the first pole at a back gap remote from the air bearing surface, said first and second poles surrounding a part of the thin film coil;
wherein said step of forming the thin film coil comprises the steps of:
forming a plurality of coil windings of a first thin film coil half mutually separated by a given distance;
forming a first insulating film over a whole surface of the first insulating film;
forming a conductive film on the first insulating film such that spaces between successive coil windings of the first thin film coil half removing portions of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;
forming a second insulating film to cover the first and second thin film coil halves; and
forming a jumper wiring connecting electrically an innermost coil winding of one of the first and second thin film coil halves to an outermost coil winding of the other of the first and second thin film coil halves.

69. The method according to claim 68, wherein during said second etching step, after forming the bottom track pole, the reactive ion etching is continued to remove selectively the write gap film, and further the surface of the first pole is partially etched over a part of its thickness to form a trim structure.

70. The method according to claim 69, wherein said first magnetic material film is formed with FeN or FeCo and said second magnetic material film is formed by plating of FeN or FeCo, and the reactive ion etching for removing the first and second magnetic material films is performed at 50–300° C. under an atmosphere of $Cl_2$ or a mixed gas of $Cl_2$ and boron series gas such as $BCl_2$ or a mixed gas of $Cl_2$ and an inert gas such as Ar and $N_2$.

71. The method according to claim 70, wherein the reactive ion etching for removing the second magnetic material film is carried out at an etching temperature of 200–300° C.

72. The method according to claim 68, wherein during the first etching step, the first non-magnetic material film is removed up to the surface of the write gap film.

73. The method according to claim 68, wherein during the first etching step, the first non-magnetic material film is removed beyond the surface of the write gap film.

74. The method according to claim 68, wherein said step of forming the top track pole includes a step of forming the second magnetic material film on the flat surface of the first magnetic material film and first non-magnetic material film to have a flat surface, a step of forming, on the flat surface of the second magnetic material film, a mask having a pattern corresponding to the shape of the top track pole to be formed, and a step of selectively removing the second magnetic material film by a reactive ion etching using the mask, and then the reactive ion etching is continued to etch the first magnetic material film to form the bottom track pole in a self-aligned manner.

75. The method according to wherein said step of forming the top track pole includes a step of forming the second magnetic material film on the flat surface of the first magnetic material film and first non-magnetic material film to have a flat surface; and a step of forming the top track pole by the reactive ion etching using a mask formed on the flat surface of the second magnetic material film and having a pattern corresponding to the shape of the top track pole; whereby the reactive ion etching is performed to etch the first magnetic material film to form the bottom track pole in a self-aligned manner, while said top track pole is used as an etching mask.

76. The method according to claim 75, wherein said first magnetic material film is formed with FeN or FeCo and said second magnetic material film is formed by plating of CoNiFe, and the reactive ion etching for removing the first and second magnetic material films is performed at 50–300° C. under an atmosphere of $Cl_2$ or a mixed gas of $Cl_2$, a boron series gas such as $BCl_2$ and at least one of $O_2$, Ar and $N_2$.

77. The method according to claim 76, wherein the reactive ion etching for etching the first magnetic material film is performed at an etching temperature of 200–300° C.

78. The method according to claim 76, wherein said first magnetic material film is formed with FeN or FeCo, said second magnetic material film is formed by sputtering of FeN or FeCo, the top track pole is formed using a mask formed by a plating film of CoNiFe, and the reactive ion etching for forming the bottom track pole by etching the first magnetic material film is performed at 50–300° C. under an atmosphere of $Cl_2$ or a mixed gas of $Cl_2$, a boron series gas such as $BCl_2$ and at least one of $O_2$, Ar and $N_2$.

79. The method according to claim 78, wherein the reactive ion etching for etching the first magnetic material film is performed at an etching temperature of 200–300° C.

80. The method according to claim 68, wherein said first magnetic material film is formed with FeN or FeCo, said second magnetic material film is formed by plating of CoNiFe or FeCo, the top tack pole is formed by etching the second magnetic material film into a given pattern, and the reactive ion etching using the said top track pole as a mask for forming the bottom track pole by etching the first magnetic material film is performed at 50–300° C. under an atmosphere of $Cl_2$ or a mixed gas of $Cl_2$, a boron series gas such as $BCl_2$ and at least one of $O_2$, Ar and $N_2$.

81. The method according to claim 80, wherein the reactive ion etching for etching the first magnetic material film is performed at an etching temperature of 200–300° C.

82. The method according to claim 68, wherein said second etching step includes a step of performing an ion milling for side walls of the top track pole, bottom track pole and a portion of the first pole constituting the trim structure to reduce a width of these poles, after forming the bottom track pole, the write gap film is selectively removed, and the surface of the first pole is partially removed over a part of its thickness to form the trim structure.

83. The method according to claim 82, wherein said ion milling is angle of 40–75° with respect to the side walls of the poles to be thinned.

84. The method according to claim 68, wherein said magnetoresistive type thin film magnetic head element is formed as a GMR head element.

85. The method according to claim 68, wherein said third insulating film is formed with an organic insulating film, and after forming the fourth insulating film, the third insulating film is removed by a wet chemical etching.

86. The method according to claim 85, wherein said third insulating film made of organic insulating material formed with photoresist or polyimide.

87. The method according to claim 68, wherein said third insulating film is formed with spin-on-glass, and after forming the fourth insulating film, the third insulating film is removed by a wet chemical etching.

88. The method according to claim 68, wherein the step of selectively forming said fourth insulating film includes a step of forming an insulating film on a whole surface, and a step of flattening said insulating film and third insulating film by CMP.

89. The method according to claim 88, wherein said insulating film constituting the fourth insulating film and said third insulating film are flattened by CMP using an alkaline slurry or a neutral slurry.

90. The method according to claim 68, wherein the coil windings of the first thin film coil half are formed by electrolytic plating and the coil windings of the second thin film coil half are formed by CVD.

91. The method according to claim 90, wherein the coil windings of the first thin film coil half are formed by electrolytic plating of copper and the coil windings of the second thin film coil half are formed by Cu-CVD.

92. The method according to claim 68, wherein the coil windings of the first and second thin film coil halves are formed by electrolytic plating.

93. The method according to claim 92, wherein the coil windings of the first and second thin film coil halves are formed by electrolytic plating of copper.

94. The method according to claim 68, wherein after forming the conductive material film on the first insulating film, a portion of the conductive material film covering a top surface of the coil windings of the first thin film coil half and a portion of the first insulating film situating under said portion of the conductive material film are removed by CMP.

95. The method according to claim 68, wherein after forming the conductive material film on the first insulating film, a portion of the conductive material film covering a top surface of the coil windings of the first thin film coil half and a portion of the first insulating film situating under said portion of the conductive material film are removed by a dry etching.

96. The method according to claim 68, wherein after forming the conductive material film on the first insulating film, a portion of the conductive material film covering a top surface of the coil windings of the first thin film coil half and a portion of the first insulating film situating under said portion of the conductive material film are removed by an ion beam etching.

97. The method according to claim 68, wherein after forming the conductive material film on the first insulating film, a portion of the conductive material film covering a top surface of the coil windings of the first thin film coil half and a portion of the first insulating film situating under said portion of the conductive material film are roughly removed by CMP, and then are removed finely.

98. The method according to claim 68, wherein the step of forming the first magnetic member includes a step of forming a first magnetic material film and a step of patterning the first magnetic material film to form a first pole having a pole portion, and the step of forming the second magnetic member includes a step of forming a track pole which is opposed to the pole portion of said first pole via the write gap film and a step of forming a second pole such that one end of the second pole is magnetically coupled with the track pole and the other end of the second pole is magnetically coupled with the first pole at the back gap, whereby said jumper wiring is formed with a same material as the second pole simultaneously with the second pole.

99. The method according to claim 68, wherein the step of forming the first magnetic member includes a step of forming a first magnetic material film and a step of patterning the first magnetic material film to form a first pole having a pole portion, and the step of forming the second magnetic member includes a step of forming a track pole which is opposed to the pole portion of said first pole via the write gap film and a step of forming a second pole such that one end of the second pole is magnetically coupled with the track pole and the other end of the second pole is magnetically coupled with the first pole at the back gap, whereby said jumper wiring is formed with a same material as the track pole simultaneously with the track pole.

100. The method according to claim 68, wherein said first insulating film covering the first thin film coil half is formed by alumina-CVD.

101. The method according to claim 100, wherein said first insulating film is formed by depositing alumina-CVD by a chemical reaction using an atomic layer process, in which $Al(CH_3)_3$ or $AlCl_3$ and $H_2O$, $N_2$, $N_2O$ or $H_2O_2$ are alternately projected intermittently under a reduced pressure of 1–2 Torr at a temperature of 100–400° C.

102. A method of manufacturing a combination type thin film magnetic head including a substrate, an inductive type thin film magnetic head element and a magnetoresistive type thin film magnetic head element, said inductive and magnetoresistive type thin film magnetic head elements being stacked on the substrate to define an air bearing surface;
wherein a process of forming said inductive type thin film magnetic head element comprises the steps of:
forming a first magnetic material film made of a magnetic material and constituting a bottom pole;
forming, on the first magnetic material film, a second magnetic material film constituting a bottom track pole and a bridge portion of a back gap;
forming a thin film coil on the first magnetic material film to be supported in an electrically isolated manner;
polishing the second magnetic material film and thin film to obtain a flat coplanar surface;
forming, on the flat coplanar surface, a write gap film made of a non-magnetic material to have a flat surface;
forming, on the flat surface of the write gap film, a third magnetic film constituting a top track pole and top pole, said third magnetic material film being brought into contact with the bridge portion;
forming a mask on the third magnetic material film at a position at which the top track pole is to be formed;
performing an etching process for selectively removing the third magnetic material film to form the top track pole and further selectively removing a portion of the write gap film surrounding the top track pole and the underlying second magnetic material film to form the bottom track pole; and
forming an overcoat film made of an electrically insulating material on a whole surface;
wherein the step of forming the thin film coil comprises the steps of:
forming, on said first magnetic material film, a plurality of coil windings of the first thin film coil half isolated from the first magnetic material film such that the coil windings are separated from each other by a given distance;
forming a first insulating film all over the first thin film coil half;
forming a second insulating film on an area except for a thin film coil forming region at which a second thin film coil half is to be formed;
forming, on said first insulating film covering the first thin film coil half, a conductive film such that spaces formed between successive coil windings of the first thin film coil half are filled with said conductive film; and
removing a portion of the conductive film covering top surfaces of the coil windings of the first thin film coil half and an underlying portion of the first insulating film to form a second thin film coil half having coil windings which are formed between successive coil windings of the first thin film coil half in a self-aligned manner and are electrically isolated by the first insulating film;
wherein prior to forming said third magnetic material film, contact portions provided at ends of innermost and outermost coil windings of the first and second thin film coil halves are exposed, during the formation of the third magnetic material film, a first jumper wiring for electrically connecting a contact portion at the end of the innermost coil winding of one of the first and second thin film coil halves to a contact portion of the outermost coil winding of the other of the first and second thin film coil halves and a second jumper wiring connected to a contact portion at the end of the innermost coil winding of the other of the first and second thin film coil halves are formed with a same magnetic material as that of the third magnetic material film.

103. The method according to claim 102, wherein during said etching step, the surface of the first magnetic material film constituting the bottom pole is selectively removed to form a trim structure.

104. The method according to claim 102, wherein said third magnetic material film is formed to have a two-layer structure by depositing successively a lower magnetic material film and an upper magnetic material film on the write gap film.

105. The method according to claim 104, wherein said lower and upper magnetic material films of the third magnetic material film is formed by plating of a magnetic material selected from the group consisting of FeN, FeCo, CoNiFe, FeAlN and FeZrN.

106. The method according to claim 105, wherein said second magnetic material film is formed by plating of a magnetic material selected from the group consisting of FeN, FeCo, FeAlN, CoNiFe and FeZrN.

107. The method according to claim 102, wherein the coil windings of said first thin film coil half is formed by electrolytic plating and the coil windings of said second thin film coil half are formed by CVD.

108. The method according to claim 107, wherein the coil windings of said first thin film coil half is formed by electrolytic plating of copper and the coil windings of said second thin film coil half are formed by Cu-CVD.

109. The method according to claim 102, wherein the coil windings of said first and second thin film coil halves are formed by electrolytic plating of copper.

110. The method according to claim 102, wherein the step of forming the second insulating film on the area except for the thin film coil forming region at which a second thin film coil half is to be formed includes a step of covering selectively the thin film coil forming region with a resist, a step of forming an alumina insulating film on a whole surface, a step of polishing the alumina insulating film to expose said resist, and a step of removing the exposed resist.

111. The method according to claim 105, wherein a portion of said alumina insulating film situating between said bridge portion and said contact portions provided at the end portions of the innermost coil windings of the first and second thin film coil halves to which the ends of the first and second jumper wirings are connected is remained.

112. The method according to claim 102, wherein said first insulating film interposed between the coil windings of the first and second thin film coil halves are formed by alumina-CVD.

113. The method according to claim 112, wherein said first insulating film is formed by depositing alumina-CVD by a chemical reaction using an atomic layer process, in which $Al(CH_3)_3$ or $AlCl_3$ and $H_2O$, $N_2$, $N_2O$ or $H_2O_2$ are alternately projected intermittently under a reduced pressure of 1–2 Torr at a temperature of 100–400° C.

114. A thin film magnetic head comprising:
a first magnetic member made of a magnetic material and including a pole portion which is to be opposed to a magnetic record medium;
a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
a write gap film made of a non-magnetic material and being sandwiched between said pole portions of the first and second magnetic members at least at the air bearing surface;
a thin film coil having a portion arranged between said first and second magnetic members in an electrically isolated manner; and
a substrate for supporting said first and second magnetic members, write gap film and thin film coil;
wherein said thin film coil comprises:
a first thin film coil half having coil windings mutually separated by a given distance;
a second thin film coil half having coil windings which are formed between successive coil windings of the first thin film coil half in a self-aligned manner;
an insulating film formed to embed spaces between successive coil windings of the first and second thin film coil halves; and
a jumper wiring connecting electrically an innermost coil winding of one of the first and second thin film coil halves to an outermost coil winding of the other of the first and second thin film coil halves,
said first magnetic member is formed by a first pole, said second magnetic member is formed by a track pole which is opposed to said pole portion of the first magnetic member via the write gap film and a second pole having one end magnetically coupled with the track pole and the other end magnetically coupled with the first pole at the back gap, and said jumper wiring is made of a same material as that of the track pole of the second magnetic formed simultaneously with the track pole.

115. The thin film magnetic head according to claim 114, wherein said first thin film coil half includes coil windings formed by electrolytic plating and said second thin film coil half includes coil windings formed by CVD.

116. The thin film magnetic head according to claim 115, wherein said first thin film coil half includes coil windings formed by electrolytic plating of copper and said second thin film coil half includes coil windings formed by Cu-CVD.

117. The thin film magnetic head according to claim 114, wherein said first and film coil halves include coil windings formed by electrolytic plating.

118. The thin film magnetic head according to claim 117, wherein said first and second thin film coil halves include coil windings formed by electrolytic plating of copper.

119. The thin film magnetic head according to claim 114, wherein end portions of the coil windings to which said jumper wiring is connected have larger width.

120. The thin film magnetic head according to claim 114, wherein a thickness of said insulating film interposed between successive coil windings of the first and second thin film coil halves is 0.03–0.25 $\mu$m.

121. The thin film magnetic head according to claim 120, wherein said insulating film interposed between successive coil windings of the first and second thin film coil halves is made of an inorganic insulating material selected from the group consisting of alumina, silicon oxide and silicon nitride.

122. The thin film magnetic head according to claim 121, wherein said insulating film interposed between successive coil windings of the first and second thin film coil halves is formed by an alumina-CVD film.

123. A thin film magnetic head comprising:
a first magnetic member made of a magnetic material and including a pole portion which is to be opposed to a magnetic record medium;
a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
a write gap film made of a non-magnetic material and being sandwiched between said pole portions of the first and second magnetic members at least at the air bearing surface;
a thin film coil having a portion arranged between said first and second magnetic members in an electrically isolated manner; and
a substrate for supporting said first and second magnetic members, write gap film and thin film coil;

wherein said thin film coil comprises:
a first thin film coil half having coil windings mutually separated by a given distance;
a second thin film coil half having coil windings which are formed between successive coil windings of the first thin film coil half in a self-aligned manner;
an insulating film formed to embed spaces between successive coil windings of the first and second thin film coil halves; and
a jumper wiring connecting electrically an innermost coil winding of one of the first and second thin film coil halves to an outermost coil winding of the other of the first and second thin film coil halves, end portions of said innermost and outermost coil windings to which said jumper wiring is connected having a larger width,
said first magnetic member is formed by a first pole; said second magnetic member is formed by a bottom track pole which is opposed to said pole portion of the first magnetic member via the write gap film, a top track pole which is formed on the bottom track pole and includes a pole chip portion defining a track width and a contact portion having a width larger than the pole chip portion, and a second pole having one end magnetically coupled with the contact portion of the top track pole and the other end magnetically coupled with the first pole at the back gap; and
said jumper wiring is made of a same material as that of the top track pole of the second magnetic member and is formed simultaneously with the second pole.

124. The thin film magnetic head according to claim 123, wherein said first thin film coil half includes coil windings formed by electrolytic plating and said second thin film coil half includes coil windings formed by CVD.

125. The thin film magnetic head according to claim 124, wherein said first thin film coil half includes coil windings formed by electrolytic plating of copper and said second thin film coil half includes coil windings formed by Cu-CVD.

126. The thin film magnetic head according to claim 123, wherein said first and second thin film coil halves include coil windings formed by electrolytic plating.

127. The thin film magnetic head according to claim 126, wherein said first and second thin film coil halves include coil windings formed by electrolytic plating of copper.

128. The thin film magnetic head according to claim 123, wherein a thickness of said insulating film interposed between successive coil windings of the first and second thin film coil halves is 0.03–0.25 $\mu$m.

129. The thin film magnetic head according to claim 128, wherein said insulating film interposed between successive coil windings of the first and second thin film coil halves is made of an inorganic insulating material selected from the group consisting of alumina, silicon oxide and silicon nitride.

130. The thin film magnetic head according to claim 129, wherein said insulating film interposed between successive coil windings of the first and second thin film coil halves is formed by an alumina-CVD film.

131. A method of manufacturing a thin film magnetic head comprising:
forming a first magnetic member made of a magnetic material and including a pole portion which is to be opposed to a magnetic record medium;
forming a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
forming a write gap film made of a non-magnetic material and being sandwiched between said pole portions of the first and second magnetic members at least at the air bearing surface;
forming a thin film coil having a portion arranged between said first and second magnetic members in an electrically isolated manner; and
providing a substrate for supporting said first and second magnetic members, write gap film and thin film coil;
wherein said step of forming the thin film coil comprises the steps of:
forming a plurality of coil windings of a first thin film coil half mutually separated by a given distance;
forming a first insulating film over a whole surface of the first thin film coil half;
forming a conductive film on the first insulating film such that spaces between successive coil windings of the first thin film coil half;
removing a portion of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;
forming a second insulating film to cover the first and second thin film coil halves; and
forming a jumper wiring connecting electrically an innermost coil winding of one of the first and second thin film coil halves to an outermost coil winding of the other of the first and second thin film coil halves,
the step of forming the first magnetic member includes a step of forming a first magnetic material film and a step of patterning the first magnetic material film to form a first pole having a pole portion, and the step of forming the second magnetic member includes a step of forming a track pole which is opposed to the pole portion of said first pole via the write gap film and a step of forming a second pole such that one end of the second pole is magnetically coupled with the track pole and the other end of the second pole is magnetically coupled with the first pole at the back gap, whereby said jumper wiring is formed with a same material as the track pole simultaneously with the track pole.

132. A method of manufacturing a thin film magnetic head comprising:
forming a first magnetic member made of a magnetic material and including a pole portion which is to be opposed to a magnetic record medium;
forming a second magnetic member made of a magnetic material and including a pole portion which constitutes an air bearing surface together with an end surface of the pole portion of the first magnetic member, said second magnetic member being magnetically coupled with said first magnetic member at a back gap remote from the air bearing surface;
forming a write gap film made of a non-magnetic material and being sandwiched between said pole portions of the first and second magnetic members at least at the air bearing surface;

forming a thin film coil having a portion arranged between said first and second magnetic members in an electrically isolated manner; and providing a substrate for supporting said first and second magnetic members, write gap film and thin film coil;

wherein said step of forming the thin film coil comprises the steps of:
- forming a plurality of coil windings of a first thin film coil half mutually separated by a given distance;
- forming a first insulating film over a whole surface of the first thin film coil half;
- forming a conductive film on the first insulating film such that spaces between successive coil windings of the first thin film coil half;
- removing a portion of the conductive film covering top surfaces of the coil windings of the first thin film coil half and the underlying first insulating film to form a second thin film coil half having a plurality of coil windings which are formed between successive coil windings of the first thin film coil half in a self-aligned manner and are electrically isolated from the coil windings of the first thin film coil half by the first insulating film;

forming a second insulating film to cover the first and second thin film coil halves; and forming a jumper wiring connecting electrically an innermost coil winding of one of the first and second thin film coil halves to an outermost coil winding of the other of the first and second thin film coil halves, the step of forming the first magnetic member includes a step of forming a first magnetic material film and a step of patterning the first magnetic material film to form a first pole having a pole portion; and the step of forming the second magnetic member includes a step of forming a bottom track pole which is opposed to the pole portion of said first pole via the write gap film, a step of forming top track pole on the bottom track pole including a pole chip portion defining a track width and a contact portion having a width larger than the pole chip portion, and a step of forming a second pole such that one end of the second pole is magnetically coupled with the track pole and the other end of the second pole is magnetically coupled with the first pole at the back gap, whereby said jumper wiring is formed with a same material as the track pole simultaneously with the track pole.

* * * * *